FIG. 1

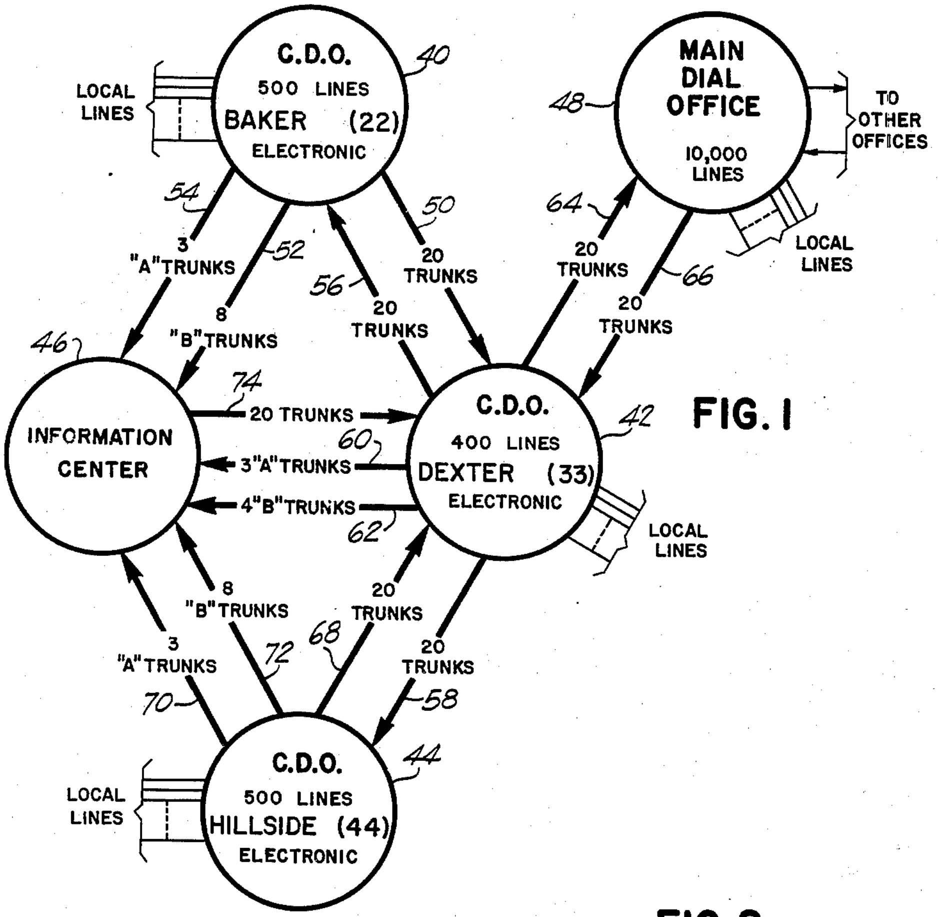

FIG. 2

NUMBERING SYSTEM

| BAKER OFFICE (22) (500 LINES) | DEXTER OFFICE (33) (400 LINES) | HILLSIDE OFFICE (44) (500 LINES) |
|---|---|---|
| BA-511 TO BA-500 | DE-511 TO DE-500 | HI-511 TO HI-500 |
| BA-611 TO BA-600 | DE-611 TO DE-600 | HI-611 TO HI-600 |
| BA-711 TO BA-700 | DE-711 TO DE-700 | HI-711 TO HI-700 |
| BA-811 TO BA-800 | DE-811 TO DE-800 | HI-811 TO HI-800 |
| BA-911 TO BA-900 | | HI-911 TO HI-900 |

| INFORMATION CENTER | | MAIN DIAL OFFICE |
|---|---|---|
| INFORMATION | 113 | PREFIX DIGIT 9 (ACCESSIBLE ONLY FROM LONG DISTANCE OPERATOR AND CERTAIN PREFERRED SUBSCRIBERS IN DEXTER OFFICE). |
| REPAIR SERVICE | 114 | |
| BUSINESS OFFICE | 115 | |
| TIME OF DAY | 116 | |
| WEATHER | 117 | |
| LONG DISTANCE | 0 | |

INVENTOR
ROBERT B. TROUSDALE
BY T. L. Bowes
ATTORNEY

Jan. 17, 1961 R. B. TROUSDALE 2,968,696

ELECTRONIC TELEPHONE SYSTEM

Filed June 1, 1956 36 Sheets-Sheet 3

Jan. 17, 1961 R. B. TROUSDALE 2,968,696

ELECTRONIC TELEPHONE SYSTEM

Filed June 1, 1956

36 Sheets-Sheet 12

Jan. 17, 1961 R. B. TROUSDALE 2,968,696

ELECTRONIC TELEPHONE SYSTEM

Filed June 1, 1956 36 Sheets-Sheet 14

Jan. 17, 1961

R. B. TROUSDALE 2,968,696

ELECTRONIC TELEPHONE SYSTEM

Filed June 1, 1956

36 Sheets-Sheet 16

Jan. 17, 1961

R. B. TROUSDALE 2,968,696

ELECTRONIC TELEPHONE SYSTEM

Filed June 1, 1956

36 Sheets-Sheet 18

Jan. 17, 1961 R. B. TROUSDALE 2,968,696

ELECTRONIC TELEPHONE SYSTEM

Filed June 1, 1956

36 Sheets-Sheet 22

Jan. 17, 1961 R. B. TROUSDALE 2,968,696

ELECTRONIC TELEPHONE SYSTEM

Filed June 1, 1956

36 Sheets-Sheet 23

TYPE A LOCAL SELECTOR-B150b

TYPE A LOCAL SELECTOR-B150b

TYPE F INCOMING SELECTOR – D130b

Jan. 17, 1961 R. B. TROUSDALE 2,968,696

ELECTRONIC TELEPHONE SYSTEM

Filed June 1, 1956 36 Sheets-Sheet 29

TYPE F INCOMING SELECTOR-D130b

Jan. 17, 1961 R. B. TROUSDALE 2,968,696

ELECTRONIC TELEPHONE SYSTEM

Filed June 1, 1956 36 Sheets-Sheet 33

TYPE D LOCAL SELECTOR-D150 b

SELECTOR RESTRICTED SERVICE CIRCUIT-3500

2,968,696
Patented Jan. 17, 1961

2,968,696

ELECTRONIC TELEPHONE SYSTEM

Robert B. Trousdale, Webster, N.Y., assignor to General Dynamics Corporation, Rochester, N.Y., a corporation of Delaware Filed June 1, 1956, Ser. No. 588,835

27 Claims. (Cl. 179—18)

The present invention relates to an electronic telephone system, and, more particularly, to an electronic telephone system wherein facilities are provided for servicing a plurality of electronic community dial offices, each of which includes more than one hundred subscriber lines, and wherein further facilities are provided for connecting any one of the electronic offices into a conventional electro-mechanical telephone system so that two-way communication connections may be set up between subscribers in any electronic or electromechanical office. Specifically, the present invention is directed to an automatic telephone system of the type generally described in a copending application of Frank A. Morris and Robert B. Trousdale, Serial No. 326,213, which was filed on December 16, 1952, Patent No. 2,921,137, and is assigned to the same assignee as the present invention, the above described facilities being provided in the system of the present invention.

In the above identified copending application there is disclosed an electronic telephone system wherein an office of one thousand subscriber lines may be serviced from the same common equipment while employing a system of multiplexing, namely pulse sampling effectively at an utrasonic rate of the control and intelligence signals produced on each line of the system to provide signal channel separation. The one thousand lines of the system are divided into ten groups or levels of one hundred lines each, and the one hundred lines of each line group have individually assigned thereto different pulse time positions in repetitive time position frames each comprising one hundred pulse time positions. Thus, each pulse time position is assigned to one line in each hundreds level.

Each line group consisting of one hundred lines is designated as a particular hundreds digit line group. Thus, the first line group of one hundred lines is designated as the first hundreds digit line group, the second line froup of one hundred lines is designated as the second hundreds digit line group, the third line group of one hundred lines is designated as the third hundreds digit line group, etc. Each hundreds level of the system has assigned thereto a group of ten of said time pulse positions, which identify the hundreds digit position or level of the corresponding lines in the one thousand line system.

Intelligence and control signals developed on any one line in a given hundreds digit line group are sampled only in the particular pulse time position assigned to said one line and the samples are carried through the signal transmitting components of the system as far as the hundreds group selector stage on multiplexer signal pulses occurring in this particular time position. In the hundreds group selector stage the control and intelligence signals carried by the multiplexer signal pulses are detected and either used for control purposes, such as called line hundreds group selection, or are superimposed on selector forward signal pulses occurring in an idle one of the ten time positions assigned to the hundreds level which includes the called line, and the samples are then carried through the signal transmitting components of the system as far as the line selector, or connector stage on the selector forward signal pulses occurring in said idle time position. In the connector stage the control and intelligence signals carried by the selector forward signal pulses are detected and either used for control purposes, such as called line selection within the called line hundreds level, or are superimposed on connector signal pulses occurring in the time position assigned to the called line within the called line hundreds group for redistribution to the substations associated with the called line. The reverse process is employed in transmitting intelligence from the called substation back to the calling substation.

While the above described system is satisfactory for its intended purpose, in many instances it is necessary or desirable to provide a system whereby the subscribers in the electronic office can communicate with subscribers in existing electromechanical telephone offices. In such a system facilities are required to convert the pulse multiplex signals into relatively low frequency speech signals and vice versa, to permit two-way communication connections between the two types of offices. Also, since a relatively small number of simultaneous calls are usually in progress between offices, a system of trunks is normally provided, and facilities must be provided in the electronic office to transmit and receive the trunk signals and convert the same to suitable pulse multiplex signals which can be handled within the electronic office. While ten percent trunking is usually sufficient to handle normal traffic between offices, it is sometimes desirable to increase the trunking percentage. However, the larger percentage trunking must be compatible with the pulse multiplex facilities in the individual offices.

In situations where two or more electronic offices are spaced relatively far apart, as when serving different communities, it may be desirable to convert the pulse multiplex signals into speech signals for transmission to the remote office and then reconvert the transmitted signals into suitable pulse multiplex signals at the remote office. Such an arrangement has the advantage that the pulses developed in the two electronic offices do not have to be maintained in synchronism and the problems encountered in long distance pulse transmission are obviated.

In systems involving two or more offices it is also necessary to provide selectors which will absorb certain digits so that a uniform directory numbering system can be used for all offices. These selectors should also include facilities for reusing the absorbed digit level on local calls so as to permit special services, such as information, time of day, weather, etc., to be dialed directly from each electronic office. In addition, it may be desirable to provide facilities within the electronic office such that subscribers of a predetermined class may dial through to the electromechanical exchange directly by employing the prefix digit "9" and without the assistance of the long distance operator.

It is, therefore, an object of the present invention to provide a new and improved automatic electronic telephone system which is adapted operatively to function with and be connected to a conventional automatic electromechanical telephone system.

It is another object of the present invention to provide a new and improved electronic telephone system wherein individual electronic offices of the pulse multiplex type, each serving more than one hundred subscriber lines, may be interconnected without maintaining the pulses developed at each office in synchronism.

It is a further object of the present invention to provide a new and improved electronic telephone system wherein a uniform directory numbering system may be employed in a system including a plurality of separate electronic offices.

It is a still further object of the present invention to provide a new and improved electronic telephone system wherein drop-back selector facilities are provided.

It is another object of the present invention to provide a new and improved electronic telephone system wherein facilities are provided for connection to the trunks of an electromechanical telephone system to permit two-way communication connections between the electronic office and an electromechanical office.

It is a further object of the present invention to provide a new and improved electronic telephone system wherein facilities are provided for connection to special services such as information, time of day, and the like.

It is a still further object of the present invention to provide a new and improved electronic telephone system wherein a relatively large number of calls between different electronic offices may be simultaneously handled.

The invention, both as to its organization and method of operation, together with further objects and advantages thereof, will best be understood by reference to the following specification taken in connection with the accompanying drawings in which:

Fig. 1 is a block diagram of an automatic telephone system embodying the features of the present invention;

Fig. 2 is a chart of the numbering system employed in the telephone system of Fig. 1;

Figure 34A:
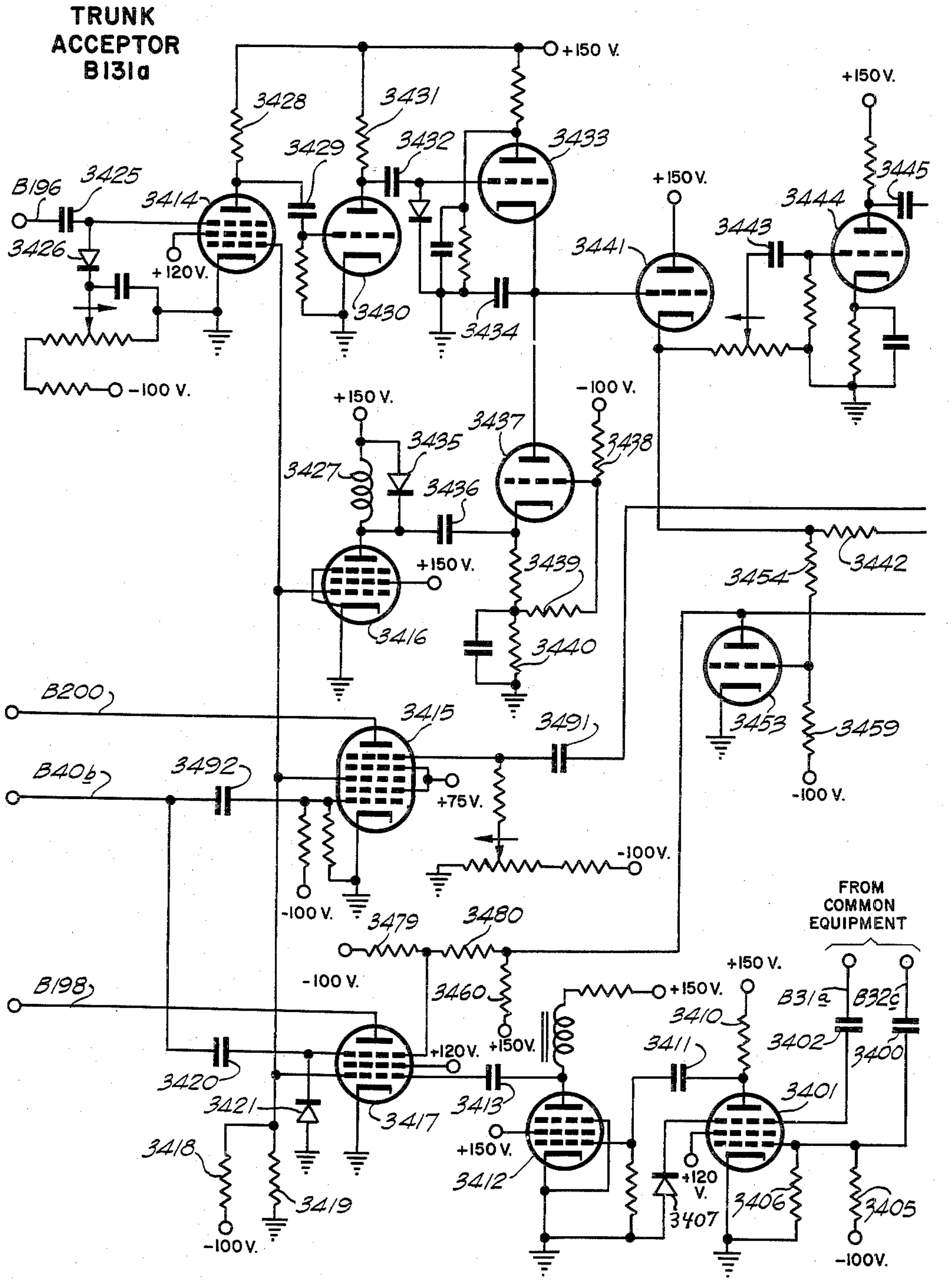
Figure 34B:
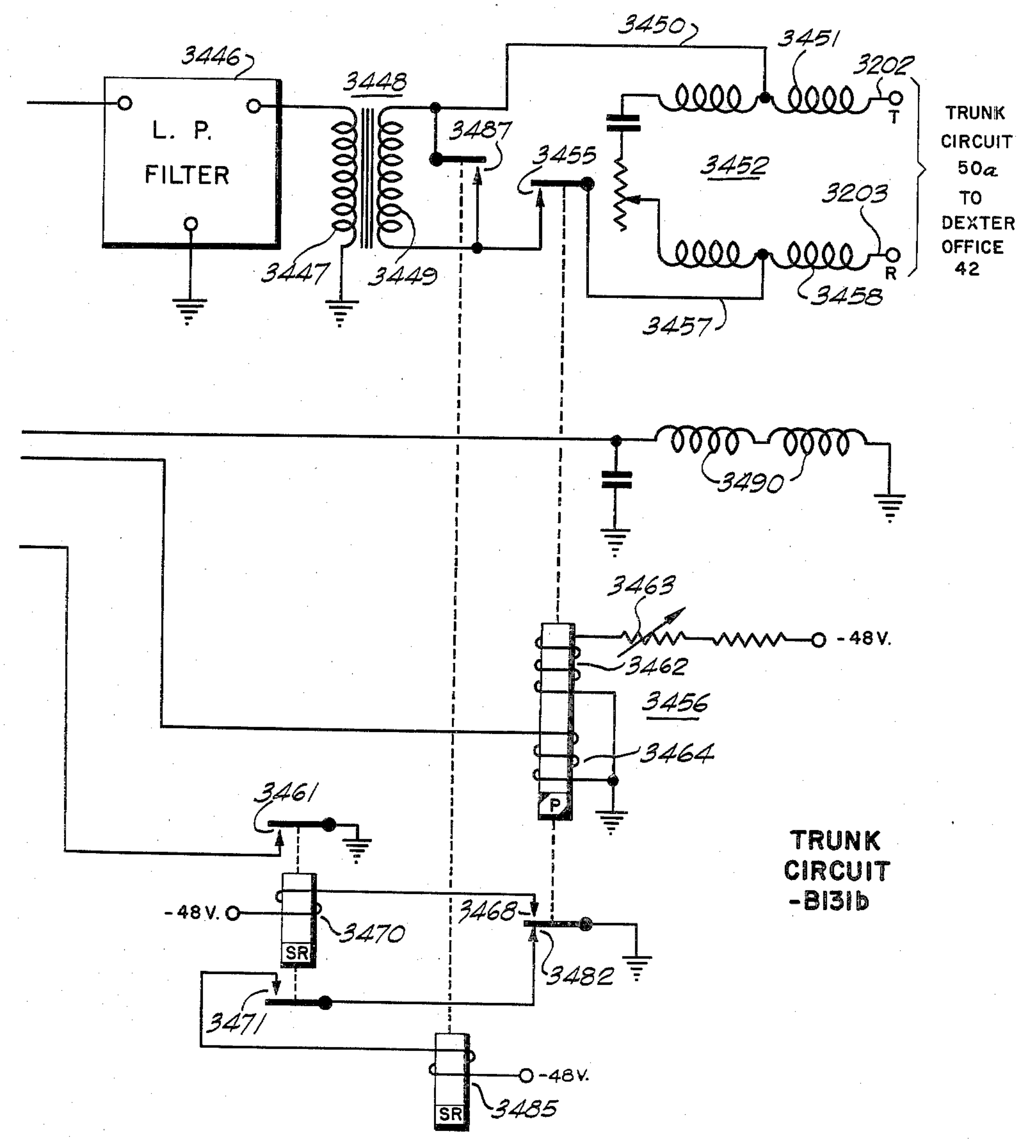
Figure 35:
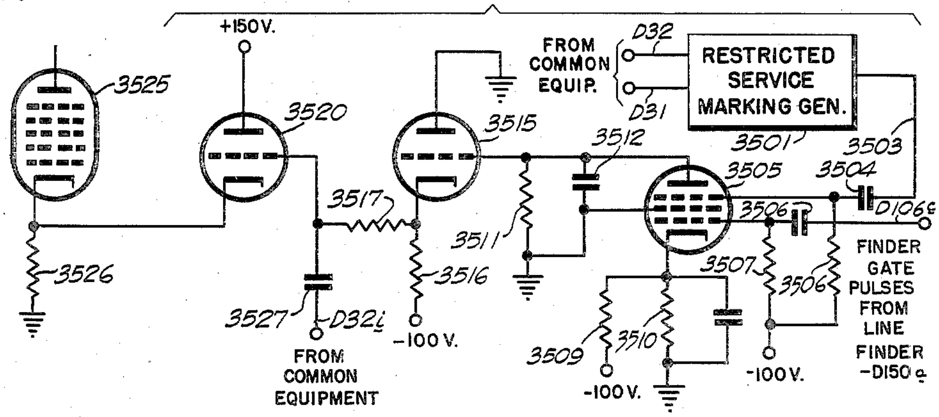
Figure 36:
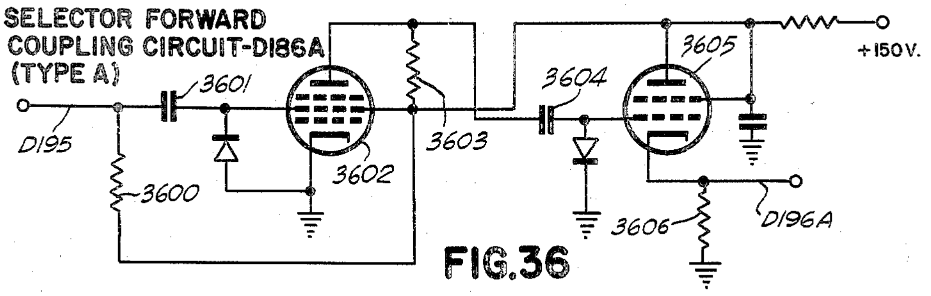
Figure 37:
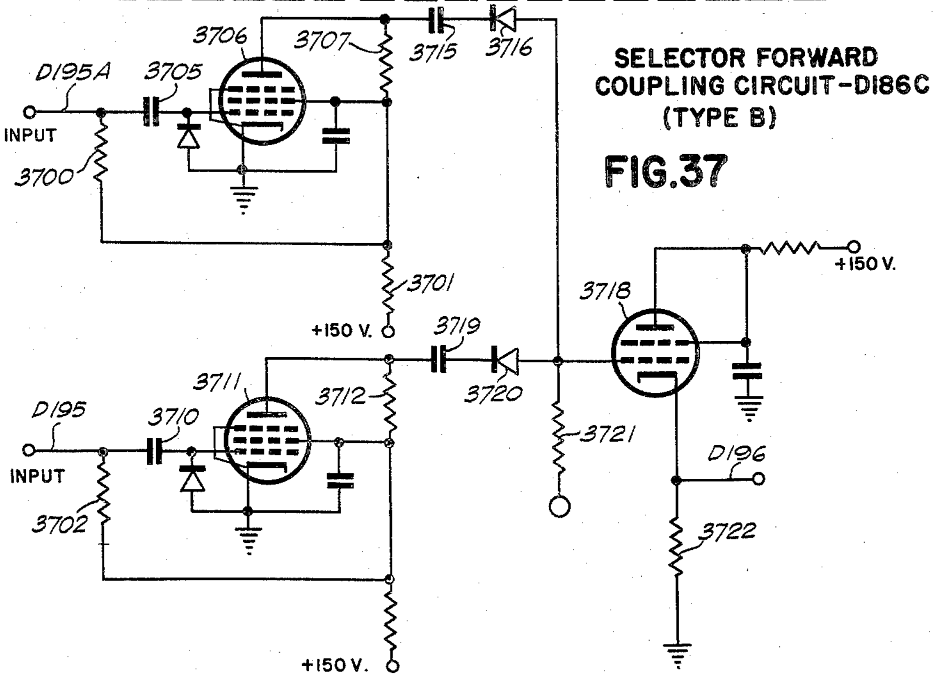
Figure 38:
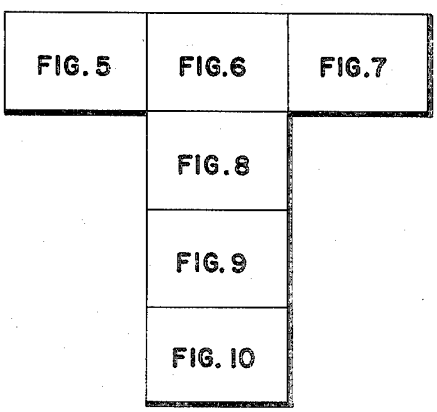
Figure 40:
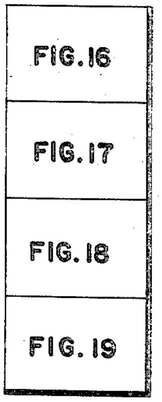
Figure 39:
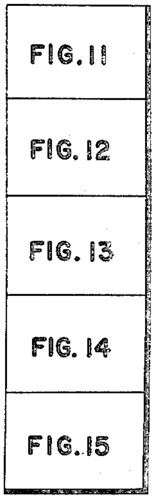
Figure 41:
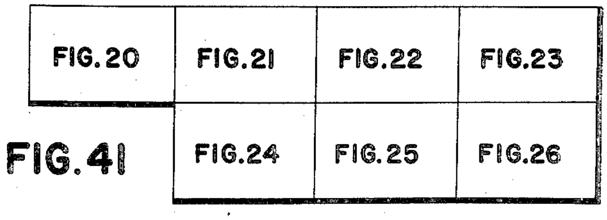
Figure 42:
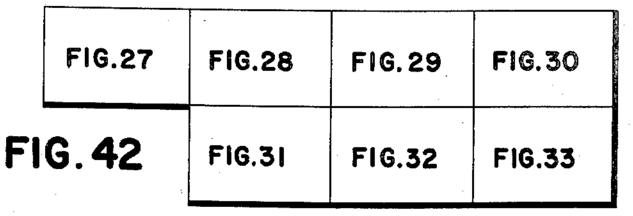

Figs. 5 to 10, inclusive, when arranged in the manner shown in Fig. 38, disclose in block diagram form the system components of the Baker community dial office in the system of Fig. 1;

Figs. 11 to 15, inclusive, when arranged in the manner shown in Fig. 39, disclose the system components of the Dexter community dial office in the system of Fig. 1;

Figs. 16 to 19, inclusive, when arranged in the manner shown in Fig. 40, disclose the system components of the Hillside community dial office in the system of Fig. 1;

Figs. 20 to 26, inclusive, when arranged in the manner shown in Fig. 41, disclose the circuit components of one type of local selector employed in the system of Fig. 1;

Figs. 27 to 33, inclusive, when arranged in the manner shown in Fig. 42, disclose the circuit components of one type of incoming selector employed in the system of Fig. 1;

Figs. 34A and 34B disclose the circuit components of one of the trunk acceptors and associated trunk circuit employed in the system of Fig. 1;

Fig. 35 discloses the circuit components of a selector restricted service circuit employed in certain types of selectors in the system of Fig. 1;

Fig. 36 discloses one type of coupling circuit employed in the system of Fig. 1; and Fig. 37 discloses the circuit components of another type of coupling circuit employed in the system of Fig. 1.

Referring now to the drawings, and more particularly to Figs. 1 to 4, inclusive, thereof, the present invention is therein illustrated as comprising a multi-office telephone system which includes a first electronic telephone office 40, which is identified as the Baker office and which, in the illustrated embodiment, is capable of servicing five hundred local lines; a second electronic telephone office 42, identified as the Dexter office and which, in the illustrated embodiment, is capable of servicing four hundred local lines; a third electronic telephone office 44, which is identified as the Hillside office and which, in the illustrated embodiment, is capable of servicing five hundred local lines; an information center 46 which is of the conventional electromechanical type and a main dial office 48 which is also of the electromechanical type and is adapted to service a relatively large number of subscriber lines and to extend telephonic connections to any desired location in an electromechanical telephone system in the conventional manner.

Each of the offices 40, 42 and 44 include electronic facilities for setting up telephonic connections between any of the local subscriber lines serviced thereby. In addition, subscribers in the Baker office 40 may call any of the lines in the Dexter office 42, any of the lines in the Hillside office 44 or operators in the information center 46 by dailing an appropriate directory number which is uniform throughout the multi-office system. Similarly, subscribers in the Hillside office 44 may call any of the lines in the Dexter office 42, any of the lines in the Baker office 40, or operators in the information center 46 by dialing the same uniform directory numbers. All of the subscribers serviced by the Dexter office 42 may call lines in the Baker office 40, the Hillside office 44 or operators in the information center 46 by dialing the same uniform directory numbers. In addition, a portion of the subscriber lines in the Dexter office 42 are given a superior grade of service so that by dialing a prefix digit of "9" they can obtain a direct trunk to the main dial office 48 over which they may dial numbers corresponding to any of the lines in the main dial office 48. In the illustrated embodiment, the remaining lines in the Dexter office 42 and all of the lines in the Baker office 40 and the Hillside office 44 must dial the long distance operator in the information center 46 in order to obtain a connection to the main dial office 48, charges for such calls being made individually by the long distance operator. Lines serviced by the main dial office 48 may, by seizing trunks to the Dexter office 42, dial any of the lines in any of the offices 40, 42 or 44 and may also dial the information center 46, although this latter procedure is not generally employed except by operators or the like.

In order to establish the above described telephonic connections between the various offices of the system, each of the electronic offices 40, 42 anod 44 is provided with facilities for converting the electronic signals normally employed therein to set up connections between the local subscriber lines into corresponding signals which may be transmitted over conventional electromechanical trunk circuits which are used to interconnect the offices 40, 42 and 44. More particularly, the Baker office 40 includes facilities for establishing connections to the Dexter office 42 over any one of a group of twenty one-way loop dialing trunks commonly identified as the trunks 50 and for establishing connections to the information center 46 over any one of a group of eight trunks commonly identified as the trunks 52 in Fig. 1 or over any one of a group of three trunks commonly identified as the trunks 54. The trunks 54 are employed to select special services in the information center 46 and the trunks 52 are employed to establish connections to the operator at the information center 46 who in turn establish calls to the main dial office 48 through the Dexter office 42.

In a similar manner, the Dexter office 42 is provided with facilities for extending connections to the Baker office 40 over any one of a group of twenty trunks commonly identified as the trunks 56, to the Hillside office 44 over any one of a group of twenty trunks commonly identified as the trunks 58 and to the information center 46 over a group of three trunks 60, which are used for special services, or any one of a group of four trunks 62 which are employed by the restricted lines in the Dexter office 42 to set up calls through the operator's switchboard in the information center 46 to the main dial office 48. In addition, the Dexter office 42 includes facilities for extending connections to the main dial office 48 over any one of a group of twenty trunks commonly identified as the trunks 64 and of receiving calls from the main dial office 48 over any one of a group of twenty trunks commonly identified as the trunks 66.

The Hillside office 44 includes facilities for extending connections to the Dexter office 42 over any one of a group of twenty trunks commonly identified as the trunks 68 and for setting up connections to the information center 46 over any one of a group of three trunks 70, which are used for special services, or over any one of a group of eight trunks commonly identified as the trunks 72 which are used for calls to the main dial office 48. The information center 46 includes electromechanical facilities for performing the desired special services, as will be described in more detail hereinafter, and further includes facilities for setting up connections from the operator's switchboard through any one of a group of twenty trunks commonly identified as the trunks 74 to the Dexter office 42, the office 42 further including facilities for routing these calls to the main dial office 48 or to the offices 40 and 44. The main dial office 48 includes conventional electromechanical facilities for setting up connections between the lines serviced thereby, for receiving calls over the trunks 64 from the Dexter office 42 and for establishing connections over the trunks 66 to the Dexter office 42.

In the illustrated embodiment all of the trunks 50 to 74, inclusive, comprise one-way loop dialing trunks and in order to simplify description of the invention no return supervision facilities have been included in connection with these trunks. However, it will be understood that normally the trunks 64 and 66 between the Dexter office 42 and the main dial office 48 would consist of two-way trunks provided with return supervision, as will be readily understood by those skilled in the art. In this connection it will be understood that the number of trunks, i.e., twenty, between the offices 42 and 44 is not normally required to handle the traffic between offices of the indicated size. However, this high percentage trunking has been used to illustrate how such trunking may be handled in an electronic-electromechanical system employing the principles of the present invention.

In order to provide a uniform directory numbering system for the multi-office system of Fig. 1, each of the community dial offices 40, 42 and 44 is provided with facilities for absorbing certain dial digits if the call is a local one or employing these initial dialed digits to route the call to one of the other offices over the above described electromechanical trunks. More particularly, the five hundred lines in the Baker office 40 are assigned directory numbers BA–511 to BA–500, BA–611 to BA–600, BA–711 to BA–700, BA–811 to BA–800, and BA–911 to BA–900, it being understood that the directory designation BA is dialed as successive digits of "2" and "2." The four hundred lines in the Dexter office are assigned directory numbers DE–511 to DE–500, DE–611 to DE–600, DE–711 to DE–700, and DE–811 to DE–800, it being understood that the directory designation DE is dialed as the successive digits "3" and "3." In the Hillside office 44 the five hundred local subscriber lines serviced thereby are assigned the directory numbers HI–511 to HI–500, HI–611 to HI–600, HI–711 to HI–700, HI–811 to HI–800, and HI–911 to HI–900, it being understood that the directory designation HI is dialed as the successive initial digits "4" and "4."

The information center 46 may be reached by a subscriber at any one of the offices 40, 42 and 44 over the indicated trunks 54, 60 and 70 by dialing two initial digits of "1" and "1" and thereafter dialing particular special service desired. Thus, information service is obtained by dialing "113," repair service is obtained by dialing "114," the business office is reached by dialing "115," the time of day is obtained by dialing "116," and weather information is obtained by dialing "117." Long distance calls from any of the offices 40, 42 or 44, except for certain preferred subscribers in the Dexter office 42, are extended through the indicated trunks 52, 62 and 72 to the information center 46 by dialing "0" to reach the operator's switchboard at the information center 46. The operator at the information center 46 then places the call through the Dexter office 42 to the main dial office 48. However, certain preferred subscribers in the Dexter office 42 may obtain a direct trunk to the main dial office 48 by dialing a prefix digit "9" and then dialing the desired main dial office number.

In order to provide the above described uniform directory numbering system in the multi-office system of Fig. 1, the electronic facilities in each of the community dial offices 40, 42 and 44 are provided with drop-back selector facilities for absorbing the first two digits of the called number on local calls within the community dial office and for extending the connection to one of the other electronic offices in accordance with the first two dialed digits on calls intended for the other offices. Thus, if the line BA–511 in the Baker office 40 calls the line BA–600 in the same office, the subscriber dials successive digits of "2," "2," "6," "0," and "0." The electronic facilities in the office 40 do not respond to the first two dialed digits "2" and "2" but respond to the remaining digits "600" by routing the call to the line BA–600 in the office 40. If the line BA–511 desires to call the line DE–600 in the Dexter office, the electronic facilities in the office 40 respond to the first digit "3" by routing the call over one of the trunks 50 to the Dexter office 42, the electronic facilities in the office 42 absorb the second dialed digit of "3" and respond to the last three digits "600" by establishing a connection to the line DE–600 in the office 42. In a similar manner, if the line BA–500 in the office 40 wishes to call the line HI–600 in the Hillside office 44 the electronic facilities in the office 40 respond to the first digit "4" by routing the call over one of the trunks 50 to the Dexter office 42, the electronic facilities in the office 42 respond to the second digit of "4" by routing the call over one of the trunks 58 to the Hillside office 44 and the electronic facilities in the Hillside office 44 then respond to the last three digits "600" by establishing the connection to the line HI–600 serviced thereby.

If the line BA–511 in the Baker office 40 wishes to call any one of the special services available at the information center 46 he dials the directory number assigned thereto and the electronic facilities in the office 40 respond to the first two digits of "1" and "1" by routing the call over one of the three trunks 54 to the information center 46 and the electromechanical facilities at the information center 46 respond to the last digit of the special service number by completing the connection to the desired special service facilities. If the subscriber at the line BA–511 desires to call any one of the lines available through the main dial office 48, he dials the digit "0" and the electronic facilities in the Baker office 40 respond thereto by establishing a connection to the operator in the information center 46 over one of the trunks 52. In an entirely similar manner, any one of the lines in the offices 42 and 44 may establish calls to any one of the lines in the other offices, the information center 46 or the main dial office 48.

In the information center 46 each of the trunks 54, 60 and 70 from the offices 40, 42 and 44 is terminated in an incoming selector which responds to the last digit of the special service number by routing the connection to the desired special service number. Thus, the trunks 54*a*, 54*b* and 54*c* from the Baker office 40 are terminated in the incoming selectors 76*a*, 76*b* and 76*c*, the incoming trunks 60*a*, 60*b* and 60*c* from the Dexter office 42 are terminated in the incoming selectors 78*a*, 78*b* and 78*c* and the incoming trunks 70*a*, 70*b* and 70*c* from the Hillside office 44 are individually terminated in the incoming selectors 80*a*, 80*b* and 80*c*. Each of the selectors 76, 78 and 80 comprise conventional electromechanical facilities for responding to the last dialed digit by routing the call over the illustrated common connection to one of the trunk circuits associated with the desired special service. Thus, if the information digit "3" is dialed the call is routed to one of the trunk circuits 82a, 82b and 82c provided for the information operator. If the repair service digit "4" is dialed the call is routed to the trunk circuit 84 provided for the repair service line. If the business office digit "5" is dialed the call is routed to one of the trunk circuits 86a, 86b and 86c provided for the business office operator. If the time of day digit "6" is dialed the call is routed to the trunk circuit 88 provided for the automatic announcing facilities and if the weather digit "7" is dialed the call is routed to the trunk circuit 90 provided for the automatic weather announcing facilities.

All of the incoming trunks 52a, 52b to 52h, inclusive, 62a, 62b to 62d, inclusive, and 72a, 72b to 72h, inclusive, from the offices 40, 42 and 44 terminate in the long distance operator's switchboard at the information center 46 and calls may be established to the operator's switchboard by dialing the long distance digit "0." The long distance operator has available the twenty outgoing trunks 74 to the Dexter office 42 and the electronic facilities in the office 42 extend the connection through this office and over the trunks 64 to the main dial office 48 to complete the desired call.

Figure 3:
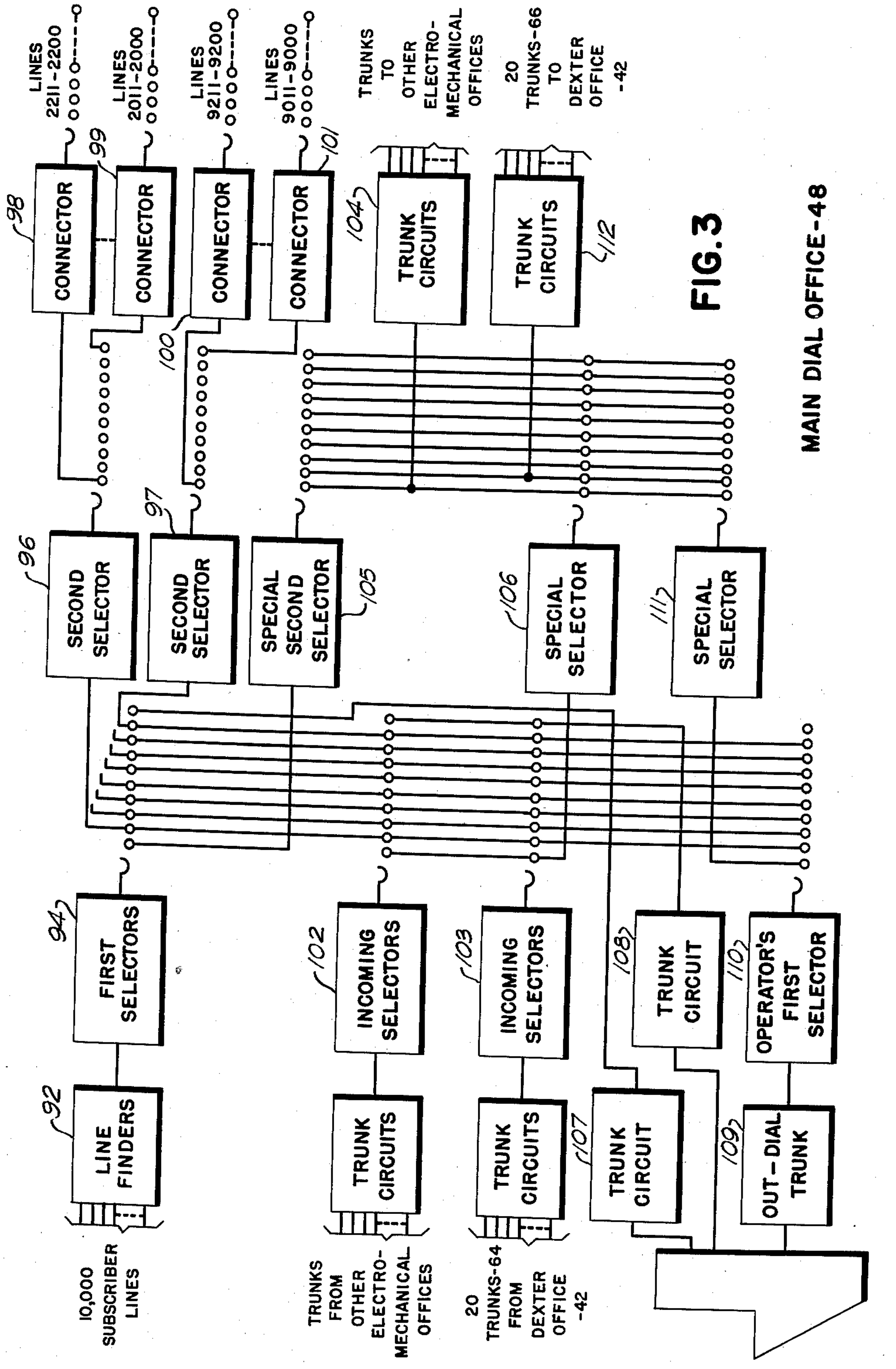
Fig. 3 is a block diagram of the components of the main dial office of the system of Fig. 1.
Figure 4:
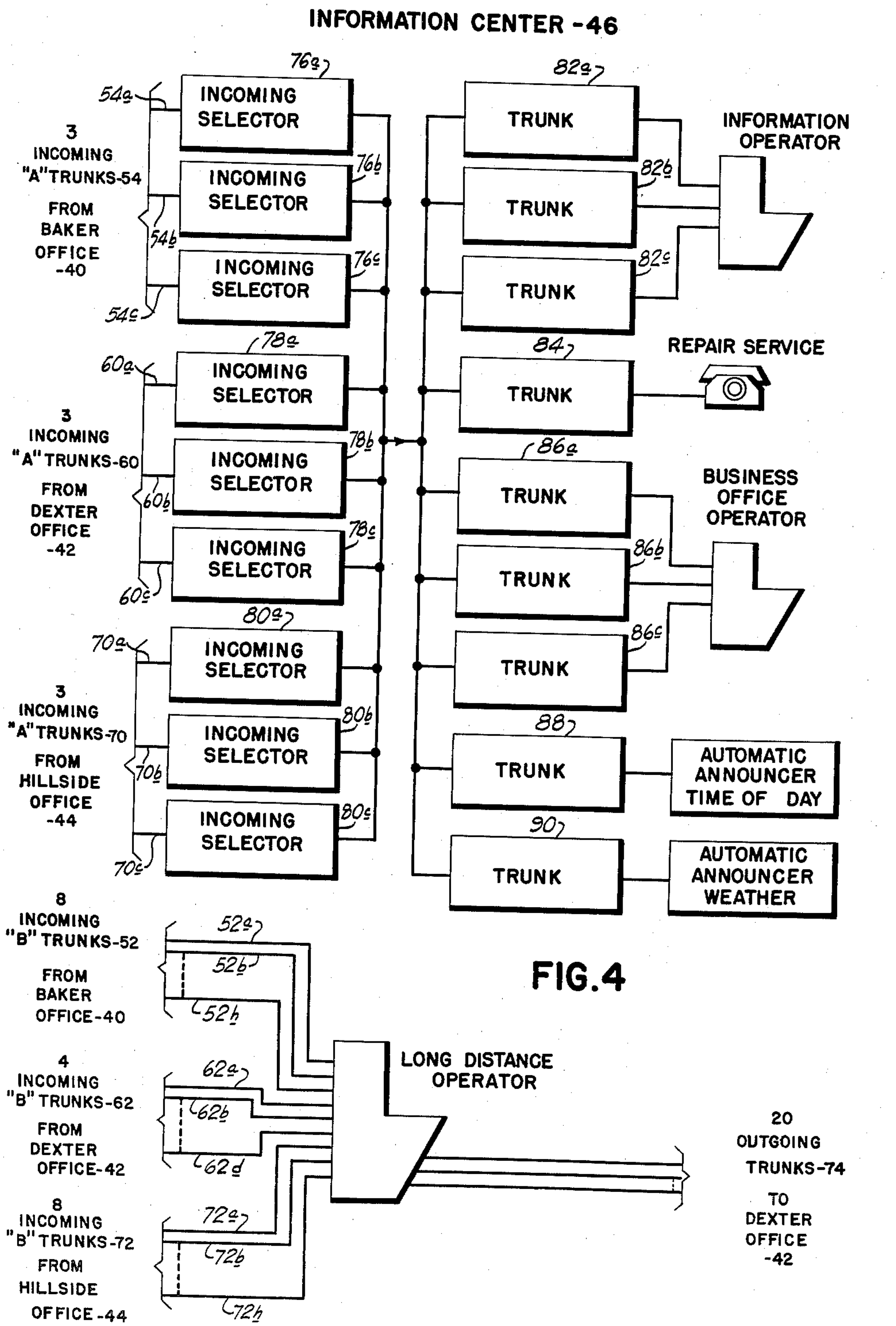
Fig. 4 is a block diagram of the components of the information center in the system of Fig. 1.

While the main dial office 48 may comprise any suitable arrangement of electromechanical facilities in the illustrated embodiment a 10,000 subscriber line system is shown in block diagram form in Fig. 3 wherein the line finders 92, first local selectors 94, second selectors 96 and 97 and connectors 98, 99, 100 and 101 are normally employed to set up connections between the lines of the system. In addition, a group of incoming selectors 102 is provided for terminating trunks for other electromechanical offices and a group of twenty incoming selectors 103 is provided for terminating the twenty trunks 64a, 64b, 64c to 64t, inclusive, from the Dexter office 42. The first selectors 94 may gain access to the trunk circuits 104 which terminate trunks to other electromechanical offices, through the special second selector 105 and the incoming selectors 102 and 103 may gain access to the trunk circuits 104 through the special selector 106. The operator may be reached from the first selectors 94 through the trunk circuit 107 and the incoming selectors reach the operator through the trunk circuit 108. The operator is provided with an out-dial trunk circuit 109 and reaches the selectors 96 and 97 through an operator's first selector 110. The operator also has access to the trunk circuits 104 through the special selectors 111. The trunk circuits 112 terminating the trunks 66 may be reached through either the selectors 105, 106, or 111 on calls intended for the Dexter office 42.

Referring now, more particularly, to Figs. 5 to 10, inclusive, there is illustrated therein in block diagram form the line and linkage equipment provided in the electronic community dial office 40 to service the associated five hundred subscriber lines and to set up connections between offices in the manner described generally above. The common equipment of the Baker office 40 has not been shown in the drawings since this equipment may be substantially identical to the common equipment of the electronic telephone system shown and described in detail in the copending application of Frank A. Morris and Robert B. Trousdale, Serial No. 326,213, filed December 16, 1952, and assigned to the same assignee as the present invention. Also, many of the component units of the system shown in Figs. 5 to 10, inclusive, are substantially identical to the corresponding units shown and described in detail in the above identified copending application Serial No. 326,213, and, where possible, the same reference numerals have been employed to identify these similar units with the prefix "B" to indicate that the component unit is employed in the Baker office.

Figure 5:
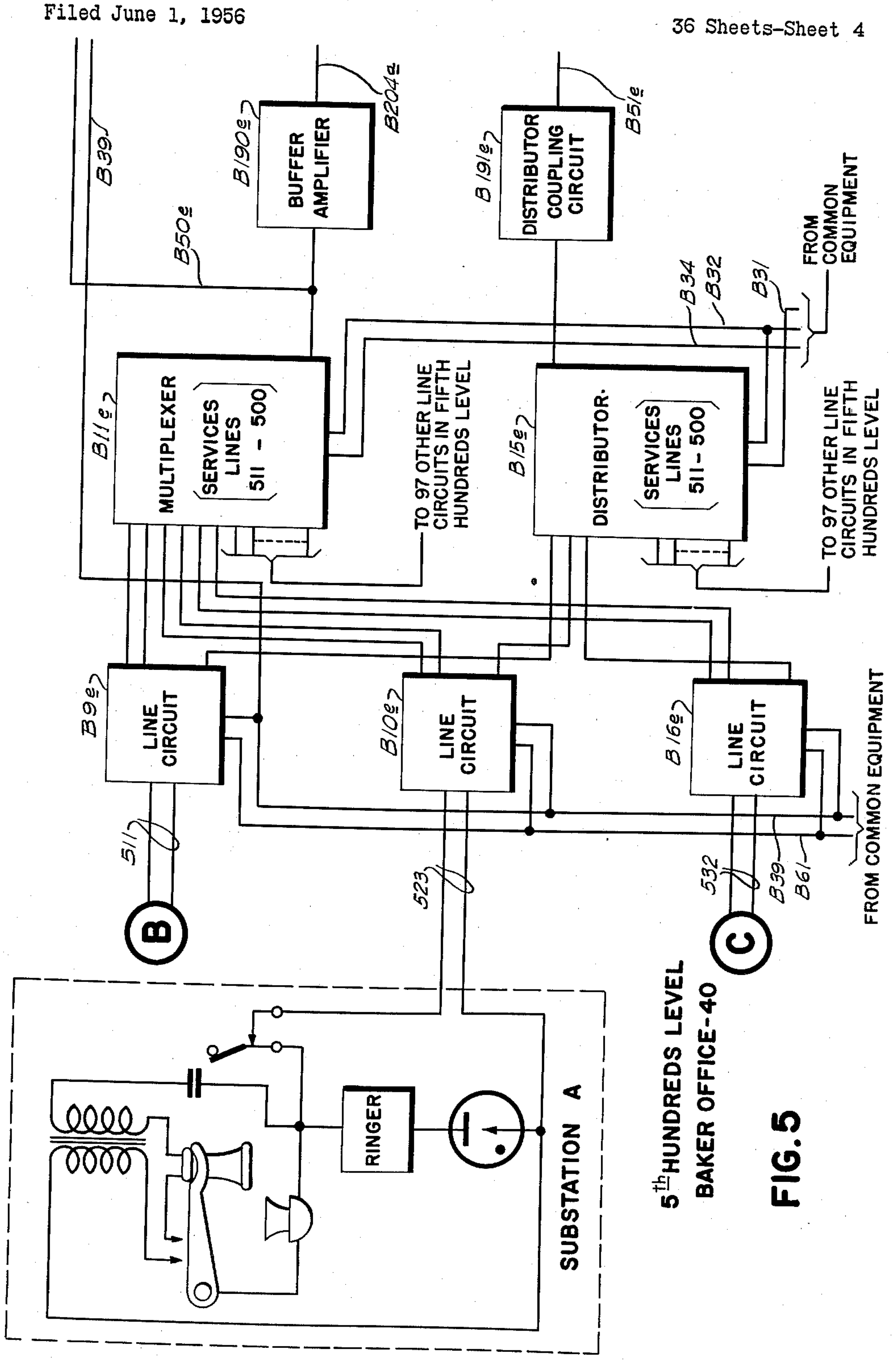
Figure 6:
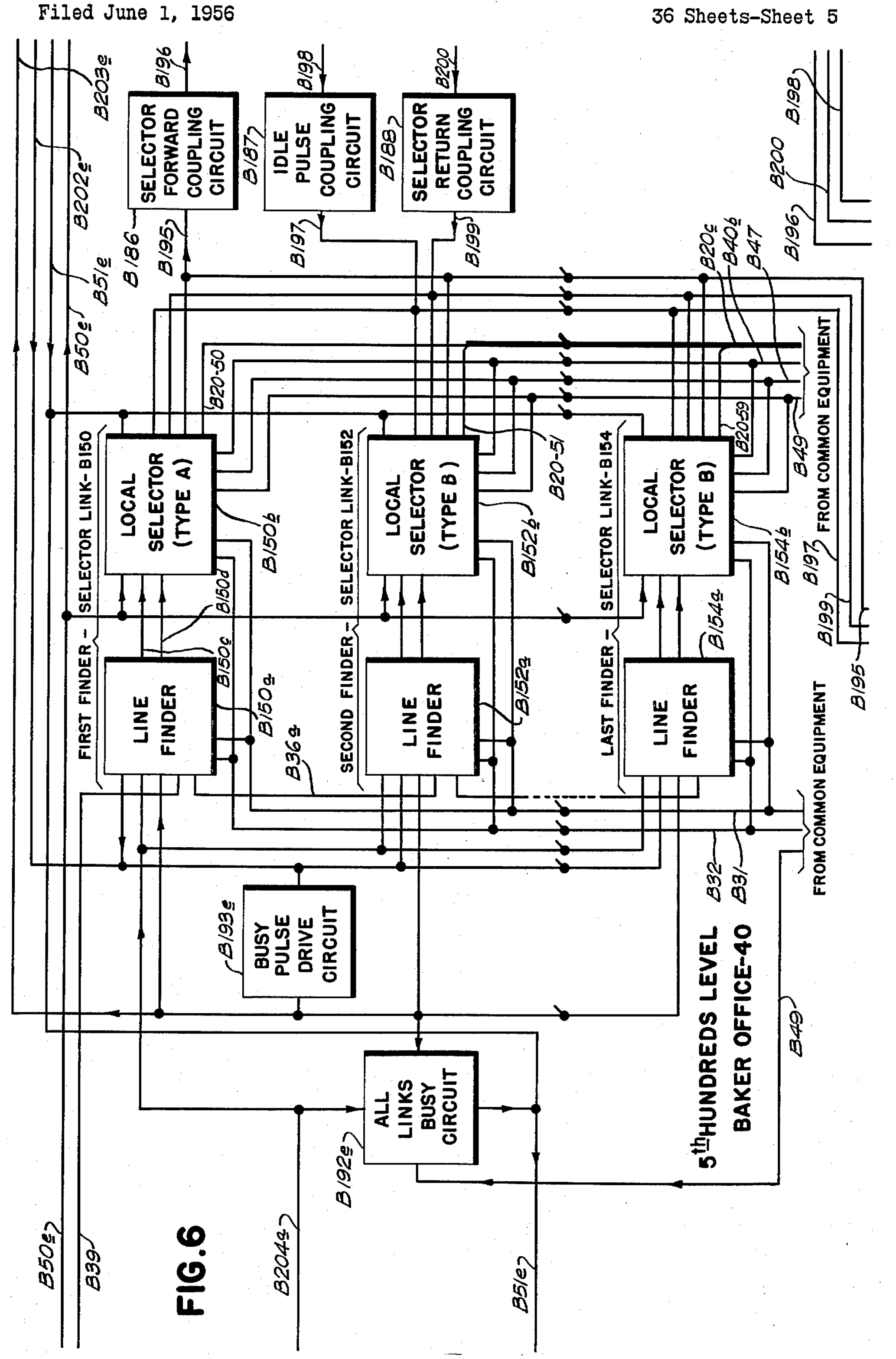
Figure 7:
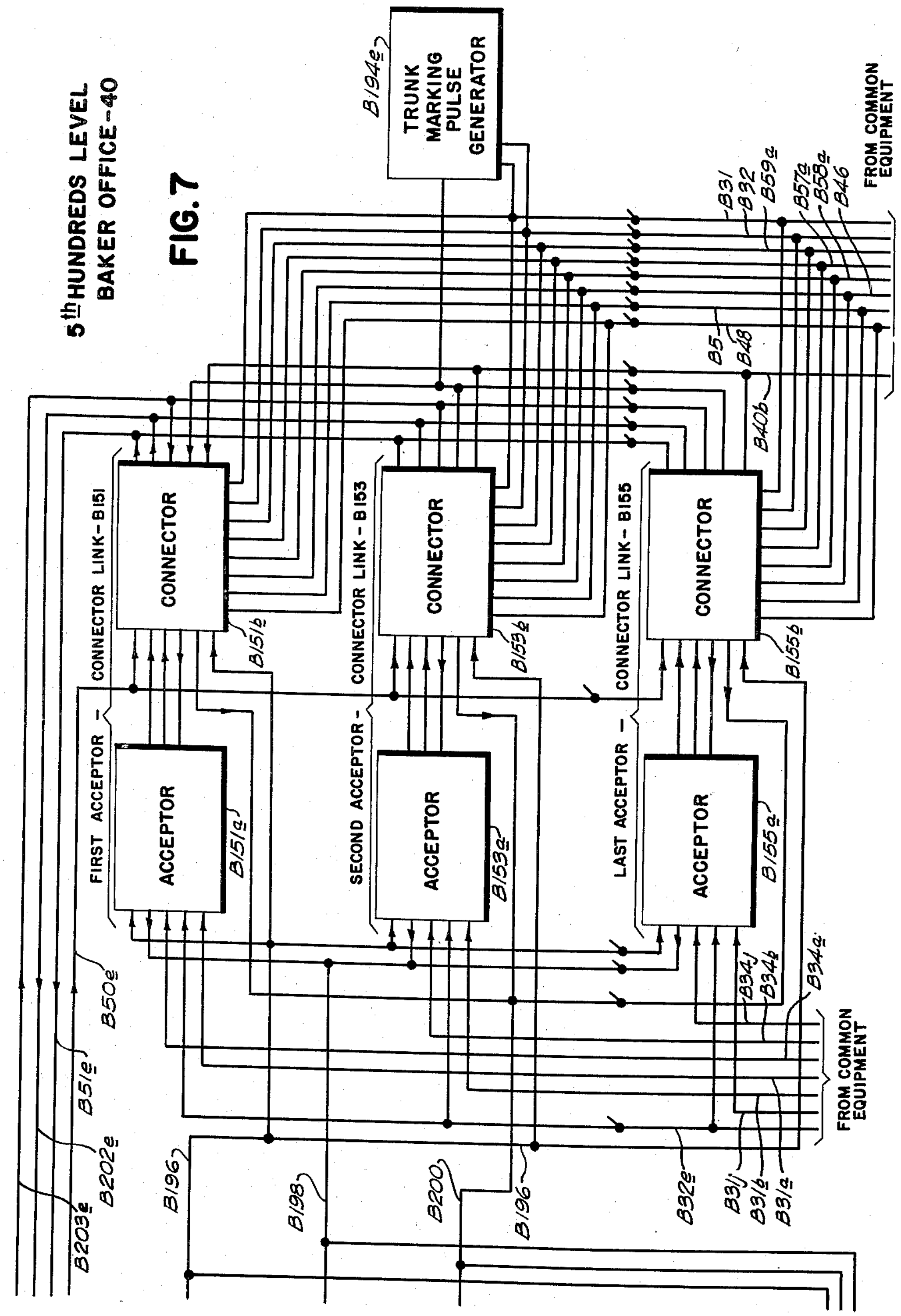
Figure 8:
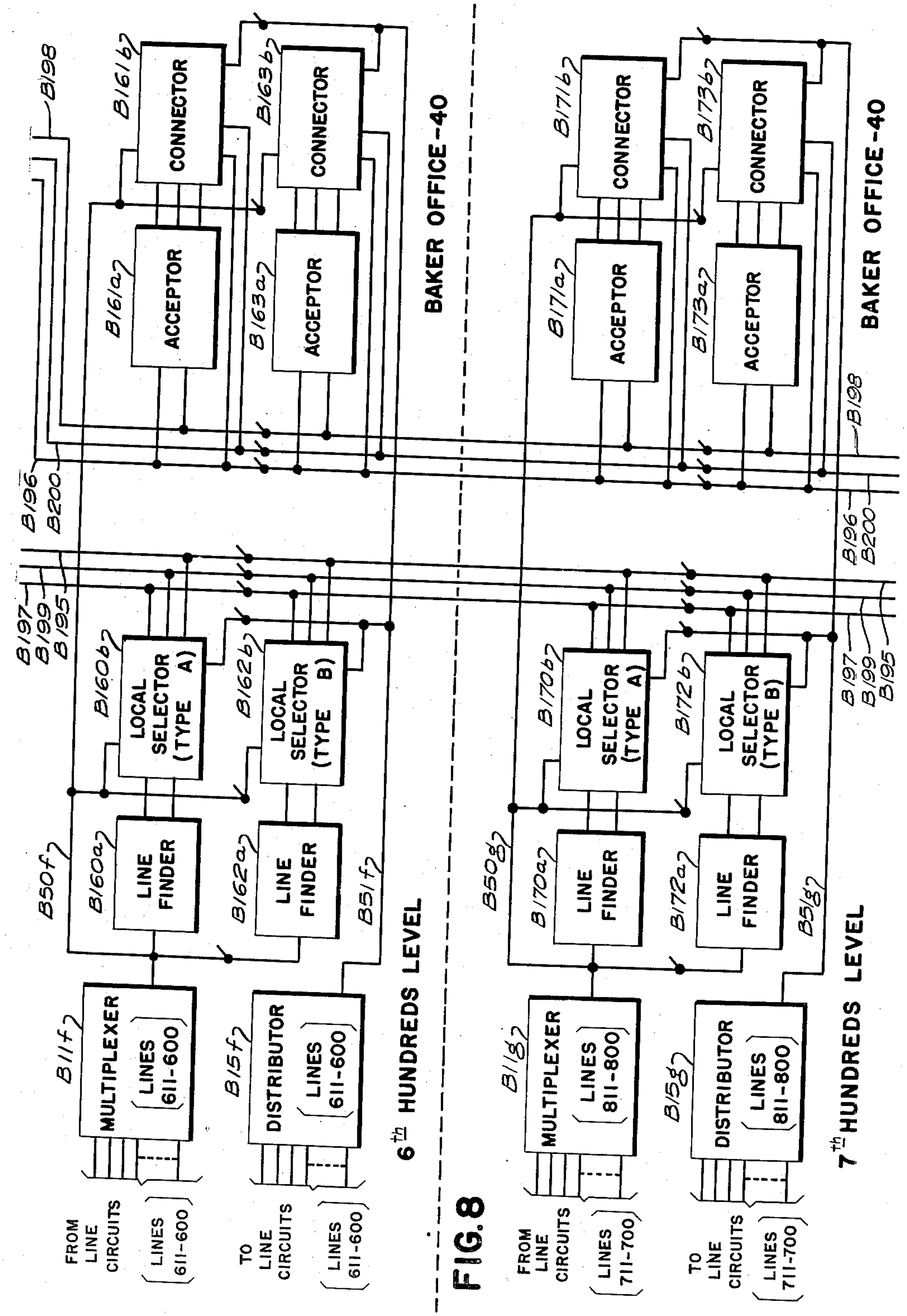
Figure 9:
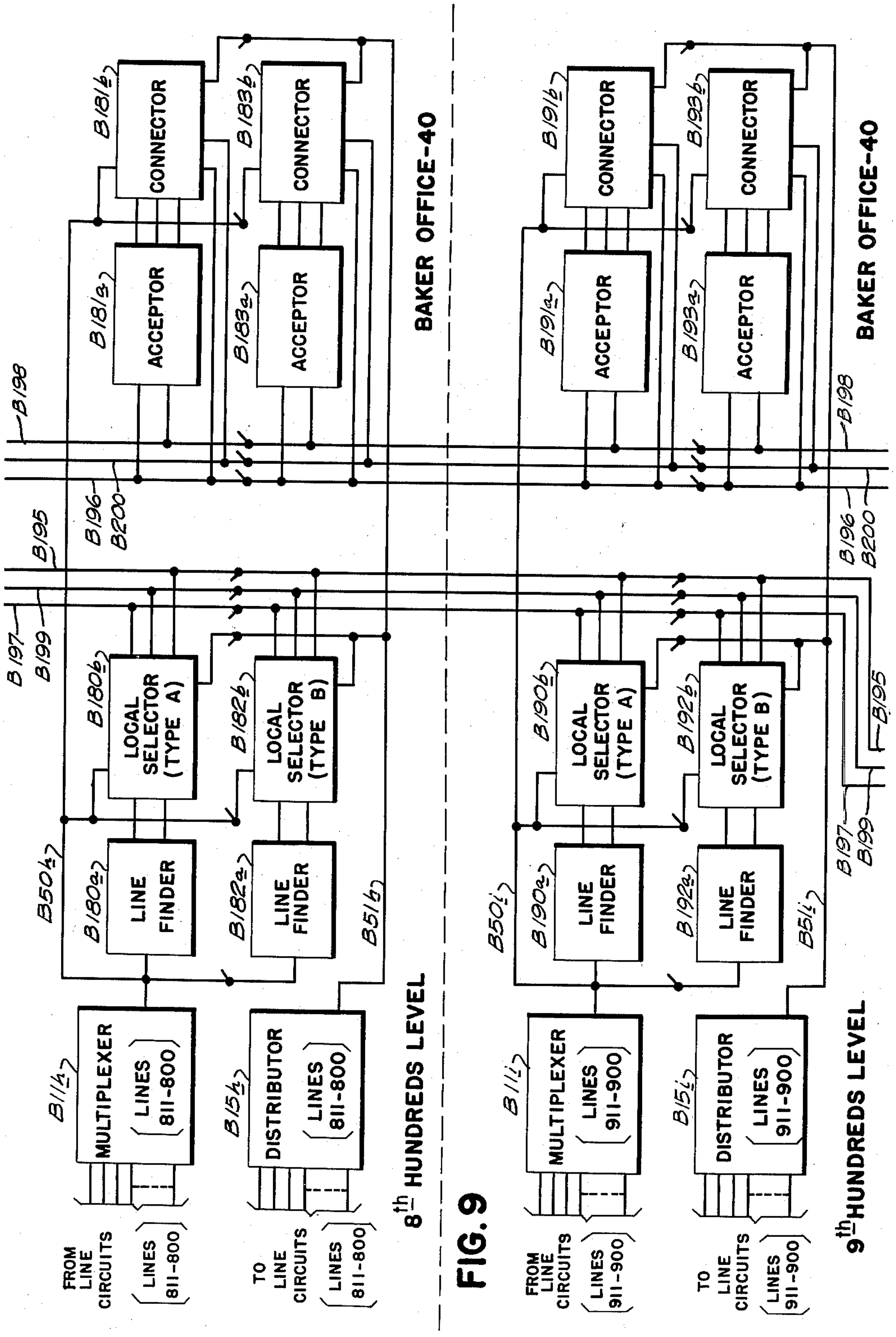
Figure 10:
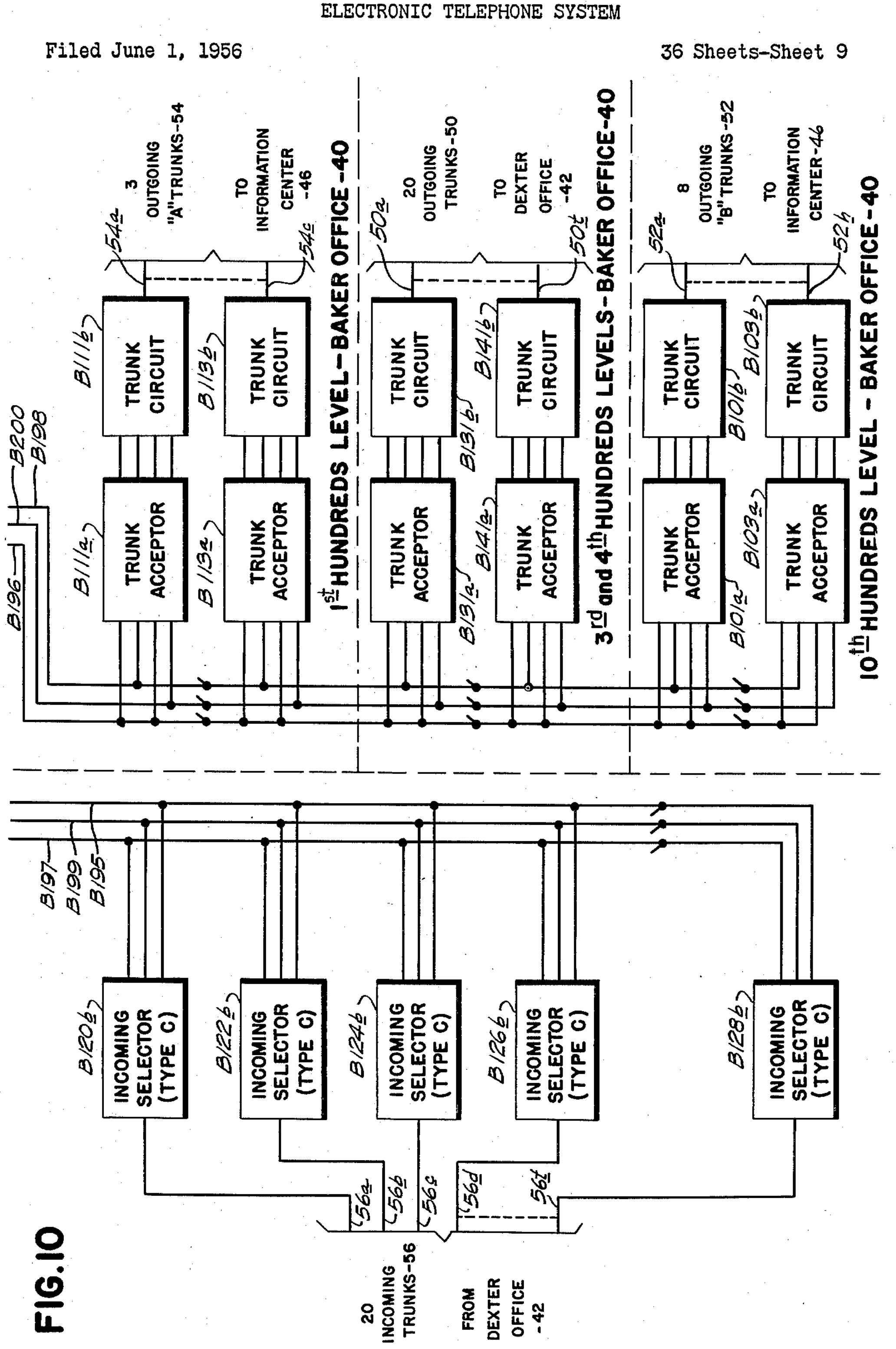

In the Baker office 40, only five hundred subscriber lines are serviced and the fifth, sixth, seventh, eighth and ninth hundreds levels are employed to service these lines and to set up telephonic connections therebetween. The first hundreds level in the Baker office 40 is assigned to the outgoing trunks 54 to the information center 46, the third and fourth hundreds levels in the Baker office are assigned to the group of twenty trunks 50 extending to the Dexter office 42 and the tenth hundreds level of the Baker office is assigned to the group of eight trunks extending to the information center 46. Referring to Figs. 5, 6 and 7 wherein the line and linkage equipment in the fifth hundreds level is shown in some detail, the one hundred lines assigned to the fifth hundreds level in the Baker office 40, such as the illustrated lines 511, 523, and 532, are individually terminated in the line circuits B9e, B10e, B16e, respectively, and these line circuits extend to the multiplexer B11e and the distributor B15e which service the lines assigned the numbers 511 to 500, inclusive.

In the Baker office 40, as in the other electronic offices 42 and 44 of the system of Fig. 1, a basic time position frame of 100 time positions is employed, these time positions being individually assigned to different lines in each hundreds level of the system, each time position having a duration of approximately one microsecond so that the overall time position frame which comprises one hundred time positions has a duration of one hundred microseconds. The multiplexer B11e samples signals produced on any one of the lines in the fifth hundreds level in the time position assigned thereto and transmits signal modulated multiplexer pulses over the conductor B50e to the local selectors B150b, B152b and B154b in the fifth hundreds level, these multiplexer pulses also being transmitted through the buffer amplifier B190e and over the conductor B204a to the line finders B150a, B152a and B154a in the fifth hundreds level. While only three finder-selector links B150, B152 and B154 have been illustrated in the drawings, it will be understood that normally ten such links will be employed to handle the normal traffic of the one hundred lines assigned to the fifth hundreds level. However, it is pointed out that the local selectors are of two different types, the illustrated selector B150b being designated as a type A local selector and the illustrated local selectors B152b and B154b being of the indicated type B. In normal practice five type A local selectors and five type B local selectors would be employed in the fifth hundreds level of the Baker office 40, the type A and type B selectors being alternately allotted to simultaneously calling lines in the fifth hundreds level, as will be described in more detail hereinafter.

In the Baker office 40 the selector forward pulses developed by any one of the local selectors or incoming selectors of this office, which are impressed upon the common selector forward conductor B195, are amplified in a selector forward coupling circuit B186 and are transmitted over the conductor B196 to the acceptor-connector links and trunk acceptors of the system. In the fifth hundreds level a group of three acceptor-connector links B151, B153 and B155 are illustrated, it being understood that normally ten such acceptor-connector links are required to handle the normal traffic of the system. The connectors B151b, B153b and B155b are also supplied with multiplexer pulses over the conductor B50e and the connector pulses which are developed in the time positions assigned to called lines in the fifth hundreds level are transmitted over the conductor B51e and through the distributor coupling circuit B191e to the distributor B15e wherein they are distributed to the line circuits associated with the particular called lines. A calling and called line busying system is provided within the fifth hundreds level and includes the busy pulse drive circuit B193e which interconnects the busy pulse conductors B202e and B203e. In addition, an all links busy circuit B192e is connected between the multiplexer output conductor B204a and the distributor input conductor B51e to provide an indication to the calling subscribers when all of the linkage in the fifth hundreds level is busy.

On a call incoming to the fifth hundreds level in the Baker office 40 the selector return pulses, which are developed on the conductor B200 by any of the connectors or trunk acceptors of the office 40, are amplified in the selector return coupling circuit B188 and are transmitted over the conductor B199 to all of the local and incoming selectors of the Baker office 40 in the return direction. In order to indicate to the local and incoming selectors of the office 40 which ones of the acceptors of the office are busy, an idle pulse busying arrangement is employed wherein the idle pulses developed by the acceptors and trunk acceptors of the system are transmitted over the conductor B198 through the idle pulse coupling circuit B187 and over the conductor B197 to all of the local and incoming selectors of the system.

In the common equipment of the Baker office 40 there is provided facilities for sequentially developing units pulses which define the pulse time positions of each time position frame and appear sequentially on ten individual conductors B31a, B31b to B31j, inclusive, of the units pulse cable B31, these units pulses being supplied from the common equipment to the distributor B15e in the fifth hundreds level, as well as to the other distributors in the sixth, seventh, eighth and ninth hundreds levels, to the line finders B150a, B152a and B154a and local selectors B150b, B152b and B154b in the fifth hundreds level, as well as the other line finders and local selectors in the sixth, seventh, eighth and ninth hundreds levels to the connectors B151b, B153b and B155b in the fifth hundreds level as well as to the connectors in the sixth, seventh, eighth and ninth hundreds levels. Individual ones of the units pulse conductors are also supplied to the acceptors and trunk acceptors of the system. Thus, the first acceptor B151a in the fifth hundreds level of the Baker office 40 is supplied with units pulses over the conductor B31a, the second acceptor B153a is supplied with units pulses over the conductor B31b and the last or tenth acceptor B155a is supplied with units pulses over the conductor B31j.

The common equipment is also provided with facilities for developing successive tens pulses, each of which spans the time interval of ten successive units pulses, these tens pulses being sequentially produced on ten conductors B32a, B32b to B32j, inclusive, forming the illustrated cable B32. These tens pulses are supplied to the distributor B15e and the multiplexer B11e in the fifth hundreds level of the Baker office 40, as well as to the multiplexers and distributors in the sixth, seventh, eighth and ninth hundreds levels of the office 40, and to the line finders, local selectors and connectors in the fifth, sixth, seventh, eighth and ninth hundreds levels. In addition, certain ones of the tens pulses are impressed upon the acceptors or trunk acceptors in each hundreds level to define the time positions permanently assigned thereto. Thus, the acceptors B151a, B153a and B155a in the fifth hundreds level have impressed thereon pulses from the fifth tens pulse conductor B32e, the acceptors B161a, B161c in the sixth hundreds level having impressed thereon pulses from the sixth tens pulse conductor B32f, etc.

The common equipment of the Baker office 40 also includes facilities for developing very narrow channel pulses within each time position which are sequentially developed on ten channel pulse conductors B34a, B34b to B34j, forming the illustrated cable B34, which are supplied to the gate circuits of the multiplexer B11e in the fifth hundreds level, as well as the multiplexers in the sixth, seventh, eighth and ninth hundreds level. Linkage sampling pulses in each time position, which are also of relatively narrow width, are developed in the common equipment on the common output conductor B40b and are transmitted to all of the local selectors, trunk acceptors and incoming selectors in the office 40. The common equipment also includes facilities for developing a combined bias voltage and multiplex ringing current signal, which is supplied over the conductor B61 to all of the line circuits of the system, it being understood that if party line service is provided on any line of the system a suitable party line ringing arrangement may be employed as described in detail in the above identified copending application Serial No. 326,213. In the event that consecutive number hunting facilities are required in any particular hundreds level of the system a trunk marking pulse generator, such as the generator B194e in the fifth hundreds level may be employed, this generator being energized from the units pulse cable B31 and the tens pulse cable B32 and supplying trunk or line marking pulses to all of the connectors in the same hundreds level, the common equipment also supplying trunk hunting drive pulses over the conductor 59a to all of the connectors of the system. The common equipment also includes facilities for developing a supervisory carrier signal which is transmitted over the conductor B39 to all of the line circuits of the system and to the first line finder in each hundreds level to perform a finder allotting function so that successive line finders in each hundreds level will seize successive simultaneously calling lines, as described in detail in the above identified copending application Serial No. 326,213. Thus, the conductor B39 is connected to the first finder B150a and when this finder is operatively associated with a calling line a signal is supplied over the conductor B36a to the second finder B152a to condition this finder to handle the second call originating in the fifth hundreds level.

The common equipment also includes facilities for developing selector allotting pulses of approximately one time position frame duration successively on one hundred selector allotting conductors forming the illustrated cable B20c individual conductors of which are supplied to individual ones of the local and incoming selectors in the Baker office 40. Thus, the conductor B20–50 or the cable B20c is supplied to the local selector B150b, the conductor B20–51 is supplied to the local selector B152b, and the conductor B20–59 is supplied to the local selector B154b in the fifth hundreds level. The common equipment also includes facilities for generating a 60 i.p.m. busy tone signal which is supplied over the conductor B46 to all of the connectors of the system, and a 120 i.p.m. busy tone signal which is supplied over the conductor B49 to the all links busy circuit in each hundreds level and to the local and incoming selectors in each hundreds level. The common equipment also includes facilities for developing a dial tone signal which is transmitted over the conductor B47 to all of the local selectors of the system. In the event conversation timing facilities are required the common equipment may also include facilities for developing conversation timing pulses on the conductor B57a which are supplied to all of the connectors of the system and also a conversation timing warning tone signal which is supplied over the conductor B58a to all of the connectors of the system. In the event harmonic ringing is employed in conjunction with a party line system a harmonic ringing code start signal may be supplied from the common equipment over the conductor B5 to all of the connectors of the system and different harmonic ringing signals may be supplied over individual conductors of the illustrated harmonic ringing cable B48 to each of the connectors of the system, as described in detail in the above identified copending application Serial No. 326,213. All of the above described common equipment facilities may be substantially identical to the corresponding units shown and described in detail in the above identified copending application, Serial No. 326,213 and hence a detailed description of these units is considered unnecessary herein.

However, it is pointed out that in the system of the present invention the selector-forward pulses are not standardized in an acceptor drive circuit but instead are shown as being applied directly to the acceptors as well as the connectors of the system to simplify description of the present invention.

In the sixth hundreds level of the Baker office the line and linkage facilities have been illustrated in simplified form and the line circuits associated with individual lines, buffer amplifiers, common equipment, allotting and busy pulse channel connections have been omitted. However, it will be understood that the illustrated components of the line and linkage equipment in the sixth hundreds level are supplied with and energized by the appropriate signals as described in detail above in connection with similar linkage in the fifth hundreds level. More particularly, the sixth hundreds level comprises the multiplexer B11*f* which services the lines numbered 611 to 600, inclusive, the distributor B15*f*, a group of five line finders and type A local selectors, such as the finder B160*a* and the selector B160*b*, and a group of five line finders and type B local selectors, such as the finder B162*a* and the selector B162*b*. The sixth hundreds level also includes a group of ten acceptor-connector links including the acceptors B161*a* and B163*a* and the associated connectors B161*b* and B163*b*. In the seventh hundreds level there is provided the multiplexer B11*g*, the distributor B15*g*, a group of five line finders and type A local selectors, such as the link B170*a*, B170*b*, a group of five line finders and type B local selectors such as the links B172*a*, B172*b*, and a group of ten acceptor-connector links B171*a*, B171*b* and B173*a*, B173*b*. In the eighth and ninth hundreds levels similar units are employed, the units in the eighth hundreds level being identified by the letter "*h*" and the units in the ninth hundreds level being identified by the letter "*i*."

In the illustrated embodiment, the first hundreds level in the Baker office 40 is assigned to the group of three special service trunks 54. More particularly, in the first hundreds level there is provided a group of three trunk acceptors, two of which are illustrated as the trunk acceptors B111*a* and B113*a*, each of these trunk acceptors cooperating with the associated trunk circuits B111*b* and B113*b*, respectively, to convert the electronic pulse multiplex signals developed locally within the Baker office into suitable electromechanical signals which may be transmitted over the trunks 54*a* and 54*c* to the information center 46.

In the illustrated embodiment a high percentage trunking arrangement is employed between the Baker office 40 and the Dexter office 42 to provide for uniform directory numbering and to illustrate the manner in which high percentage trunking can be accomplished in accordance with the principles of the present invention. In order to permit such high percentage trunking, both the third and fourth hundreds levels in the Baker office 40 are assigned to extend connections over different ones of a group of twenty trunks to the Dexter office 42. More particularly, the third and fourth hundreds levels collectively include a group of twenty trunk acceptors B131*a* to B141*a*, inclusive, which function with their associated trunk circuits, such as the trunk circuits B131*b* and B141*b*, to convert the electronic pulse multiplex signals into suitable electromechanical signals which are transmitted over the individual ones of the trunks 50*a* to 50*t*, inclusive, to the Dexter office 42.

In the Baker office 40 the tenth hundreds level is assigned to a group of eight outgoing trunks 52 to the information center 46 and a plurality of trunk acceptors B101*a* to B103*a*, inclusive, are employed in conjunction with their associated trunk circuits, such as the trunk circuits B101*b* and B103*b*, to convert the electronic pulse multiplex signals into suitable electromechanical signals which are transmitted over the trunks 52*a* to 52*h*, inclusive, to the information center 46.

In order to convert incoming electromechanical signals from the Dexter office 42 into suitable electronic pulse multiplex signals each of the incoming trunks 56*a*, 56*b*, 56*c* to 56*t*, inclusive, is terminated in an incoming type C selector such as the illustrated selectors B120*b*, B122*b*, B124*b*, B126*b* and B128*b*, wherein the above described conversion is accomplished. These incoming selectors are not associated with any particular hundreds level in the Baker office 40, but are controlled by the same common equipment signals as the local selectors described above in connection with the fifth hundreds level in the Baker office 40, with the exception of slight modifications which will be described in more detail hereinafter.

The acceptors and trunk acceptors in the different hundreds levels in the Baker office 40 are permanently assigned different time positions in the basic one hundred time position frame. Assuming that consecutive time positions are numbered in accordance with conventional telephone practice in which "0" is the highest digit in each group, the three trunk acceptors in the first hundreds level of the Baker office 40 would be assigned the time positions 11, 12 and 13, respectively, the time positions 14, 15 to 10, inclusive, and 21, 22 to 20, inclusive, being idle in the Baker office 40. The twenty trunk acceptors in the third and fourth hundreds levels of the Baker office 40 are assigned the time positions 31, 32 to 30, inclusive, and 41, 42 to 40, inclusive. The ten acceptors in each of the fifth, sixth, seventh, eighth and ninth hundreds levels are respectively assigned the time positions 51, 52 to 50, inclusive, 61, 62 to 60, inclusive, etc. In the tenth hundreds level of the Baker office 40, the eight trunk acceptors are assigned the time positions 01, 02 to 08, inclusive, the time positions 09 and 00 being idle in the Baker office 40.

Referring now to Figs. 16 to 19, inclusive, there is shown therein in block diagram form the electronic line and linkage facilities employed in the Hillside office 44 to set up connections between the local subscriber lines and also to extends connections over the indicated electromechanical trunks to the Dexter office 42 and the information center 46. The line and linkage equipment employed in the fifth, sixth, seventh, eighth and ninth hundreds levels in the Hillside office 44 is generally similar to the corresponding portions of the above described equipment in the Baker office 40, the corresponding component units in the Hillside office being identified by the prefix "H." However, it will be understood that the common equipment employed in the Hillside office 44 is completely independent of the common equipment in the other electronic offices of the system of Fig. 1 and is not synchronized in any way with the common equipment employed in these other offices. In addition, it is pointed out that certain modifications are employed in the local selectors of the fifth, sixth, seventh, eighth and ninth hundreds levels of the Hillside office 44. More particularly, in the fifth hundreds level five type N local selectors, such as the illustrated selector H150*b* and five type O selectors such as the illustrated selector H152*b* are employed and are arranged to be alternately allotted to the use of calling lines in the fifth hundreds level in the same manner as the type A and type B local selectors in the Baker office 40. In each of the sixth, seventh, eighth and ninth hundreds levels five type N and five type O local selectors are employed, the modifications required in the type N and type O selectors being described in more detail hereinafter.

In the Hillside office 44 the first hundreds level includes a group of three trunk acceptors, such as the acceptors H111*a* and H113*a*, which are provided for the indicated one-way loop dialing trunks 70*a* and 70*c* to the information center 46. The second and third hundreds levels in the Hillside office 44 are assigned to a group of twenty outgoing trunks to the Dexter office 42, the trunk acceptors H121*a* to H131*a*, inclusive, being employed to convert the electronic pulse multiplex signals developed in the Hillside office 44 into suitable electromechanical signals which may be transmitted over the indicated trunks 68*a* to 68*t*, inclusive. The tenth hundreds level in the Hillside office 44 is assigned to a group of eight outgoing trunks to the information center 46, the trunk acceptors H101*a* and H103*a* being employed to extend the connections over the indicated trunks 72*a* and 72*h*. The twenty incoming trunks from the Dexter office 42 are individually terminated in a group of type P incoming selectors H120*b*, H122*b*, H124*b* to H128*b*, inclusive.

The common equipment provided in the Hillside office 44 may be substantially identical to that described above in connection with the Baker office 40 and as described in detail in the above identified copending application, Serial No. 326,213. The Hillside common equipment functions to provide a 100 time position frame of one hundred microseconds' duration, each time position having a duration of approximately one microsecond. The acceptors associated with the connectors in the fifth, sixth, seven, eighth and ninth hundreds levels, and the trunk acceptors in the other levels are permanently assigned time positions in a manner similar to that described above in connection with the Baker office 40. Thus, the first three time positions 11, 12 and 13 are assigned to the trunk acceptors serving the three outgoing trunks 70 to the information center 46, remaining time positions in the first hundreds level being unused. The time positions numbered 21, 22 to 20, inclusive, and 31, 32 to 30, inclusive, in the second and third hundreds levels in the Hillside office 44 are assigned to the trunk acceptor serving the group of twenty trunks identified as the trunks 68 going to the Dexter office 42. The time positions normally assigned to the fourth hundreds level are unused in the Hillside office 44. The time positions numbered 51, 52 to 50, inclusive, are assigned to the ten acceptors H151*a* to H153*a*, inclusive, associated with the connectors H151*b* to H153*b*, inclusive, serving the lines in the fifth hundreds level. In a similar manner the time positions numbered 61, 62 to 60, inclusive, are assigned to the ten acceptors in the sixth hundreds level, in the Hillside office 44, the time positions numbered 71, 72 to 70, inclusive, are assigned to the ten acceptors in the seventh level, the time positions numbered 81, 82 to 80, inclusive, are assigned to the ten acceptors in the eighth level and the time positions numbered 91, 92 to 90, inclusive, are assigned to the ten acceptors in the ninth level. The time positions 01, 02 to 08, inclusive, are assigned to the trunk acceptors serving the group of eight trunks 72 going to the information center 46, time positions 09 and "00" being unused.

Referring now more particularly to Figs. 11 to 15, inclusive, there is shown therein in block diagram form the line and linkage equipment employed in the Dexter office 42 to set up the above described telephonic connections in the system of Fig. 1. In general the Dexter office 42 is similar in arrangement to the Baker and Hillside offices described above. However, since only 400 local lines are serviced in the Dexter office 42 only the fifth, sixth, seventh and eighth hundreds levels are required to service these lines with the local selector and connector stages described above. In addition, the Dexter office 42 provides facilities for the above described high percentage trunking between this office and the Baker and Hillside offices. More particularly, in the Dexter office 42 two independent groups of selector-forward, selector-return and idle pulse conductors are employed in conjunction with two independent groups of trunk acceptors identified as type D and type E trunk acceptors, the type D trunk acceptors being associated with one group of selector-forward, selector-return and idle pulse conductors and the type E group of trunk acceptors being associated with the other group of such conductors. The local selectors in each of the fifth, sixth, seventh and eighth hundreds levels are also divided into two groups and the incoming selectors which terminate the different groups of twenty incoming trunks from the Baker office 40, the Hillside office 44 and the main dial office 48 are also divided into two groups. One group of local and incoming selectors is connected to the first group of selector-forward, selector-return and idle pulse conductors so that this group of selectors has access only to the type B trunk acceptors. The other group of local selectors and incoming selectors is connected to the other group of selector-forward, selector-return and idle pulse conductors so as to have access to the type E trunk acceptors. Ten type D trunk acceptors and ten type E trunk acceptors are provided in each of the second, fourth and ninth hundreds levels. However, the type D and type E trunk acceptors in each of these hundreds levels are assigned the same pulse time positions so that with only ten pulse time positions available in any particular hundreds level a total of twenty outgoing trunks may be accommodated in each level.

In order that both groups of local and incoming selectors may have access to the acceptor-connector links in the fifth, sixth, seventh and eighth hundreds levels so as to complete calls to the lines in the Dexter office 42, there is provided a third group of selector-forward, selector-return and idle pulse conductors which are connected to the acceptor-connector links in the fifth, sixth, seventh and eighth hundreds levels and are connected to both groups of local and incoming selectors. In order to permit local subscribers to place calls to the information center 46, the trunk acceptors in the first and tenth hundreds levels are also connected to this third group of selector-forward, selector-return and idle pulse conductors.

Figure 11:
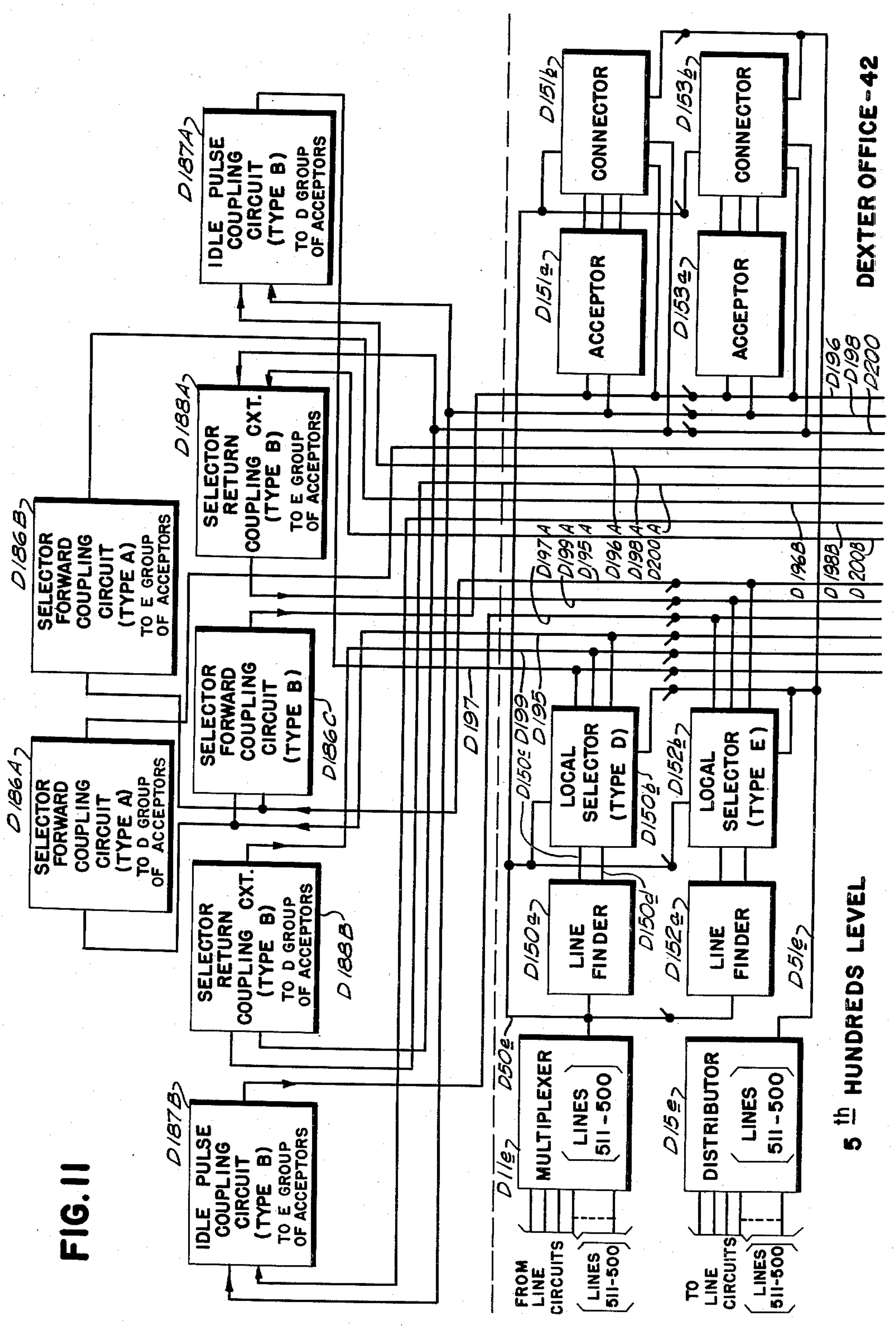
Figure 12:
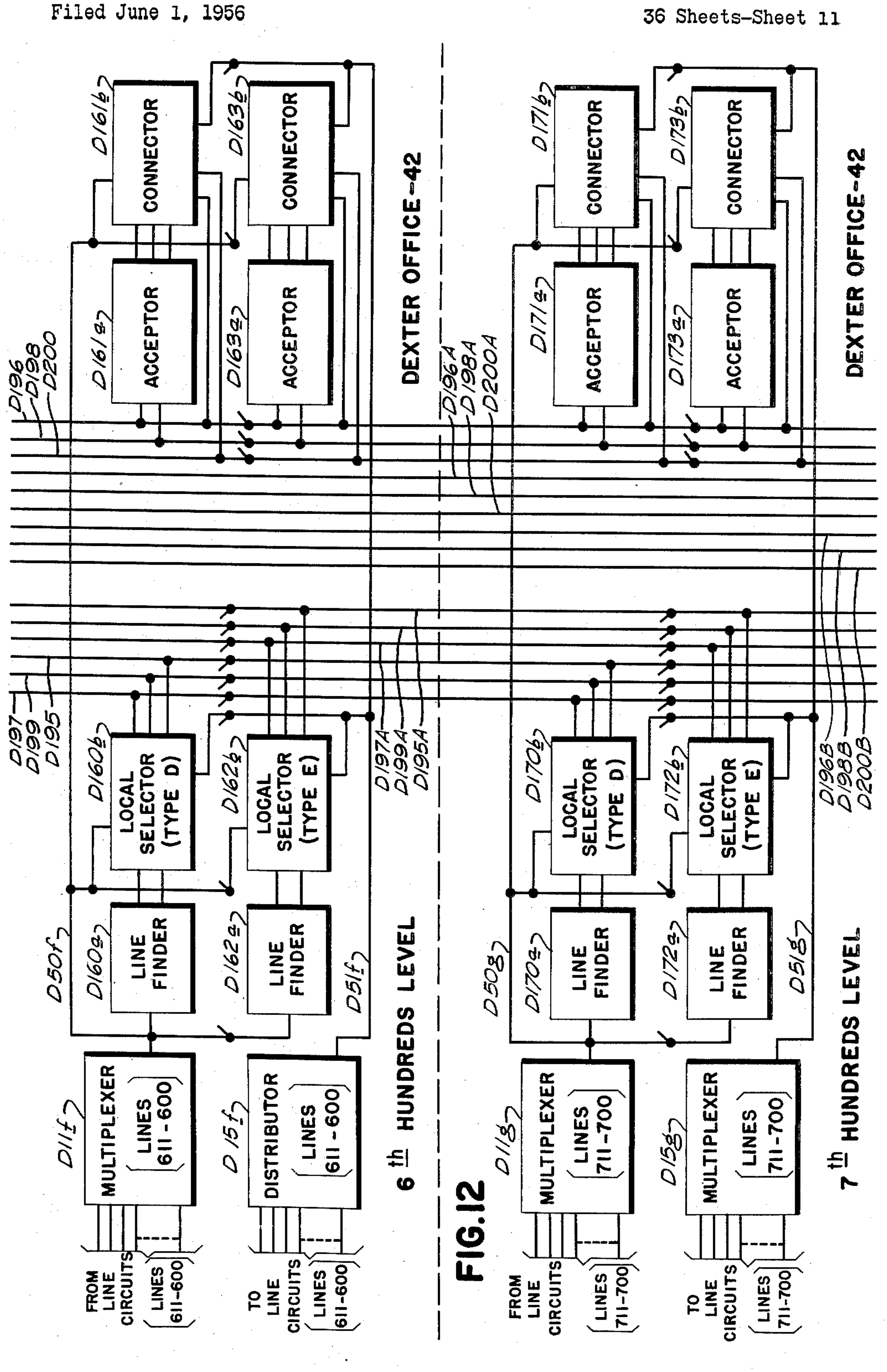
Figure 13:
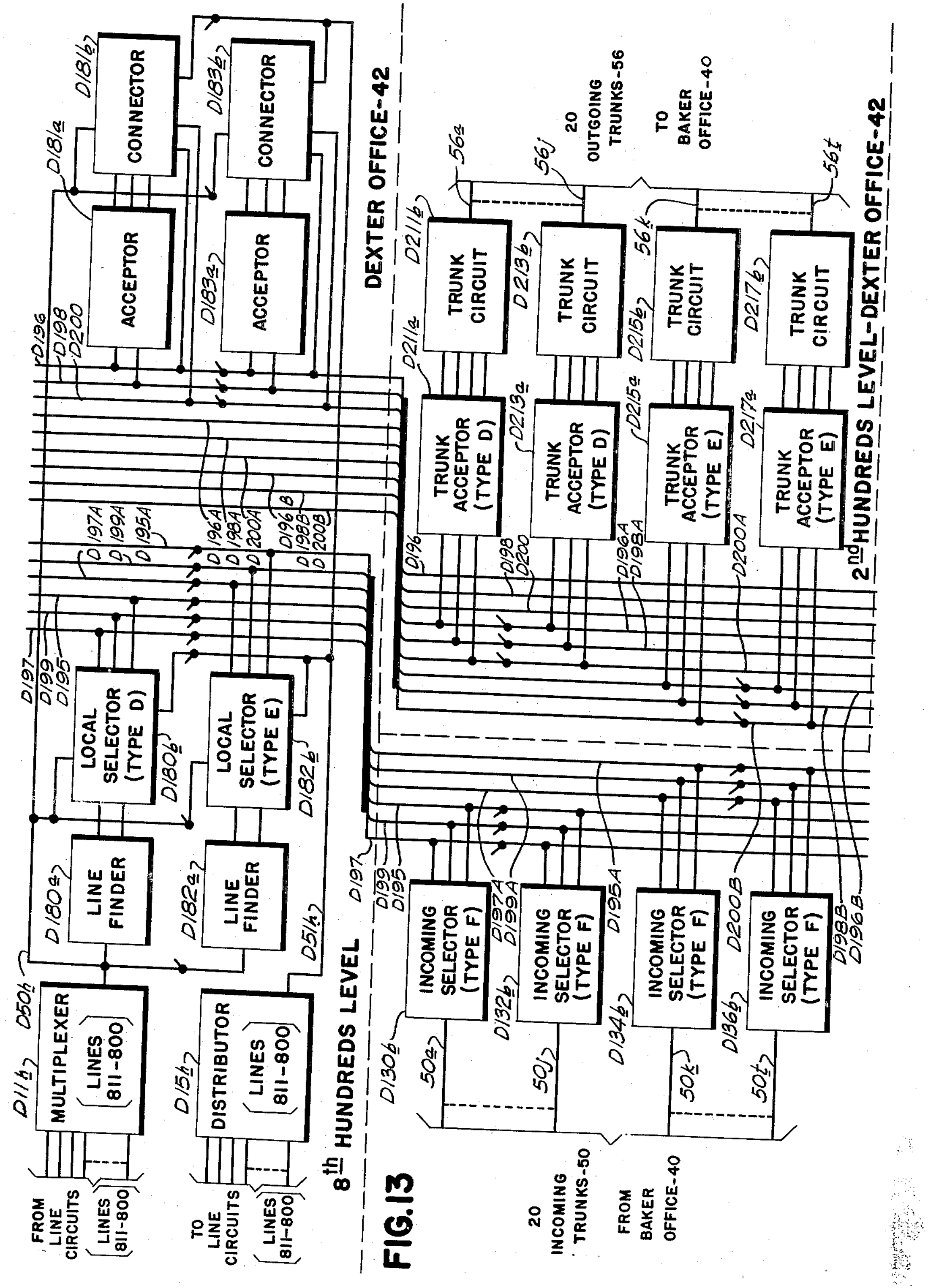
Figure 14:
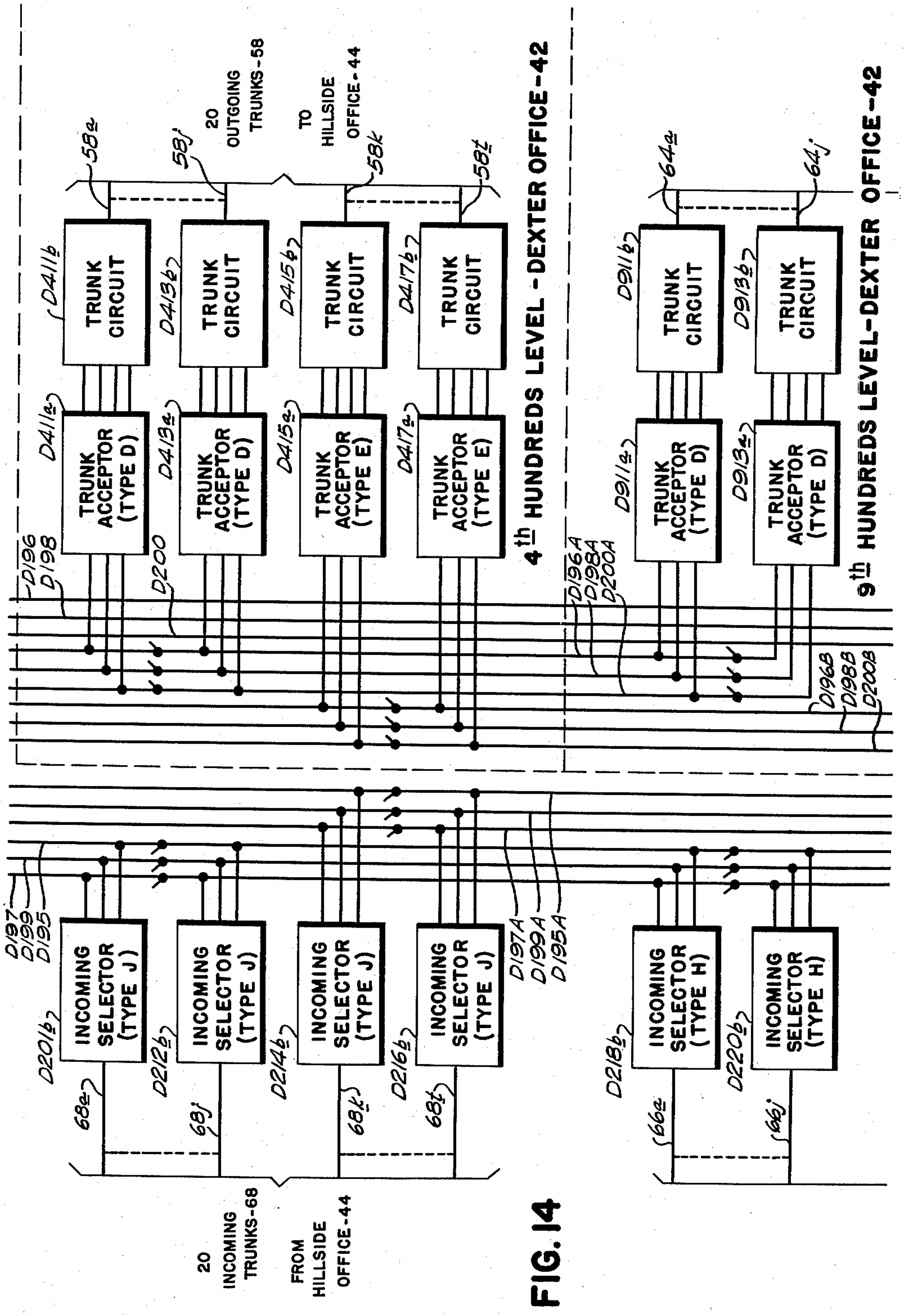
Figure 15:
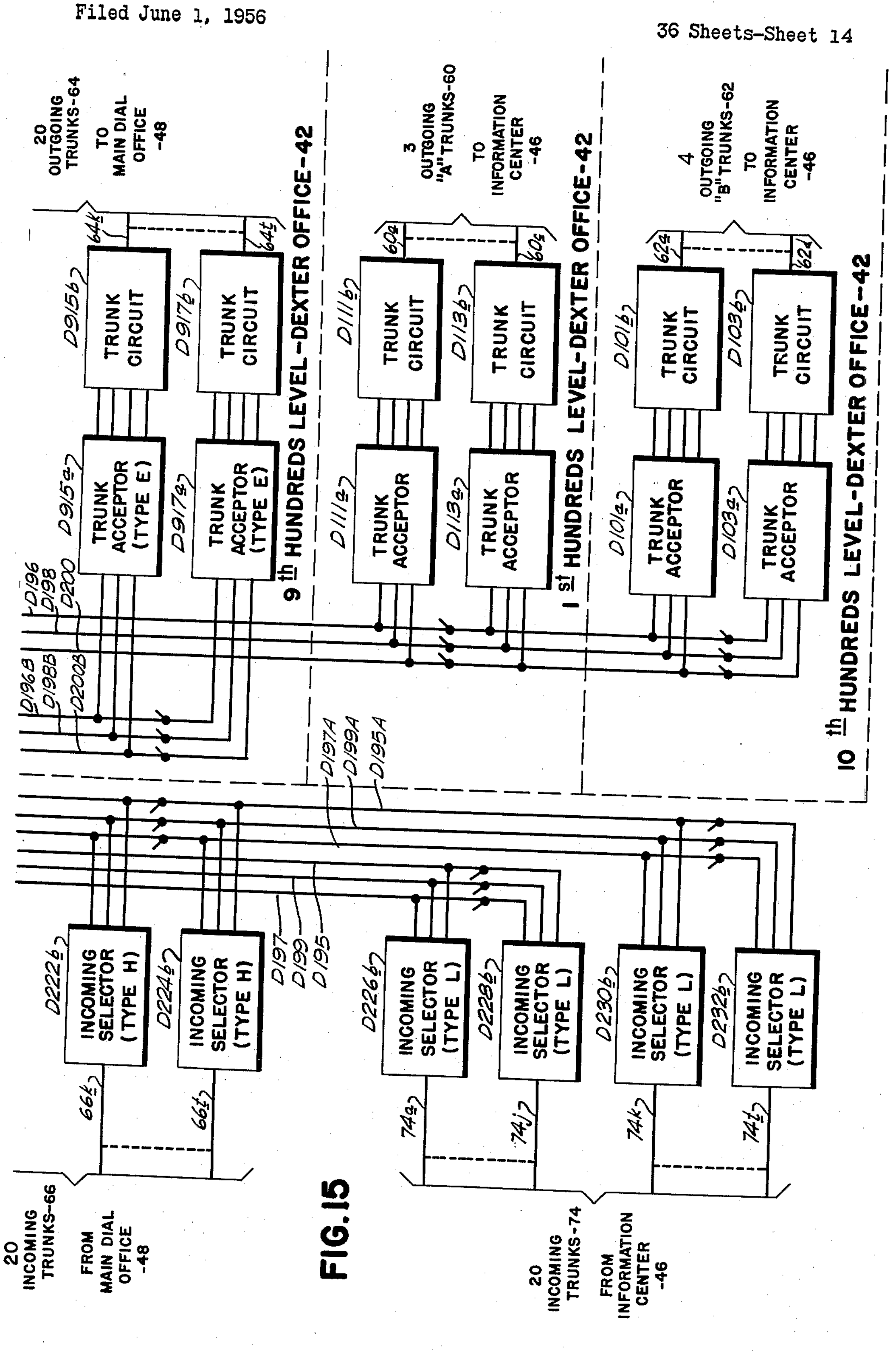
Figure 16:
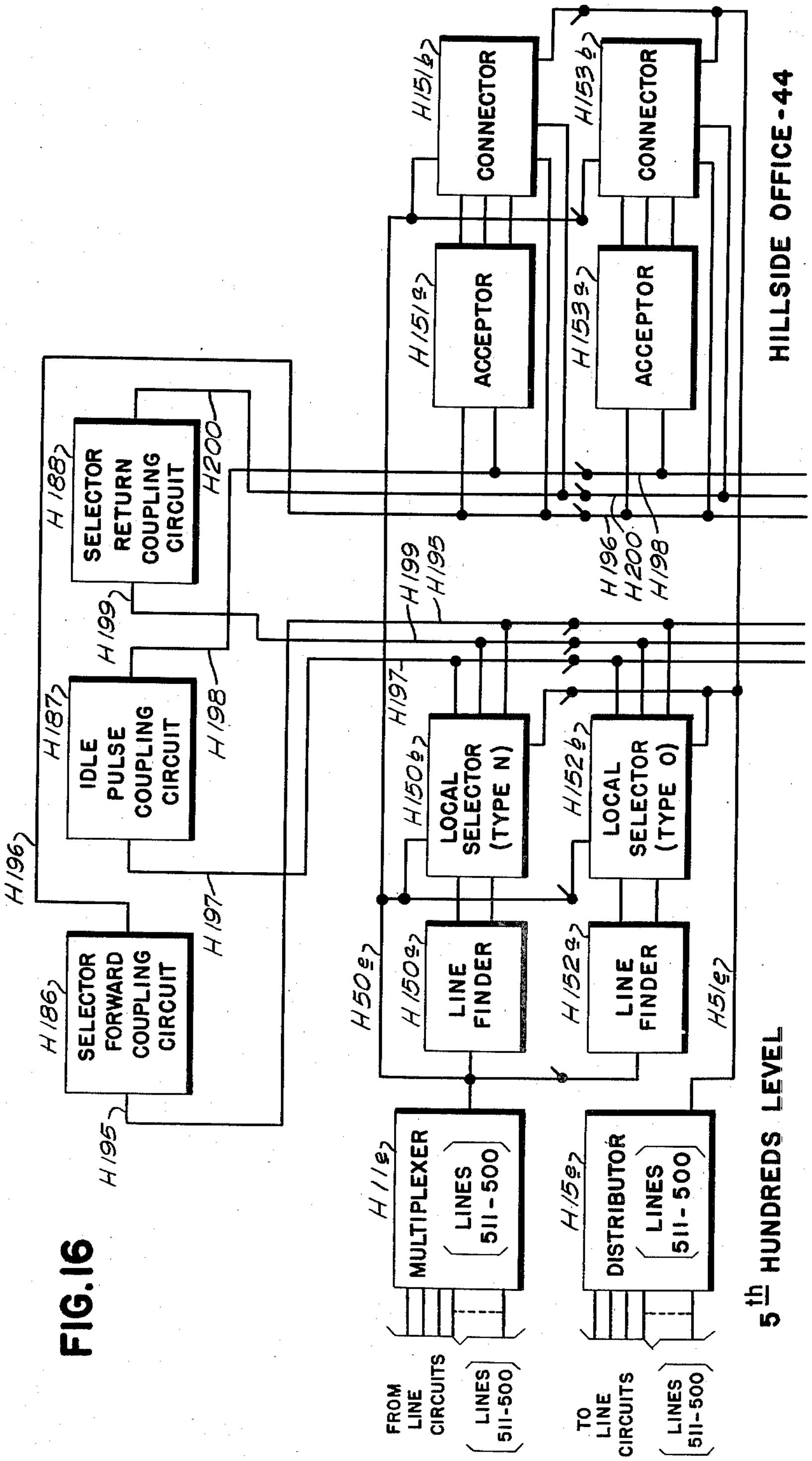
Figure 17:
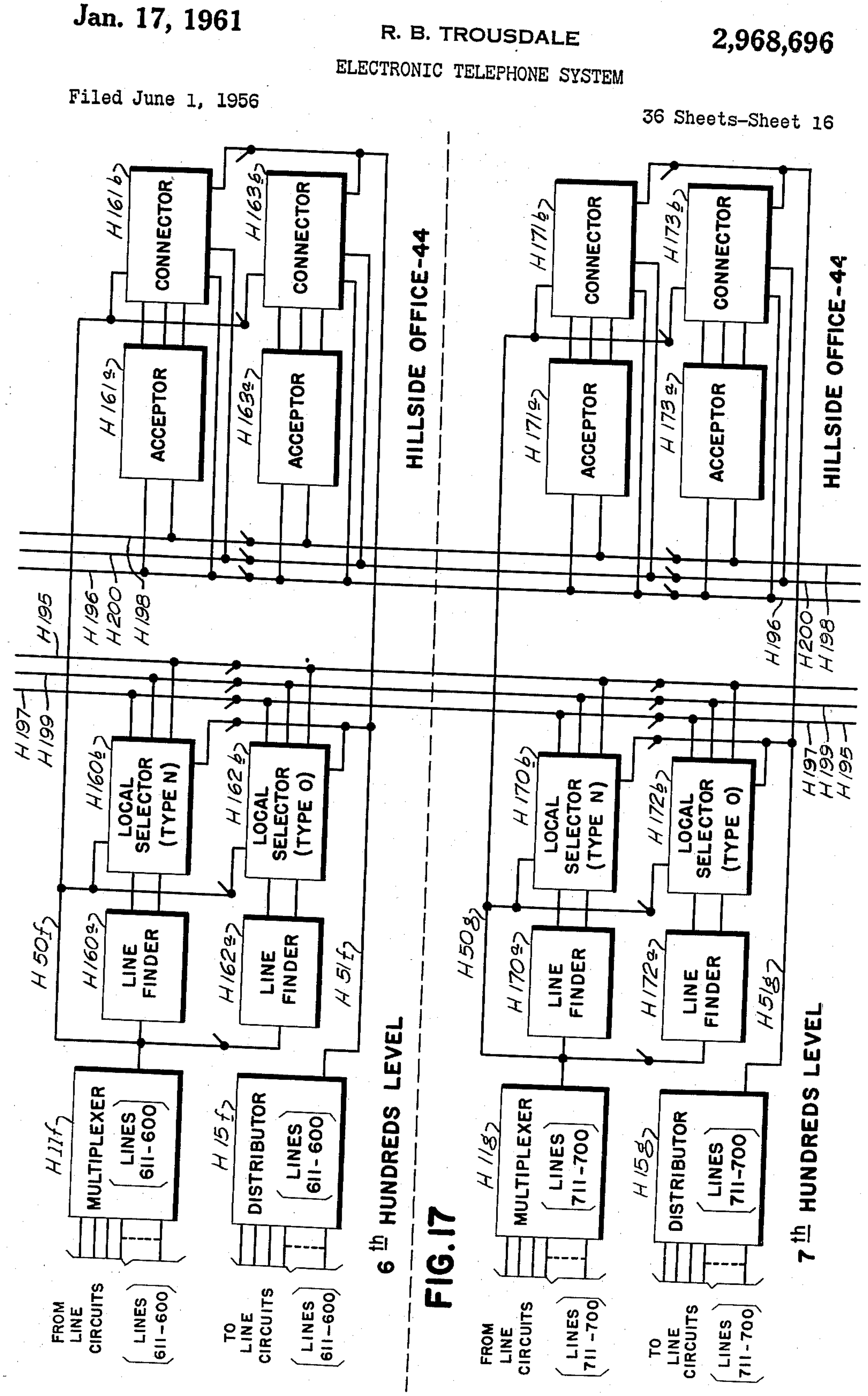
Figure 18:
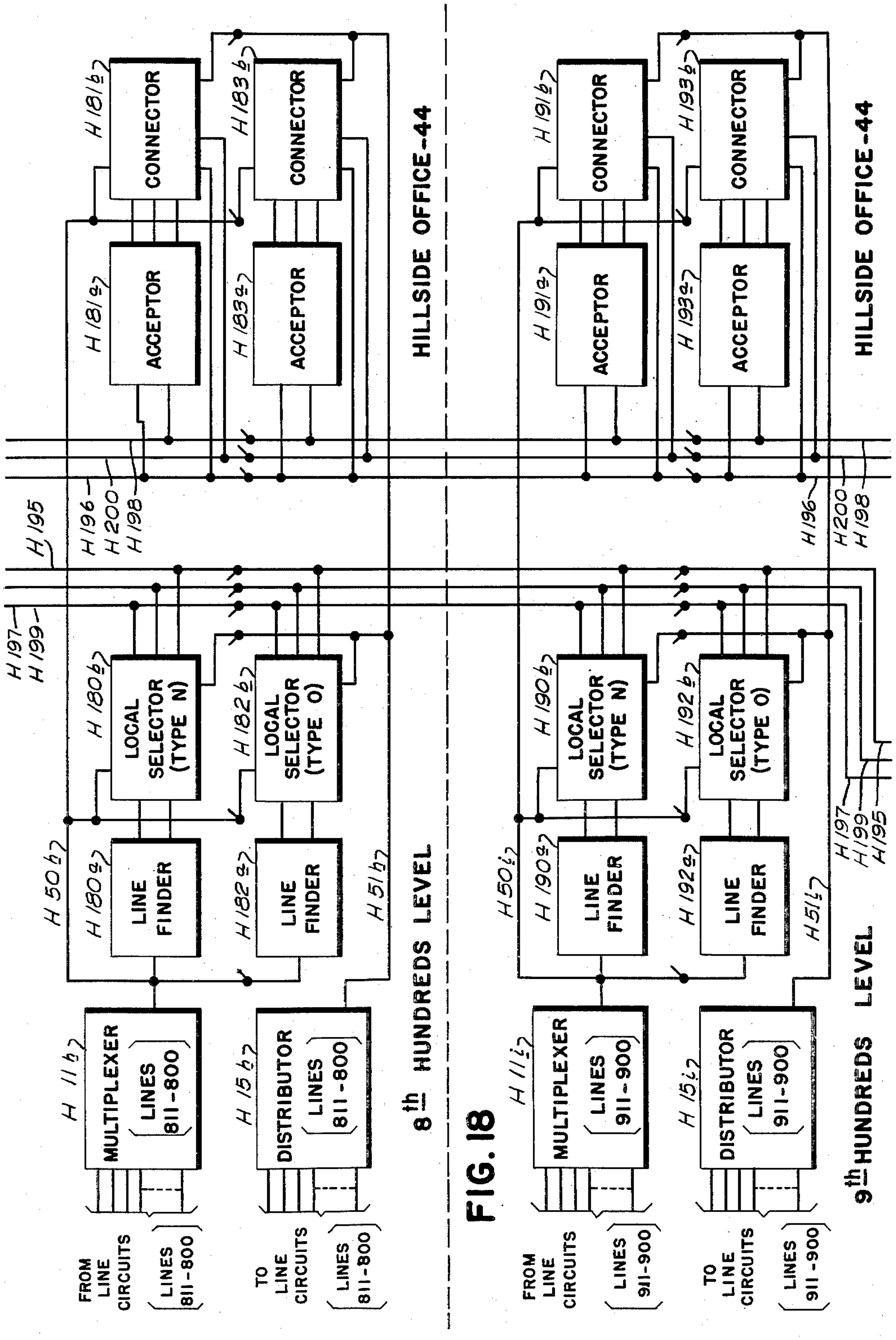
Figure 19:
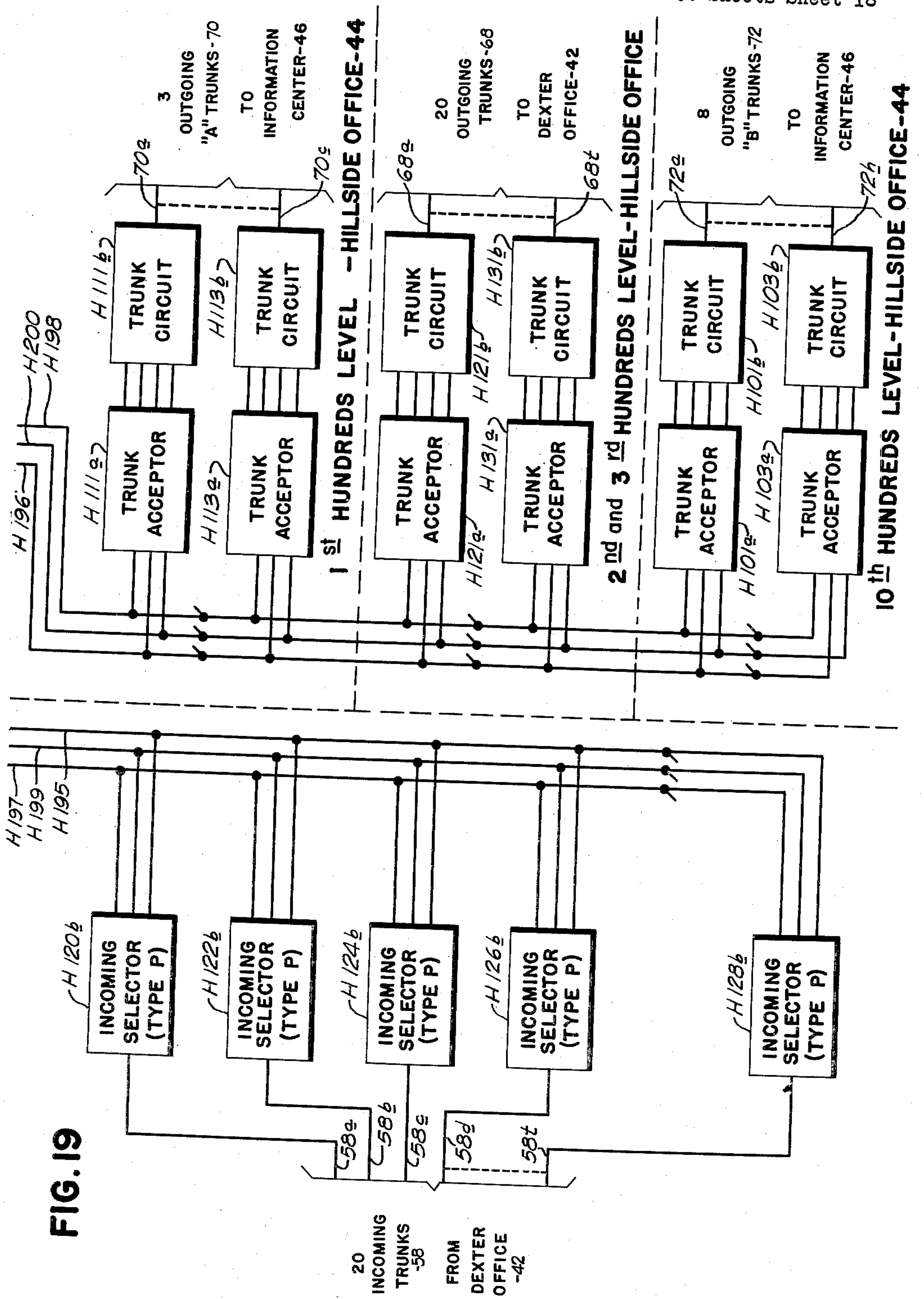
Figure 20:
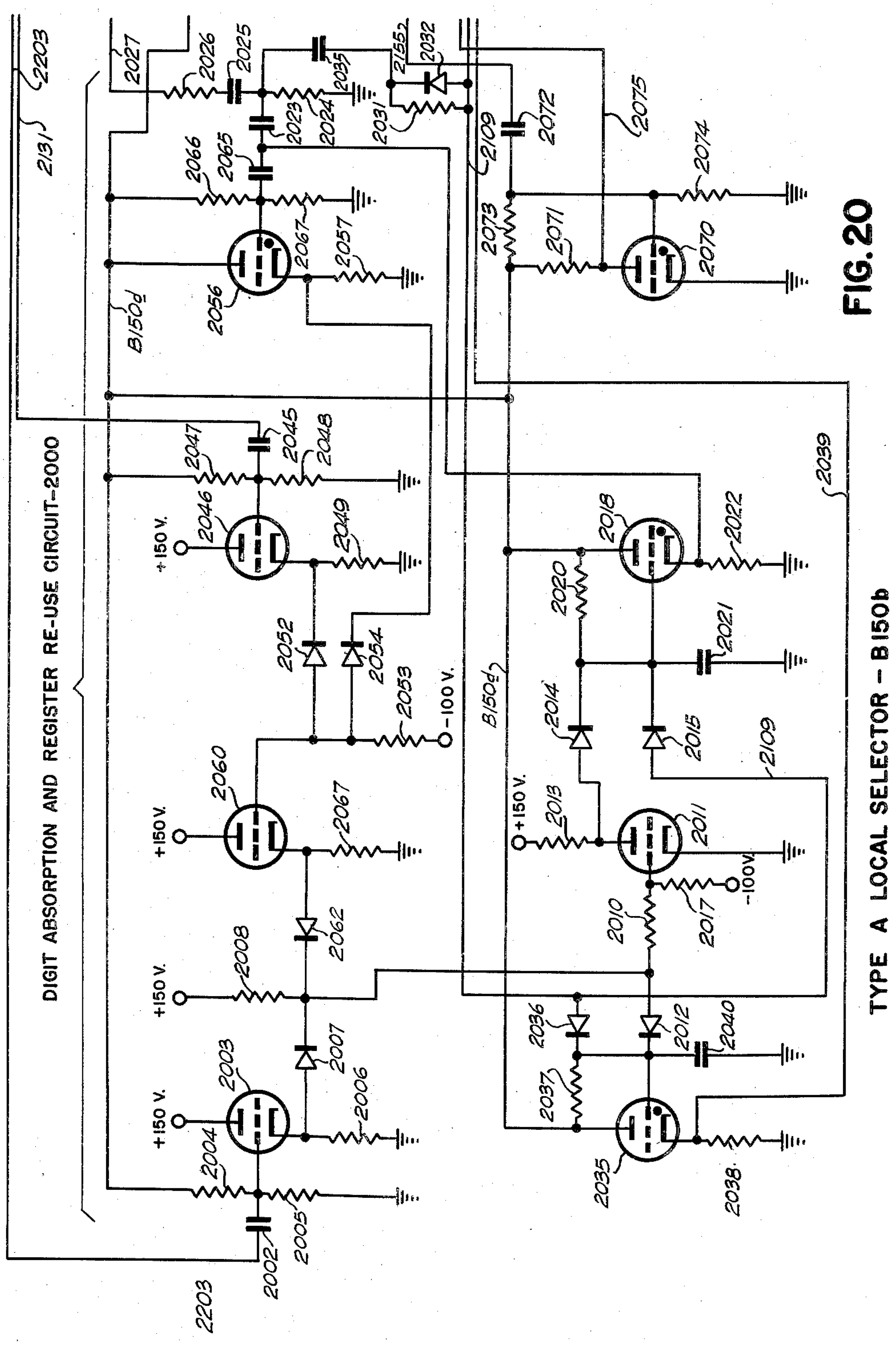
Figure 21:
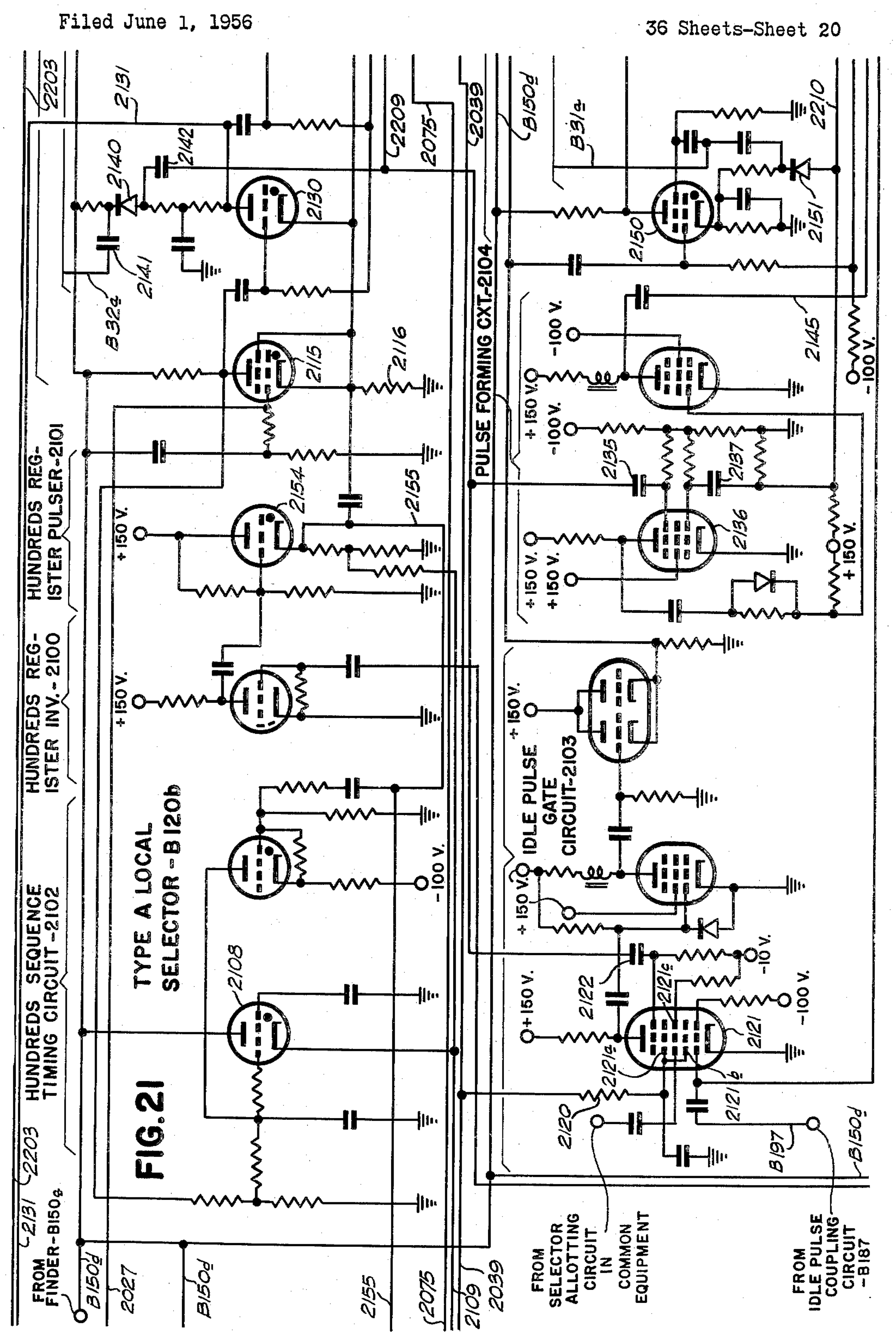
Figure 22:
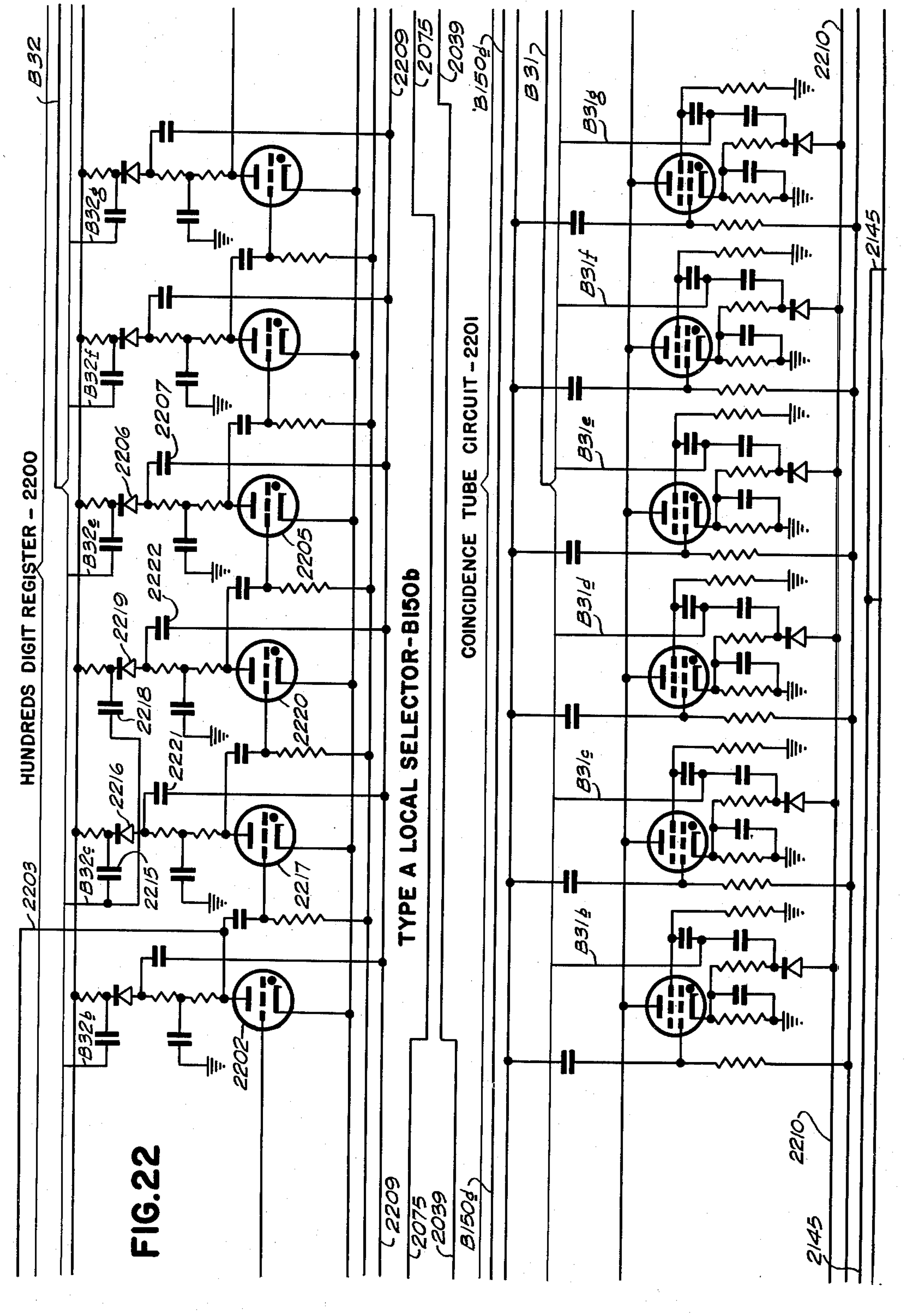
Figure 23:
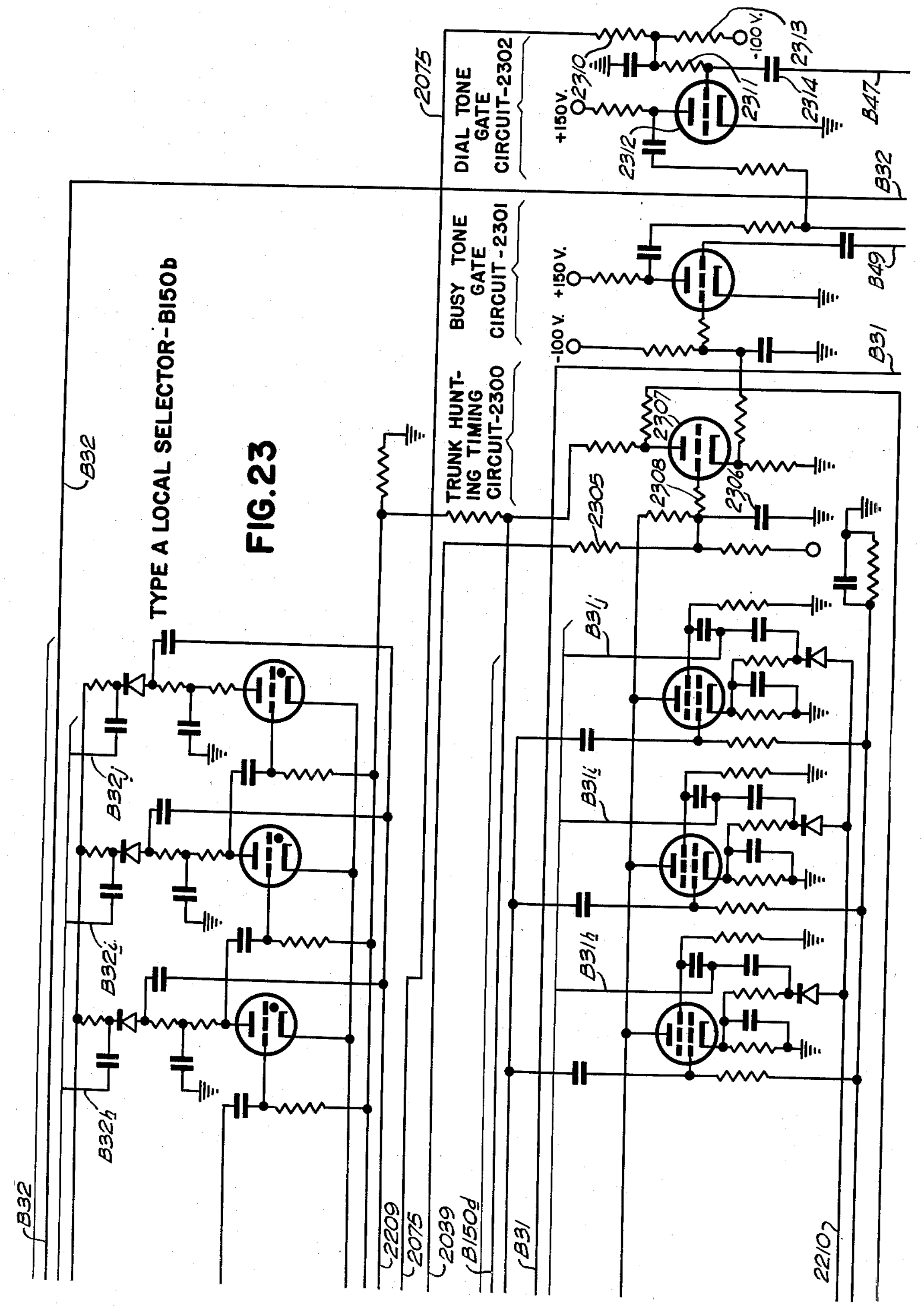
Figure 24:
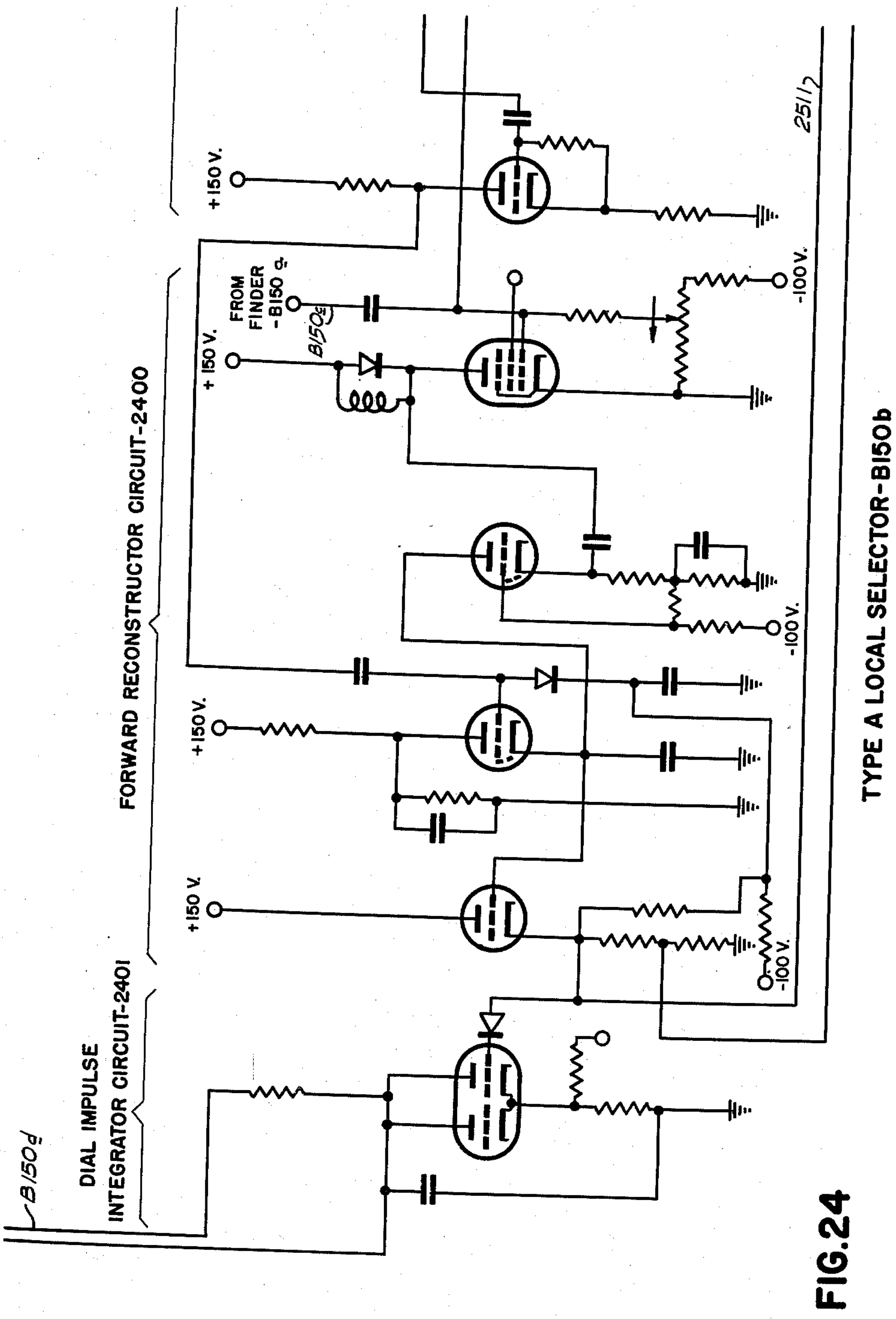
Figure 25:
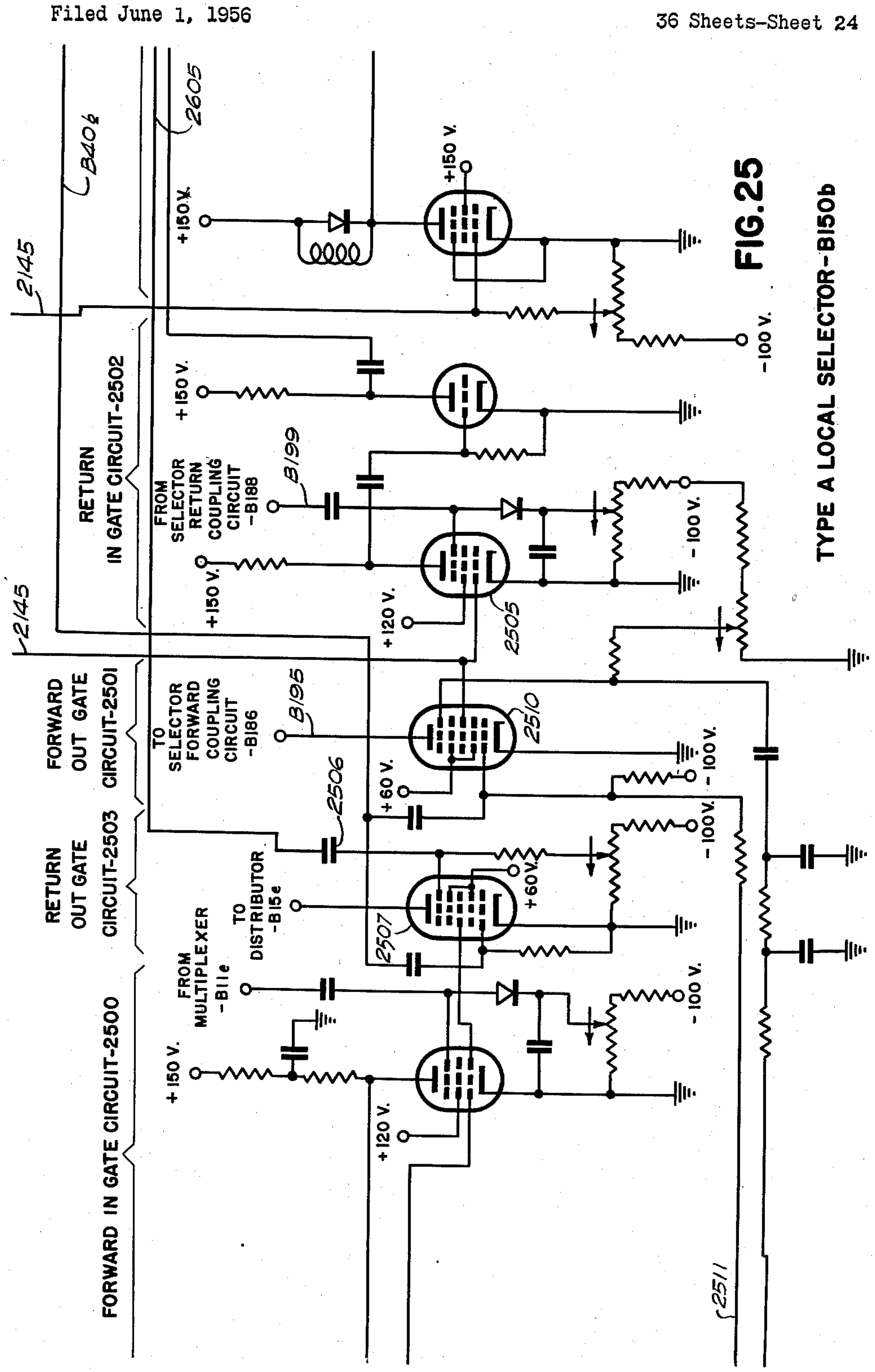
Figure 26:
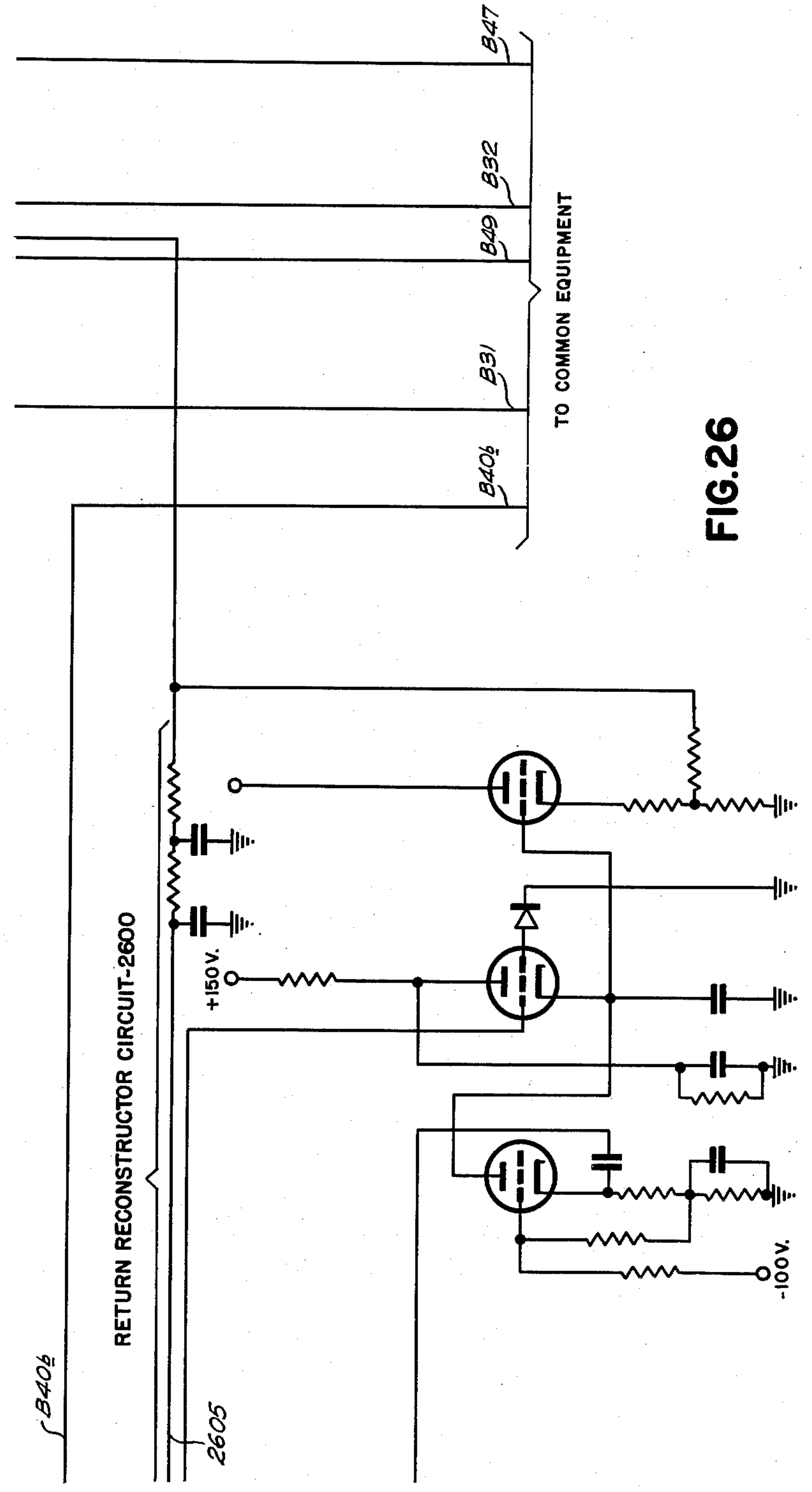
Figure 27:
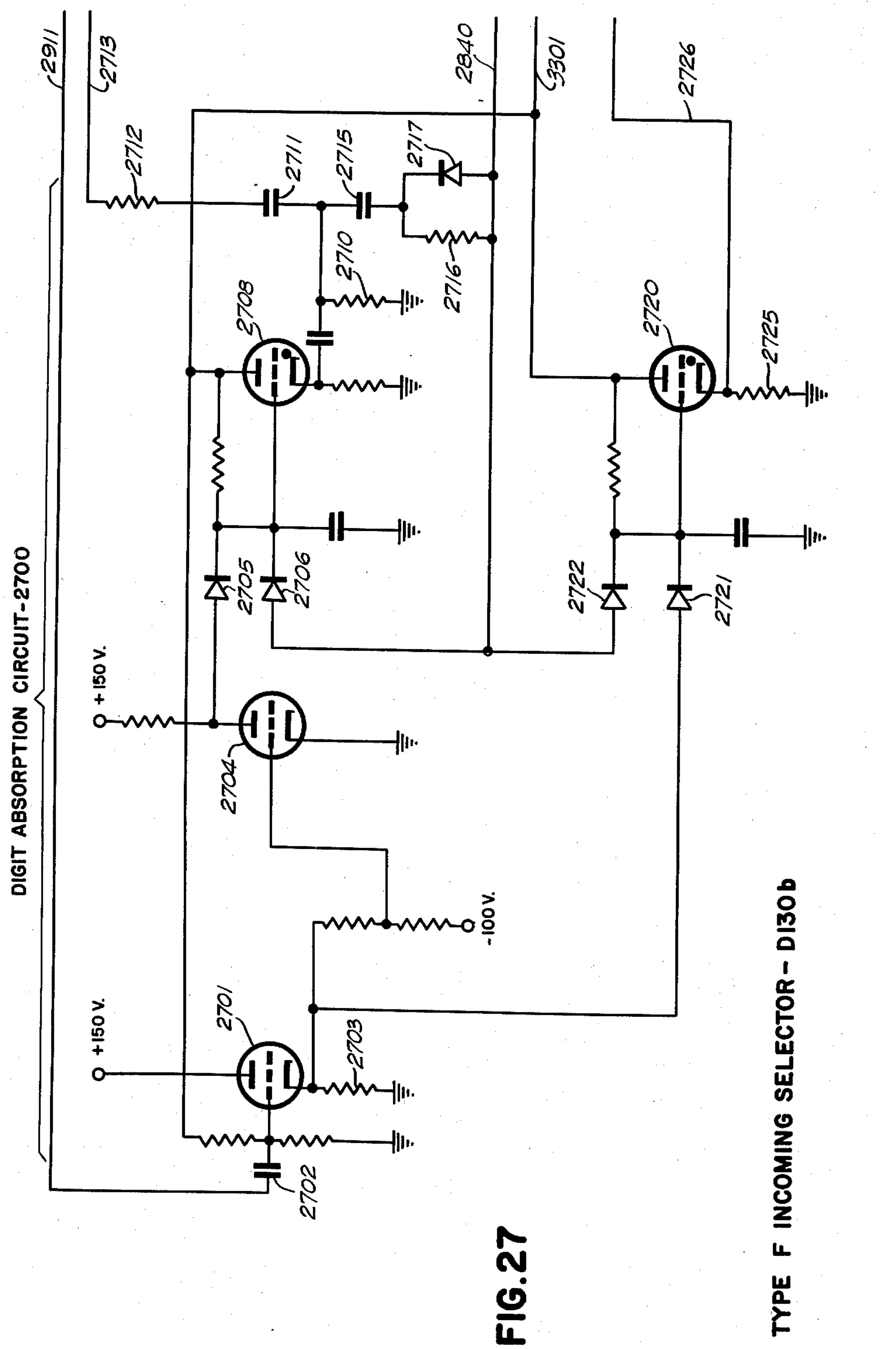
Figure 28:
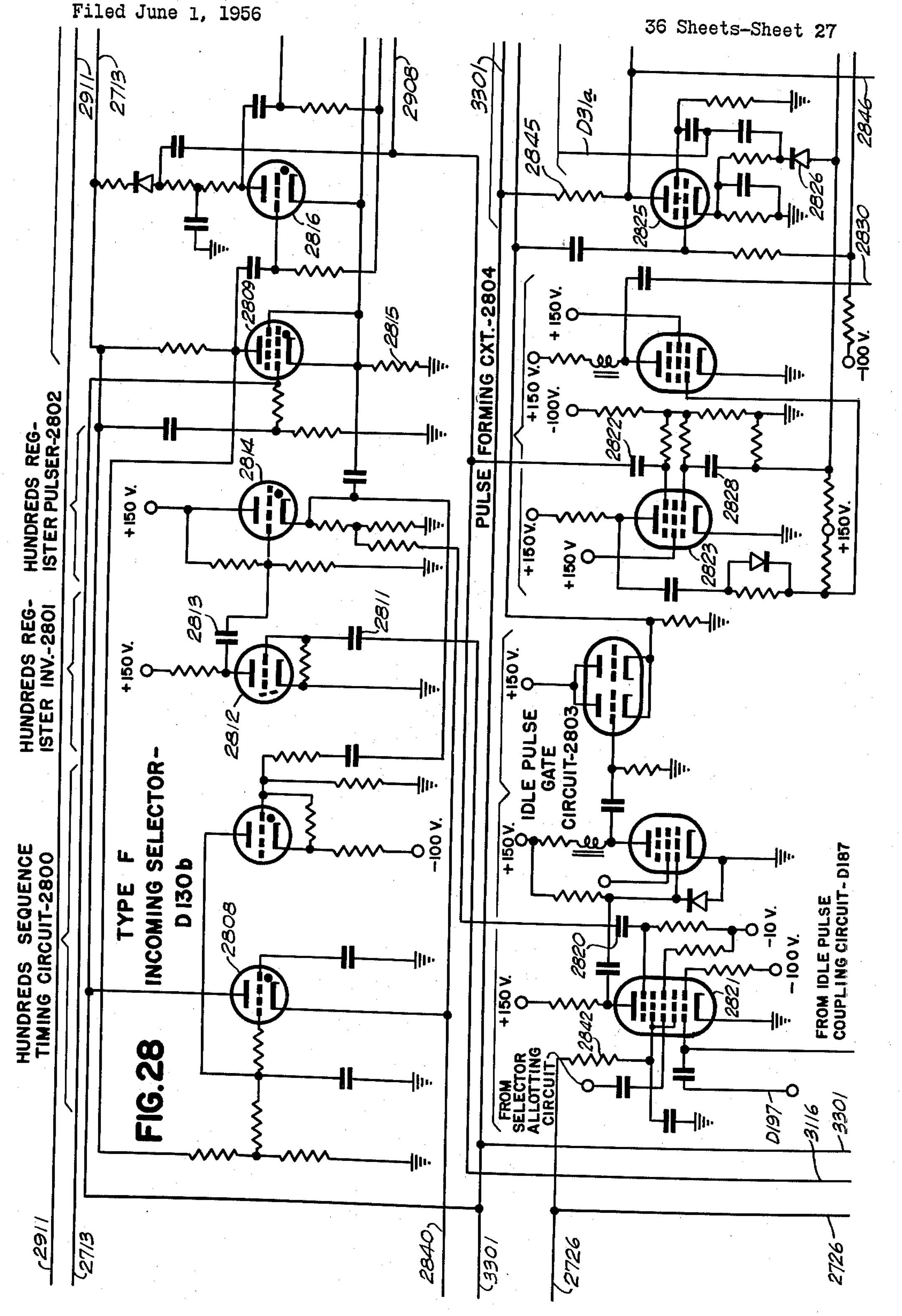
Figure 29:
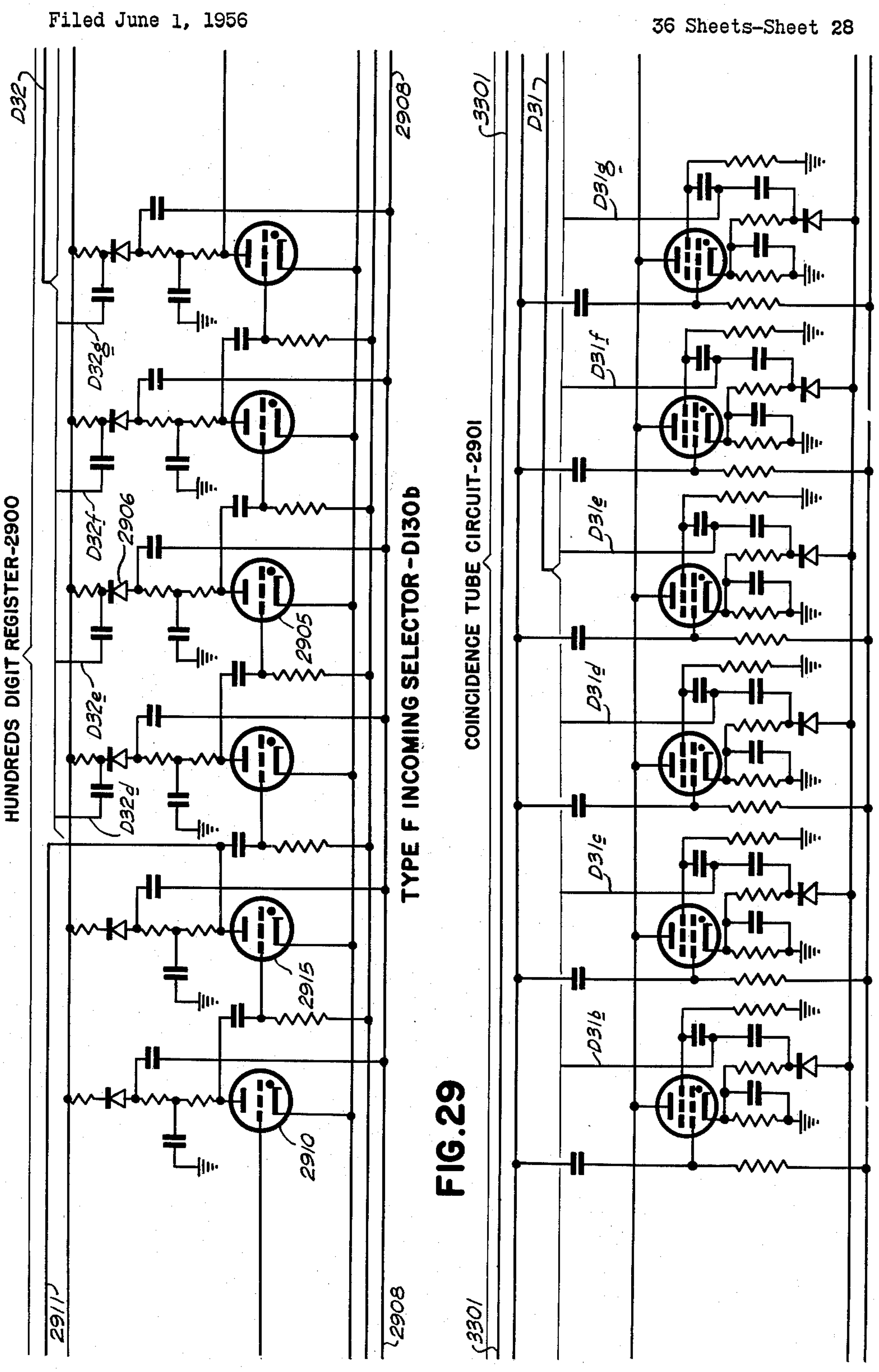
Figure 30:
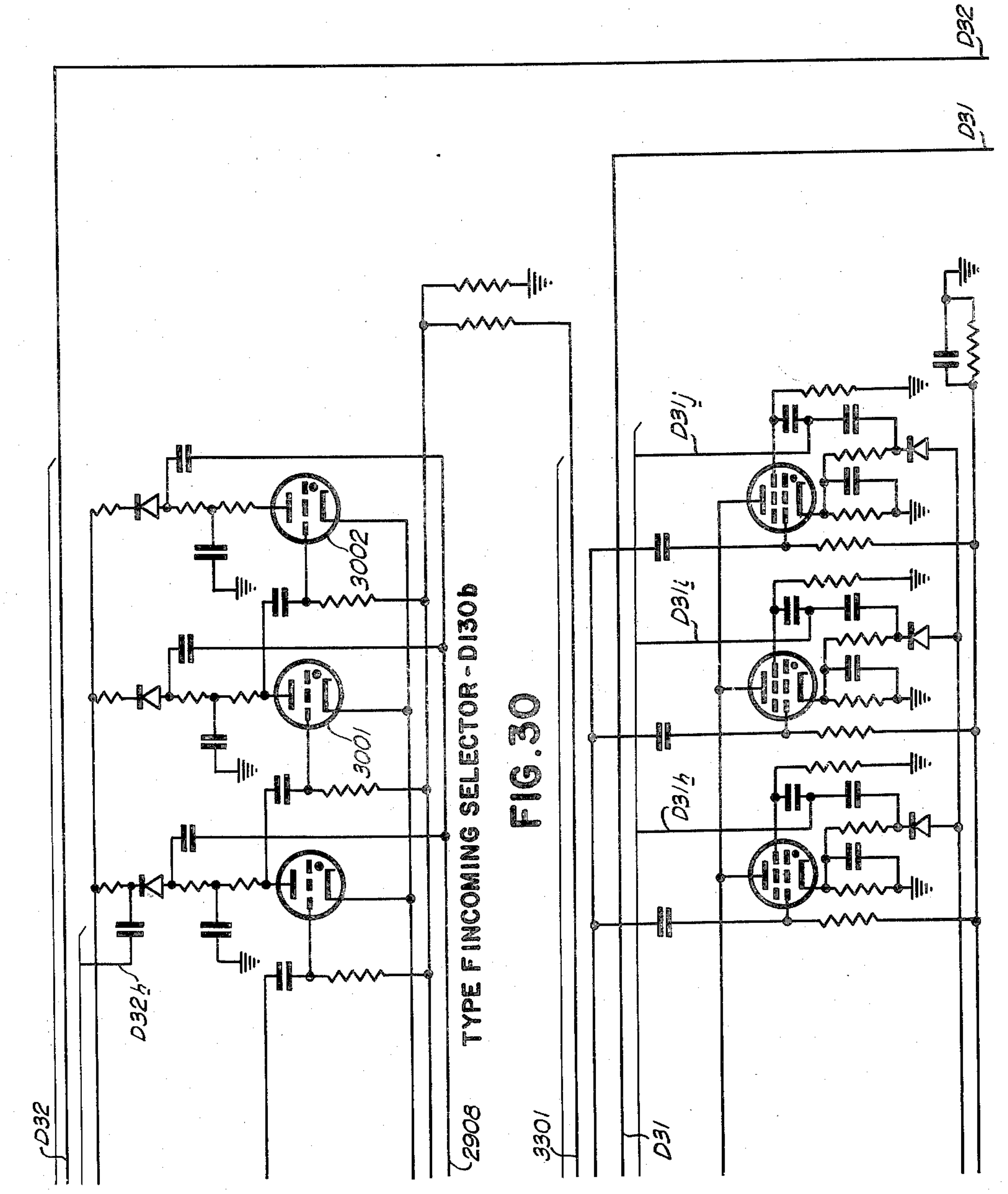
Figure 31:
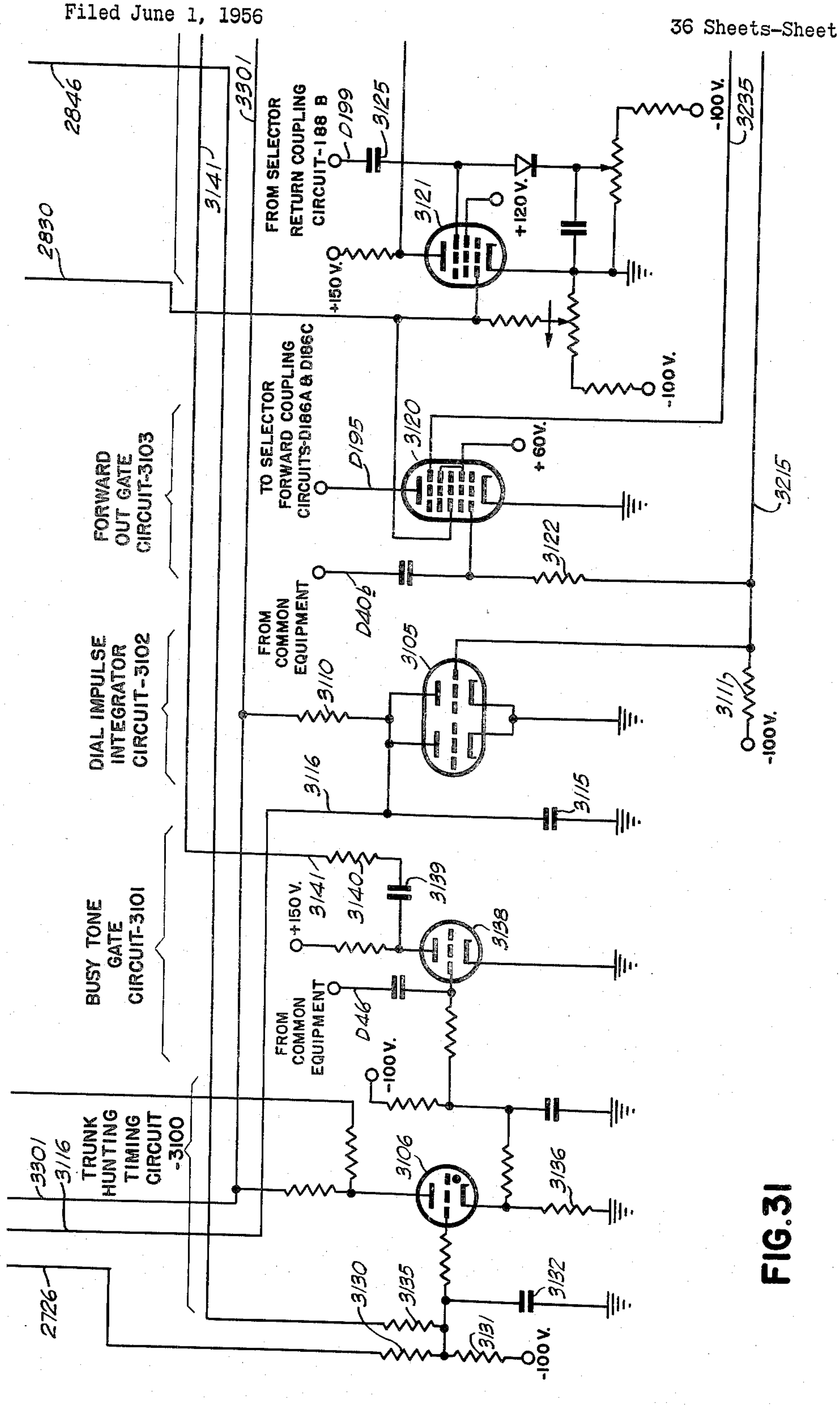
Figure 32:
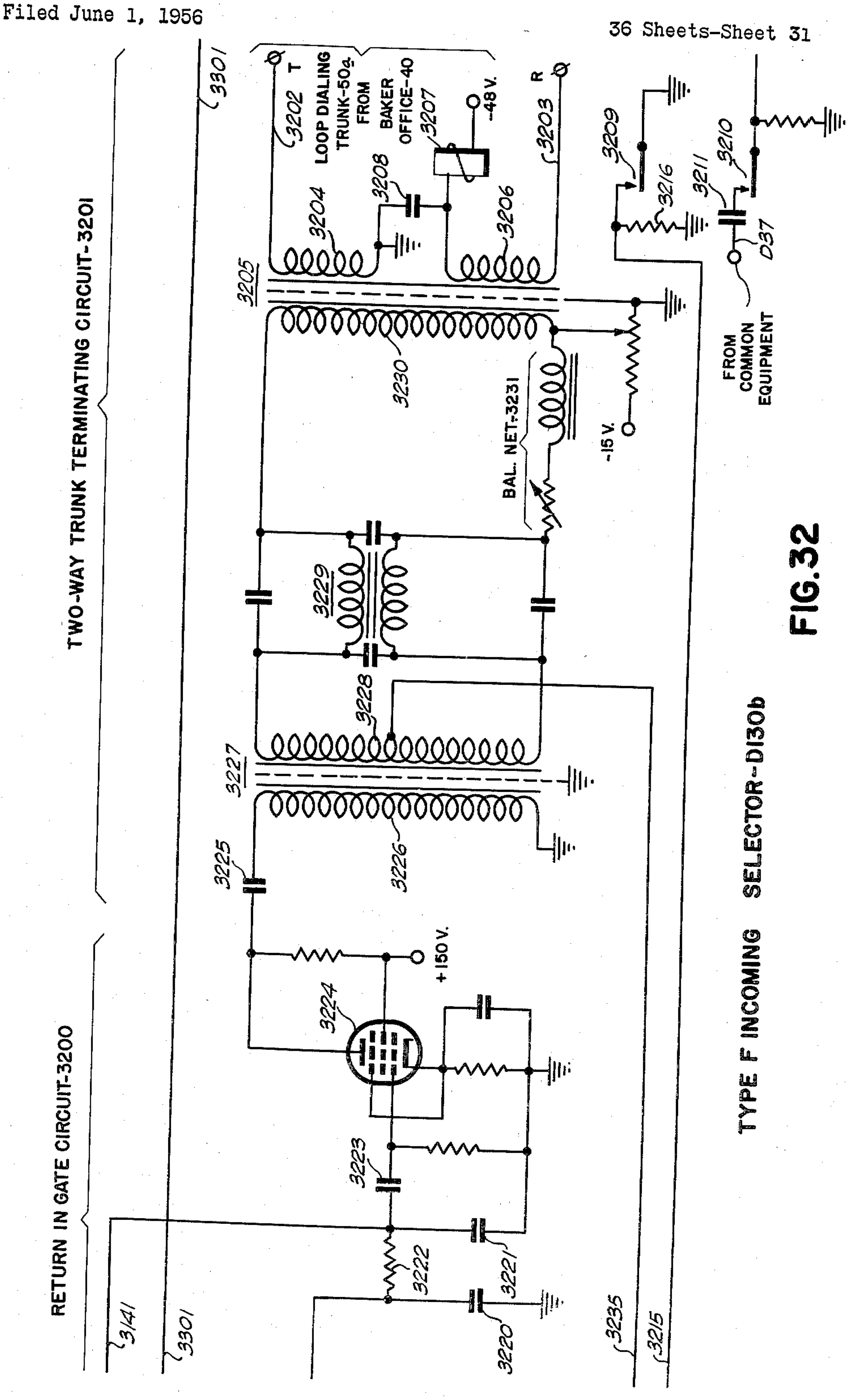
Figure 33:
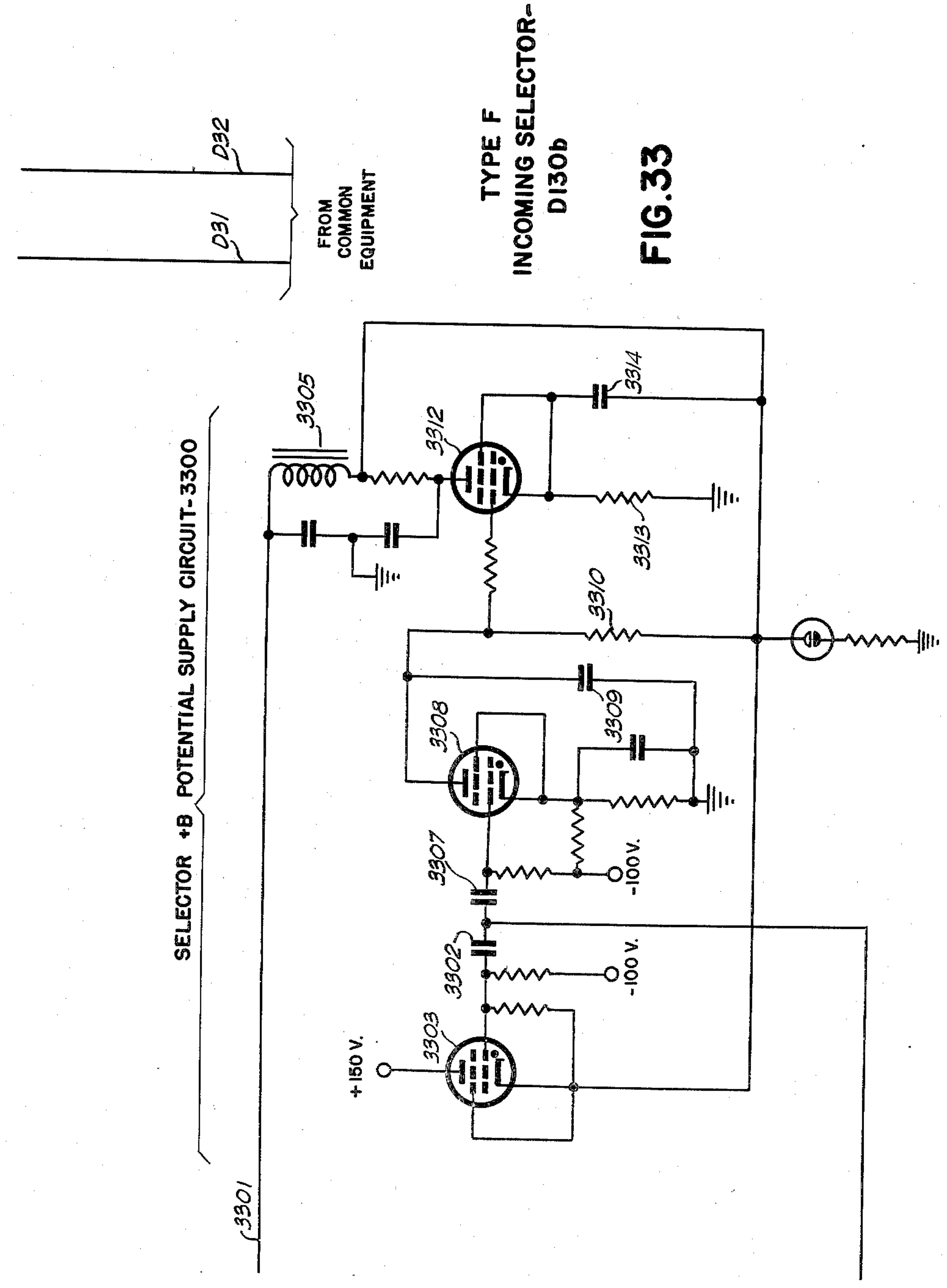

The above described wiring arrangement in the Dexter office 42 requires different types of coupling circuits to interconnect the local and incoming selectors with the acceptor-connector links and the trunk acceptors. More particularly, as shown in Fig. 11, a selector-forward coupling circuit D186A, a selector return coupling circuit D188B, and an idle pulse coupling circuit D187A are employed to interconnect the selector-forward, selector-return and idle pulse conductors D196A, D200A and D198A of the type D trunk acceptors with the corresponding conductors D195, D199 and D197 of one group of local and incoming selectors. A selector-forward coupling circuit D186B, a selector-return coupling circuit D188A and the idle pulse coupling circuit D187B are employed to interconnect the selector-forward, selector-return and idle pulse conductors D196B, D200B and D198B of the type E trunk acceptors with the corresponding conductors D195A, D199A and D197A of the other group of local and incoming selectors. In addition, the selector-forward coupling circuit D186C interconnects the selector-forward conductors D195 and D195A of all local and incoming selectors with the selector-forward conductor D196 of the acceptor-connector links and the trunk acceptors in the first and tenth hundreds levels, the coupling circuit D188A connects the selector-return conductor D200 of the acceptor-connector links to the selector-return conductor D199A and the coupling circuit D188B connects the selector-return conductor D200 to the selector-return conductor D199, and the coupling circuits D187A and D187B function to connect the idle pulse conductor D198 of the acceptor-connector links to the idle pulse conductors D197 and D197A, respectively. The coupling circuits D187A, D187B, D188A, D188B and D186C are each provided with two separate input circuits and a common output circuit and have been identified as type B coupling circuits, the coupling circuits D186A and D186B each having a single input and a single output circuit and are identified as type A coupling circuits.

The type D local selectors, such as the local selector

D150*b* in the fifth hundreds level of the Dexter office 42, are connected to the conductors D195, D197 and D199, whereas the type E local selectors, such as the local selector D152*b* in the fifth hundreds level, are connected to the conductors D195A, D197A and D199A. The twenty incoming trunks 50 from the Baker office 40 are individually terminated in incoming selectors, identified as type F selectors, which are divided into two groups. One group of ten type F selectors, such as the illustrated selectors D130*b* and D132*b* which terminate the trunks 50*a* and 50*j*, are connected to the conductors D197, D199 and D195. The other group of ten type F selectors, such as the illustrated selectors D134*b* and D136*b* which terminate the trunks 50*k* and 50*t*, are connected to the conductors D197A, D199A and D195A. The twenty incoming trunks 68 from the Hillside office 44 are individually terminated in incoming selectors, identified as type J selectors, which are divided into two groups, one group of ten type J incoming selectors, such as the selectors D210*b* and D212*b* which terminate the illustrated trunks 68*a* and 68*j* respectively, being connected to the conductors D197, D199 and D195 and the other group of type J selectors, such as the selectors D214*b* and D216*b* which terminate the trunks 68*k* and 68*t* respectively, being connected to the conductors D197A, D199A and D195A.

The twenty incoming trunks 66 from the main dial office 48 are individually terminated in incoming selectors identified as type H selectors, which are divided into two groups, one group of ten type H selectors, such as the selectors D218*b* and D220*b* which respectively terminate the trunks 66*a* and 66*j*, being connected to the conductors D197, D199 and D195 and the other group of ten type H selectors, such as the illustrated selectors D222*b* and D224*b* which respectively terminate the trunks 66*k* and 66*t*, being connected to the conductors D197A, D199A and D195A. The twenty incoming trunks 74 from the information center 46 are individually terminated in incoming selectors, identified as type L selectors, which are divided into two groups, one group of ten type L selectors, such as the illustrated selectors D226*b* and D228*b* which respectively terminate the trunks 74*a* and 74*j*, being connected to the conductors D197, D199 and D195 and the other group of type L selectors, such as the illustrated selectors D230*b* and D232*b* which terminate the trunks 74*k* and 74*t*, being connected to the conductors D197A, D199A and D195A.

In the second hundreds level of the Dexter office 42 there is provided facilities for establishing connections to the twenty outgoing trunks 56 to the Baker office 40 even though only ten pulse time positions are available for the trunk acceptors in this level. More particularly, a first group of ten type D trunk acceptors are provided which function with associated trunk circuits to establish connections to ten of the trunks 56 to the Baker office, these trunk acceptors being assigned the time positions 21, 22 to 20, inclusive. Thus, the first trunk acceptor D211*a*, is assigned the time position 21 and functions with the trunk circuit D211*b* to establish a connection to the trunk 56*a*. The tenth type D trunk acceptor D213*a* is assigned the time position 20 and functions with the trunk circuit D213*b* to establish a connection to the trunk 56*j*. A group of ten type E trunk acceptors are also provided to terminate the remaining ten trunks 56 to the Baker office, and are assigned the same time positions. Thus, the eleventh trunk acceptor D215*a* is assigned the time position 21 and functions with the trunk circuit D215*b* to terminate the trunk 56*k* and the twentieth trunk acceptor D217*a* is assigned the time position 20 and functions with the trunk circuit D217*b* to terminate the trunk 56*t*. The type D trunk acceptors, such as the trunk acceptors D211*a* and D213*a* are connected by way of the conductor D196A to the selector-forward coupling circuit D186A, by way of the conductor D198A to the idle pulse coupling circuit D187A and by way of the conductor D200A to the selector-return coupling circuit D188B. The coupling circuits D186A, D187A and D188B thus function to supply signals from the above described group of local and incoming selectors to the type D trunk acceptors in the second hundreds level of the Dexter office 42. The type E trunk acceptors, such as the trunk D215*a* and D217*a*, are connected by way of the conductor D196B to the selector-forward coupling circuit D186B, by way of the conductor D198B to the idle pulse coupling circuit D187B and by way of the conductor D200B to the selector-return coupling circuit D188A. The coupling circuits D186B, D187B and D188A thus function to transmit signals derived from the above described second group of local and incoming selectors to the type E trunk acceptors in the second hundreds level over paths which are completely independent from the group of coupling circuits employed to transmit signals to the type D trunk acceptors.

In a similar manner the fourth hundreds level in the Dexter office 42 is assigned to the twenty outgoing trunks 58 to the Hillside office 44 while employing only ten pulse time positions for this function. More particularly, a first group of ten type D trunk acceptors, such as the illustrated trunk acceptors D411*a* and D413*a*, function with the illustrated trunk circuits D411*b* and D413*b* to terminate the trunks 58*a* and 58*j*, these trunk acceptors being connected to the conductors D196A, D198A and D200A. A second group of ten type E trunk acceptors, such as the illustrated trunk acceptors D415*a* and D417*a*, which function with the trunk circuits D415*b* and D417*b* to terminate the trunks 58*k* and 58*t*, are connected to the conductors D196B, D198B and D200B. The ten type D trunk acceptors in the fourth hundreds level are assigned the time positions 41, 42 to 40, inclusive, and the type E trunk acceptors in this level are also assigned these same time positions.

In order to provide preferential service for certain subscribers in the Dexter office 42, the ninth hundreds level in this office is assigned to the twenty outgoing trunks 64 to the main dial office 48, these trunks being reached by dialing the prefix "9" by preferred subscribers in the Dexter office and by the operator in the information center 46. More particularly, a first group of type D trunk acceptors, such as the illustrated trunk acceptors D911*a* and D913*a*, which function with the trunk circuits B911*b* and B913*b* to terminate the trunks 64*a* and 64*j*, are connected to the conductors D196A, D198A and D200A. A second group of ten type E trunk acceptors such as the illustrated trunk acceptors D915*a*, and D917*a* which function with the trunk circuits D915*b* and D917*b* to terminate the trunks 64*k* and 64*t*, are connected to the conductors D196B, D198B and D200B. The type D trunk acceptors in the ninth hundreds level are assigned the time positions 91, 92, 90, inclusive, and the type E trunk acceptors in this level are individually assigned the same time positions.

In the Dexter office 42 the first hundreds level is assigned to the three outgoing A trunks 60 to the information center 46, the illustrated trunk acceptors D111*a* and D113*a* functioning with the illustrated trunk circuits D111*b* and D113*b* to terminate the trunks 60*a* and 60*c*. In the tenth hundreds level of the Dexter office 42 a group of four trunks are provided to the information center 46, the illustrated trunk acceptors D101*a* and D103*a* and associated trunk circuits D101*b* and D103*b* terminating the trunks 62*a* and 62*d*.

GENERAL DESCRIPTION OF LOCAL AND INCOMING SELECTORS

Before considering the detailed circuitry of the various local and incoming selectors described generally above in connection with each of the electronic offices 40, 42 and 44 it is believed helpful to set forth the general functions which are accomplished in each type of selector to achieve the above described uniform numbering system with the electronic facilities in the offices 40, 42 and 44 of the system of Fig. 1.

In the Baker office 40 five type A local selectors and five type B local selectors are provided in each of the fifth, sixth, seventh, eighth and ninth hundreds levels of this office. These two types of local selectors are provided so that both the third and fourth hundreds levels may be assigned to a group of twenty outgoing trunks to the Dexter office 42 to provide high percentage trunking between the offices 40 and 42. More particularly, the type A local selectors in the Baker office 40 are provided with facilities for returning dial tone until the dialing operation is initiated and for absorbing all digits "2," since these digits would correspond to the call letters "B" and "A" and would indicate calls intended for lines in the Baker office 40. In addition, the type A local selectors are provided with facilities for selecting the third hundreds level in the Baker office 40 in response to dialing of either a digit "3" or a digit "4" and are further provided with facilities for rendering the fourth hundreds level in the Baker office inaccessible to the type A local selectors. The type A local selectors are also provided with facilities for absorbing a first digit of "1" with facilities for reusing the first hundreds level after the first digit of "1" is dialed. This arrangement is provided so that a switch hook flub will not be misinterpreted as a first digit of "1" but the arrangement still permits the use of the first hundreds level to route connections to the information center 46. Thus, if the subscriber in the Baker office 40 dials two successive digits of "1" the first digit "1" is absorbed but the second digit '1" establishes a connection to one of the three outgoing trunks 54 in the first hundreds level of the Baker office 40 which extend to the information center 46. The type B local selectors in the Baker office 40 are quite similar to the type A local selectors in that they include facilities for absorbing a first digit of "1" with reuse of the first hundreds level and also include facilities for returning dial tone and absorbing all digits "2" for the reasons discussed above. However, in the type B local selectors facilities are included for selecting the fourth hundreds level in the Baker office 40 in response to the dialing of either a digit "3" or a digit "4," the third hundreds level in the Baker office being rendered inaccessible to the type B local selectors. Thus, the type A local selectors may seize any one of the trunk acceptors assigned time positions corresponding to the third hundreds level, such as the trunk acceptor B131*a* and the type B local selectors may seize any one of the trunk acceptors assigned time positions corresponding to the fourth hundreds level, such as the trunk acceptor B141*a*. Since the type A and type B local selectors are alternately allotted to calling lines in any one level of the Baker office, twenty percent trunking is provided to the Dexter office 42 without requiring separate groups of selector-forward, selector-return and idle pulse conductors as in the Dexter office 42.

In the Baker office 40 the group of twenty incoming trunks 56 from the Dexter office 42 are individually terminated in incoming selectors identified as type C selectors. The type C incoming selectors are provided with facilities for absorbing all digits of "2" since the incoming call may have originated in the Dexter office 42 and have been routed to the Baker office 40 in response to the first dialed digit "2," but due to the uniform directory numbering system a second digit of "2" is dialed in the Dexter office to indicate the "A" of the Baker number which must be absorbed. The type C incoming selectors are also provided with facilities for blocking the first, third, fourth and tenth hundreds levels in the Baker office 40 to prevent cross connections between offices and tie-up of unused linkage, but permit selection of any one of the fifth, sixth, seventh, eighth or ninth hundreds levels in this office to permit completion of a call to one of the local subscribers in the Baker office.

In the Dexter office 42 local selectors identified as type D and type E local selectors are employed in groups of five in each of the fifth, sixth, seventh and eighth hundreds levels. The type D and type E local selectors in the Dexter office 42, which are identical insofar as circuitry is concerned but which are connected over separate conductors to the type D and type E trunk acceptors in the second, fourth and ninth hundreds levels as described generally heretofore, are provided with facilities for absorbing a first digit of "1" with reuse of the first hundreds level for the reasons discussed above in connection with the local selectors in the Baker office 40. In addition, the type D and type E local selectors are provided with facilities for absorbing all digits "3" since in the Dexter office 42 the digits "3" indicate that the call is intended for a subscriber line within this office in accordance with the prefix letters "D" and "E" of the Dexter office, which correspond to the successively dialed digits "3" and "3." The type D and type E local selectors in the Dexter office 42 are also provided with restricted service facilities for permitting only certain preferred subscribers in the Dexter office to gain access to the ninth hundreds level and hence to the trunks 64 extending to the main dial office 48. When one of these preferred subscribers dials the prefix digit '9" a connection is extended to one of the trunks 64 and hence to the main dial office 48 at which location the remaining digits are employed to establish the connection to the desired line in the main dial office.

In the Dexter office 42 twenty type F incoming selectors are employed to terminate the twenty incoming trunks 50 from the Baker office 40. While the type F incoming selectors are divided into two groups which are connected to different selector-forward, selector-return and idle pulse conductors, all of the type F incoming selectors are identical insofar as circuitry is concerned and include facilities for absorbing all digits "3" for the reasons discussed above, and further include facilities for blocking the first, second, ninth and tenth hundreds levels to prevent calls incoming over these trunks from seizing any one of these levels. The Dexter office 42 also includes a group of twenty type J incoming selectors which individually terminate the twenty trunks 68 from the Hillside office 44, the type J selectors being divided into two groups of ten selectors each of which are connected to different groups of selector-forward, selector-return and idle pulse conductors as described above. All of the type J incoming selectors are identical in circuitry and include facilities for absorbing all digits "3" and blocking the first, fourth, ninth and tenth hundreds levels. The fourth hundreds level is blocked since the calls handled by the type J incoming selectors originate in the Hillside office which has the prefix digits "4" assigned thereto, whereas the type F incoming selectors handle calls from the Baker office, which has the prefix digit "2" assigned thereto, and accordingly the type F selectors block the second hundreds level in the Dexter office 42 to prevent the call from being returned to the Baker office if a digit of "2" is erroneously dialed as the second digit.

The Dexter office 42 also includes a group of twenty type H incoming selectors which individually terminate the twenty trunks 66 from the main dial office 48 and are connected in groups of ten to the different selector-forward, selector-return and idle pulse conductors as described above. The type H incoming selectors include facilities for absorbing all digits "3" and also include facilities for blocking the ninth hundreds level since the incoming calls handled by the type H selectors originate in the main dial office 48 which may be reached by the prefix digit "9" by certain preferred subscribers in the Dexter office. The Dexter office 42 also includes a group of twenty type L incoming selectors which individually terminate the twenty trunks 74 from the information center 46, these selectors being divided into two groups of ten selectors each of which are connected to the different selector-forward, selector-return and idle pulse conductor groups. The type L incoming selectors include facilities for absorbing all digits "3" but do not block any of the other hundreds levels in the Dexter office so that calls may be established by the operator from any one of the trunks 74 to any particular hundreds level in the Dexter office 42 and the connection extended to the main dial office 48 or any subscriber in the offices 40, 42 and 44.

In the Hillside office 44 a group of five type N local selectors and a group of five type O local selectors are employed in each of the fifth, sixth, seventh, eighth and ninth hundreds levels. The type N local selectors are provided with facilities for absorbing a first digit of "1" with reuse of the first hundreds level to permit establishment of a connection to the information center 46 as described above in connection with the Baker and Dexter offices. In addition, the type N local selectors include facilities for absorbing all the digits "4" since these digits indicate a local call to the Hillside office which has the prefix letters "H" and "I" assigned thereto. The type N local selectors are also provided with facilities for selecting the second hundreds level in the Hillside office in response to dialing of either the digit "2" or the digit "3" and include further facilities for rendering the third hundreds level inaccessible to these local selectors. The type O local selectors in the Hillside office 44 also include facilities for absorbing a first digit of "1" with reuse of the first hundreds level and the facilities for absorbing all digits "4." However, the type O local selectors are provided for facilities for selecting the third hundreds level in response to the dialing of either a digit "2" or a digit "3" and rendering the second hundreds level inaccessible to the type O local selectors. Such an arrangement is required for the high percentage trunking which uses the second and third hundreds levels in the Hillside office for the twenty outgoing trunks to the Dexter office 42. In the Hillside office 44 a group of twenty type P incoming selectors are employed to terminate the twenty incoming trunks from the Dexter office 42 and the type P incoming selectors are provided with facilities for absorbing all digits "4" and for rendering the first, second, third and tenth hundreds levels inaccessible to the type P incoming selectors so that these levels are blocked on calls incoming to the Hillside office from the Dexter office.

*Type A local selector*

Referring now to Figs. 20 to 26, inclusive, there is shown therein the detailed circuitry of one of the type A local selectors in the Baker office 40, such as the illustrated local selector B150*b* employed in the fifth hundreds level of this office. In general, the selector B150*b* is controlled by finder gate pulses delivered thereto over the conductor B150*c* from the associated line finder B150*a* to accept and respond to signal bearing multiplexer pulses occurring in the pulse time position assigned to the calling line with which the finder-selector link B150 is operatively associated. The type A local selector B150*b* also responds to the application of operating potential to the conductor B150*d* and to the finder gate pulses appearing on the conductor B150*c* by feeding a dial tone signal to the distributor B15*e* on selector signal pulses occurring in the pulse time position assigned to the calling line with which the selector is operatively associated, thereby to return the dial tone signal to the calling subscriber.

The selector B150*b* responds to dial impulses which constitute the first digit of the called number by either absorbing the digit in the case of a local call or by selecting the corresponding hundreds level in the Baker office 40 which is assigned to the remote offices 42 and 44. In the case of a call to one of the offices 42 and 44, the selector B150*b* then selects the pulse time position assigned to an idle one of the trunk acceptors associated with the trunks 50 extending to the Dexter office 42 and transmits selector-forward signal pulses in the time position assigned to the selected idle trunk acceptor over the common selector-forward conductor B195, through the coupling circuit B186 and over the conductor B196 to all of the acceptor-connector links and trunk acceptors of the system. Incident to the selection of this time position the selector B150*b* conditions itself to accept selector-return pulses which are impressed upon the selector-return conductor B199 from the selector-return coupling circuit B188 and occur in the pulse time position assigned to the selected idle trunk acceptor, to store the intelligence carried by these selector-return pulses and to transmit the stored intelligence to the distributor B15*e* on selector signal pulses occurring in the pulse time position assigned to the calling line with which the link B150 is operatively associated. In effect, therefore, the selector functions to shift signal carrying pulses from the pulse time position assigned to the calling line with which it is operatively associated to the pulse time position assigned to an idle trunk acceptor and to shift selector-return signal pulses carrying intelligence derived from the associated trunk from the particular pulse time position assigned to the associated trunk acceptor to the time position assigned to the corresponding calling line. If the call is intended for one of the lines in the Baker office 40, the selector B150*b* absorbs the first two digits "2" and "2" of the dialed number and responds to the third or hundreds digit of the called line by selecting the particular hundreds level of the local called line and then selects the pulse time position assigned to an idle one of the connectors within the called hundreds level. Selector-forward and selector-return signal pulses are then handled in the same manner as described above.

In addition, the selector B150*b* performs the auxiliary functions of terminating dial tone transmission to the calling substation when the first line selecting impulse therefrom is dialed into the selector, and transmitting busy tone carrying selector signal pulses to the distributor B15*e* in the pulse time position assigned to the calling line in the event there are no idle trunk acceptors available to the called office. The selector B150*b* is also arranged to release in response to the release of a connection involving link B150 at the calling substation.

To perform the above mentioned functions the selector B150*b* is provided with a forward in gate circuit 2500, which responds to finder gate pulses transmitted to the selector B150*b* over the conductor B150*c*, and a forward reconstructor circuit 2400 having the function of detecting or reconstructing and storing the intelligence carried by signal bearing pulses transmitted to the selector from the multiplexer B11*e* in the pulse time position assigned to the calling line. The selector B150*b* further comprises a forward out gate circuit 2501 for gating to the selector-forward coupling circuit B186 selector-forward signal pulses which occur in the time position assigned to the selected trunk acceptor or acceptor-connector link and carry the intelligence and supervisory signals reconstructed by the circuit 2400. In addition, the selector B150*b* includes a return in gate circuit 2502 for repeating selector-return signal pulses in the pulse time position assigned to the selected trunk acceptor or acceptor-connector link which bear intelligence or control signals derived from the associated trunk or connector, a return reconstructor circuit 2600 for detecting or reconstructing the intelligence or control signals gated by the return in gate circuit 2502, and a return out gate circuit 2503 which is controlled in accordance with the detected signals stored in the circuit 2600 and by the finder gate pulses delivered to the selector B150*b* to gate to the distributor B15*e* by way of the distributor coupling circuit B191*e* signal bearing selector pulses which occur in the pulse time position assigned to the calling line.

The selector B150*b* additionally comprises a plurality of components for responding to the first digit of dial impulses repeated to the selector on multiplexer pulses occurring in the pulse time position assigned to the calling line, and for absorbing certain digits with reuse of the same level for reasons described generally above. The dial pulse responsive equipment of the selector B150*b* comprises a dial impulse integrator circuit 2401, which receives dial impulses from the reconstructor circuit 2400, a hundreds register inverter 2100, to which dial impulses are repeated by the dial impulse integrator circuit 2401, a hundreds register pulser 2101 which serves to drive a hundreds digit register 2200, and a hundreds sequence timing circuit 2102 which functions to initiate certain operations at the end of the first digit dialed into the selector.

The selector B150*b* further comprises an idle pulse gate circuit 2103 which is controlled in accordance with the selector allotting circuit (not shown) in the common equipment of the Baker office and the setting imparted to the hundreds digit register 2200 at the end of the first digit to select only those idle pulses which identify idle connectors or trunks in the registered hundreds level and to supply these selected idle pulses to a coincidence tube circuit 2201 which operates to select at random one of these selected idle pulses which represent an idle connector or an idle trunk in the selected hundreds level. The selector B150*b* also comprises a selector pulse forming circuit 2104 which is controlled in accordance with the setting imparted to the hundreds digit register 2200 at the end of the first digit and the idle pulse selected by the coincidence tube circuit 2201 to produce selector pulses which are employed to control the transmission of intelligence and control signal information from the selector B150*b* to the selected idle trunk or connector in the pulse time position assigned thereto. A trunk hunting timing circuit 2300 is provided in the selector B150*b* which functions to lock up the selector B150*b* at the end of a test interval of predetermined duration in the event that the dialed digit is not absorbed and no idle trunks or connectors are found in the selected hundreds level. The selector B150*b* also includes a busy tone gate circuit 2301 and a dial tone gate circuit 2302 which have the function of gating busy and dial tones to the calling line. The above described circuits in the selector B150*b* may be substantially identical to the corresponding circuits shown and described in detail in the above identified copending application Serial No. 326,213 and reference may be had to this copending application for a detailed description thereof. However, it is pointed out that certain portions of these circuits are modified in the manner described in detail hereinafter to permit the above described multi-office connections to be set up while providing a uniform directory numbering system for all offices.

In order to provide facilities for absorbing one or more predetermined digits while permitting reuse of one or more hundreds levels after the digit has been absorbed, there is provided in the selector B150*b* a digit absorption and register reuse circuit 2000. As described generally above, the type A local selectors employed in the Baker office 40 must absorb a first digit of "1" with reuse of the first hundreds level and must also absorb all digits "2." The circuit 2000 is provided to accomplish these functions and also includes facilities for terminating dial tone transmission to the calling line when the dialing operation is initiated and preventing dial tone transmission to the calling line when the hundreds digit register 2200 is reset to normal in the event the first digit is "1" or "2." In order to accomplish the absorption of a particular digit the register 2200 must be reset to its initial or starting point, the hundreds sequence timing circuit 2102 must be reset and the coincidence tube circuit 2201 must be prevented from functioning in response to the registration of a predetermined digit in the register 2200.

In the selector B150*b* in the Baker office 40 all of the digits "2" are to be absorbed so that the anode circuit of the second counting tube 2202 in the register 2200 is connected by way of the conductor 2203 and through a large coupling condenser 2002 to the grid of a cathode follower tube 2003 in the digit absorption and register reuse circuit 2000. A grid biasing circuit including the resistors 2004 and 2005 is connected between the +B switch conductor B150*d* and ground so that a positive potential of approximately 70 volts is developed at the grid of the cathode follower 2003 when the finder-selector link B150 is seized. Since the plate circuit of the counting tube 2202 in the register 2200 is also energized from the +B switch conductor B150*d*, the potential across the condenser 2002 will not change materially when the link B150 is seized by a calling line and a +B switch potential of approximately 150 volts is applied to the conductor B150*d*. The capacity value of the condenser 2002 is such that when the tube 2202 is fired and its anode potential drops this potential decrease is coupled to the grid of the cathode follower 2003 and is maintained long enough to allow the digit absorbing circuit to operate and the register 2200 to be reset so that the tube 2202 is extinguished, as described in more detail hereinafter.

When the tube 2202 is fired in response to a digit of "2" the anode of the tube 2202 will drop approximately 60 volts so that the grid potential of the cathode follower tube 2003 will drop from 70 volts positive with respect to ground to approximately 10 volts positive. Accordingly, the potential developed across the cathode resistor 2006 of the tube 2003 will drop from approximately 75 volts to 15 volts positive with respect to ground. The cathode output of the tube 2003 is coupled to a diode rectifier 2007 the anode of the rectifier 2007 being returned to a positive potential through the resistor 2008 so that the rectifier 2007 is normally conductive. Accordingly, when the cathode potential of the tube 2003 drops to 15 volts the anode of the rectifier 2007 will drop a corresponding amount to approximately 15 volts positive with respect to ground. The output of the rectifier 2007 is coupled through the resistor 2010 to the control grid of an inverter tube 2011 and is also coupled to the cathode of a diode rectifier 2012, the control grid of the tube 2011 being connected to a negative one hundred volt supply through the resistor 2017. The tube 2011 is normally conductive and the flow of plate current through the anode resistor 2013 thereof normally provides a relatively low potential at the anode of the tube 2011.

When the tube 2202 in the register 2200 is fired in response to a digit of "2," the grid potential on the inverter tube 2011 is reduced so that the plate current through this tube is cut off and the anode potential of the tube 2011 rises to +150 volts. The anode of the tube 2011 is coupled to the cathode of a diode rectifier 2014 which forms one section of an "and" gate and the anode of the rectifier 2014 is connected to the anode of a rectifier 2015 which forms the other section of this "and" gate, the cathode of the rectifier 2015 being connected to the cathode of the hundreds sequence timing tube 2108 in the hundreds sequence timing circuit 2102 over the conductor 2109. The hundreds sequence timing tube 2108 is normally non-conductive and the cathode of this tube is normally at ground potential. The common connection of the anodes of the two rectifiers 2014 and 2015 is connected to the control grid of a reset tube 2018.

When the cathode of the hundreds sequence timing tube 2108 is at ground potential the rectifier 2015 is conducting current and holds the grid potential of the reset tube 2018 at ground potential. However, when the second counting tube 2202 in the register 2200 is fired, the rectifier 2014 is rendered non-conductive and when the hundreds sequence timing tube 2108 is fired during the interdigit pause between the first and second digits, the potential on the conductor 2109 becomes positive so that the rectifier 2015 is also cut off with the result that the grid potential of the reset tube 2018 starts to increase positively toward the +B switch potential on the conductor B150*d* through the resistor 2020, the condenser 2021 being connected from the grid of the tube 2018 to ground to bypass sharp voltage fluctuations and to prevent false firing of the reset tube 2018. When the rectifiers 2014 and 2015 are both cut off the grid potential of the tube 2018 is permitted to increase positively towards the potential of the conductor B150*d*, so that the reset tube 2018 is fired and current flows through the cathode resistor 2022 of the tube 2018. The cathode of the tube 2018 is connected through a capacitor 2023 and a resistor 2024 to ground, the values of the resistors 2022 and 2024 and the condenser 2023 being so chosen that a positive pulse is developed across the resistor 2024 after which the reset tube 2018 is extinguished. In this connection it will be noted that the action of the reset tube 2018 is substantially identical to that of the hundreds register pulser 2101 described in detail in the above identified copending application Serial No. 326,213 and hence a detailed description of the relaxation type of operation which results in the production of a positive pulse across the resistor 2024 need not be described in detail herein.

In order to reset the hundreds digit register 2200 in response to the dialing of a digit "2," the positive pulse developed across the resistor 2024 is coupled through the condenser 2025, through the resistor 2026 and over the conductor 2027 to the control grid of the priming tube 2115 in the hundreds digit register 2200. The positive pulse thus applied to the control grid of the priming tube 2115 causes this tube to be fired so that a relatively large potential is developed across the common cathode resistor 2116 of the register 2200 with the result that the second counting tube 2202 in the register 2200 is extinguished and all of the tubes in the register 2200 remain extinguished until positive pulses corresponding to the next digit of dial impulses are impressed upon the common cathode resistor 2116 from the hundreds register pulser 2101. Accordingly, as soon as the reset tube 2018 is fired the register 2200 is reset to zero but is held in such condition that it will respond to the next digit of dial impulses by firing the corresponding counting tube in the register 2200.

In order to reset the hundreds sequence timing circuit 2102 in response to a dialed digit of "2" so that this circuit may be used to detect the interdigit pause between the second and third dialed digits, the positive pulse developed across the resistor 2024 in the circuit 2000 is also coupled through the condenser 2030 and through a parallel combination of a resistor 2031 and a rectifier 2032 to the conductor 2109 and hence to the cathode of the sequence timing tube 2108 in the sequence timing circuit 2102. The positive pulse thus impressed upon the cathode of the tube 2108 is of sufficient amplitude to extinguish the tube 2108 and hence reset the sequence timing circuit 2102 so that it can respond to the interdigit pause between the second digit and third digit. The rectifier 2032 is provided to prevent the priming tube 2115 in the register 2200 from being fired when the sequence timing tube 2108 is fired during the interdigit pause between the first and second dialed digits in situations wherein no digits are to be absorbed. Thus, the rectifier 2032 is so polarized that it permits positive pulses to be transmitted from the resistor 2024 through the condenser 2030 to the cathode of the tube 2108 but prevents a positive potential developed at the cathode of the tube 2108 during operation of the circuit 2102 from being coupled through the condensers 2030 and 2025 and through the resistor 2026 to the control grid of the priming tube 2115. In this connection it will be understood that if the priming tube 2115 were fired in response to firing of the sequence timing tube 2108 the register 2200 would be reset during the interdigit pause between the first and second digits and registration of the first dialed digit during local calls would be lost.

In the selector B150*b* the idle pulse gate circuit 2103 is arranged to cooperate with the coincidence tube circuit 2201 to select the time position assigned to an idle one of the trunk acceptors or acceptor-connector links in the selected hundreds level, the trunk hunting timing circuit 2300 being employed to terminate this trunk hunting operation at the end of a predetermined test interval in the event that no idle trunk acceptor or acceptor-connector link is found. In the above identified copending application Serial No. 326,213, the idle pulse gate circuit and connector busy lock circuit (which latter circuit corresponds to the circuit 2300) are conditioned from the hundreds sequence timing circuit so as to select the time position of an idle acceptor-connector link in the selected hundreds level when the timing tube in the hundreds sequence timing circuit is fired. However, in accordance with a feature of the present invention, a separate changeover tube 2035 is provided in the digit absorption and register reuse circuit 2000 which is used to control the idle pulse gate circuit 2103 and the trunk hunting timing circuit 2300 in place of the hundreds sequence timing circuit 2102. More particularly, the changeover tube 2035 is controlled by means of an "and gate" which comprises the rectifier 2012 and the rectifier 2036, the anodes of the rectifiers 2012 and 2036 being connected together and to the control grid of the tube 2035. The cathode of the rectifier 2036 is connected to the conductor 2109 which is, in turn, connected to the cathode of the timing tube 2108 in the sequence timing circuit 2102. The cathode of the rectifier 2012 is connected to the anode of the rectifier 2007 and hence is controlled in accordance with the potential drop developed at the anode of the second counting tube 2202 in the register 2200.

Normally, the cathode of the timing tube 2108 is at ground potential so that the cathode of the rectifier 2036 is also at ground potential and the rectifier 2036 conducts current from the +B switch conductor **B150*d* through the resistor 2037. Also, the cathode of the rectifier 2012 is normally at the potential of 75 volts positive which is developed across the cathode resistor 2006 of the tube 2003 and hence the rectifier 2012 is non-conductive during periods when a +B switch potential is impressed upon the conductor B150*d* and the counting tube 2202 is not fired. However, when a digit of "2" is dialed, the tube 2202 is fired and the potential impressed upon the cathode of the rectifier 2012 drops to 15 volts positive. During the interdigit pause the timing tube 2108 is also fired so that the potential on the conductor 2109 increases to approximately 70 volts positive with the result that the rectifier 2036 is rendered nonconductive. The grid potential of the changeover tube 2035 then rises from ground potential to plus 15 volts, at which point the rectifier 2012 conducts and prevents further increase in this grid potential. A positive bias of 15 volts is still below the cutoff potential of the gas tube 2035 and hence this tube remains non-conductive. Accordingly, no changeover potential is developed by the tube 2035 in response to a digit of "2" and, accordingly, the idle pulse gate circuit 2103 and the trunk hunting timing circuit 2300** are not conditioned for operation.

If a digit other than "2" is dialed the cathode potential of the rectifier 2012 remains at 75 volts positive and when the timing tube 2108 is fired during the interdigit pause the rectifier 2036 is rendered non-conductive so that both the rectifiers 2012 and 2036 are cut off. When this occurs, the grid potential of the tube 2035 is permitted to increase positively toward the +B switch conductor **B150*d* and the changeover tube 2035** is fired when grid potential exceeds 15 volts positive.

When the tube 2035 is fired it remains conductive for the duration of the call and produces a positive voltage across the cathode resistor 2038 thereof which is employed as a changeover potential to control the circuits 2103 and 2300. More particularly, the voltage produced across the resistor 2038 is connected by way of the conductor 2039 and through the resistor 2120 to the shield grids **2121*a* and 2121*b* which surround the second control grid 2121*c* of the idle pulse gate tube 2121. Accordingly, the idle pulse gate tube 2121 is thereafter conditioned to respond to idle pulses which are impressed upon the first control grid of the tube 2121 from the conductor B197, selector allotting pulses which are supplied from the common equipment to the second control grid of the tube 2121 and tens pulses which are selected in the register 2200 and represent the selected hundreds level in the Baker office 40, these tens pulses being impressed upon the third control grid of the tube 2121 through the condenser 2122. The changeover potential developed on the conductor 2039 is also supplied through the resistor 2305 to charge the condenser 2306 positively, the potential developed across the condenser 2306 being impressed upon the control grid of the trunk hunting timing tube 2307 through the resistor 2308 so that if none of the coincidence tubes in the circuit 2201 are fired during the trunk hunting test interval the tube 2307 will be rendered conductive and will disable the idle pulse gate circuit 2103**, as described in detail in the above identified copending application, Serial No. 326,213, in connection with the connector busy lock circuit thereof.

From the above description it will be noted that no changeover potential is developed on the conductor 2039 in response to the dialing of a digit "2" since each time this digit is dialed the counting tube 2202 is fired and the rectifier 2012 prevents an increase in grid potential above 15 volts positive even though the rectifier 2036 is rendered non-conductive at the end of each interdigit pause. Accordingly, successive digits of "2" which represent the local numbers within the Baker office 40, are successively absorbed by the selector B150*b* and the circuits 2103 and 2300 are not conditioned in response thereto to permit extension of the connection to other linkage. However, when a digit other than "2" is dialed, or after an initial digit of "1" is dialed, the selector B150*b* responds thereto by registering the hundreds level corresponding to the dialed digit, the changeover tube 2035 responds by developing a changeover potential on the conductor 2039 in the manner described above, and the idle pulse gate circuit 2103 is conditioned to supply idle pulses representing idle linkage in the selected hundreds level to the coincidence tube circuit 2201 so as to permit extension of the call to an idle acceptor-connector link or a trunk acceptor in the selected hundreds level. In this connection it will be noted that a condenser 2040 is connected between the control grid of the changeover tube 2035 and ground so that positive voltage spikes which may be coupled through the rectifiers 2012 and 2036 cannot cause the changeover tube 2035 to be fired prematurely. The time constant of the resistor 2037 and the condenser 2040 is relatively short as compared to the interdigit pause but is long as compared to the tube ionization and deionization time of the counting tubes in the register 2200.

In order to provide facilities for absorbing a first digit of "1" while providing reuse of the first hundreds level after the first digit has been dialed, the anode of the first counting tube 2130 in the register 2200 is connected by way of the conductor 2131 and through a large condenser 2045 to the control grid of a cathode follower tube 2046 in the circuit 2000. The tube 2046 operates in a manner similar to that described above in connection with the cathode follower tube 2003, the control grid of the tube 2046 being biased positively from the +B switch conductor B150*d* through the resistors 2047 and 2048. Accordingly, the voltage developed across the cathode resistor 2049 of the tube 2046 is normally about 75 volts positive and drops to 15 volts positive when a digit of "1" is dialed and the tube 2130 is fired. The potential developed across the cathode resistor 2049 is impressed upon the anode of a diode rectifier 2052 the cathode of which is connected through the resistor 2053 to the minus one hundred volt supply. A diode rectifier 2054 is connected between the cathode of the rectifier 2052 and the cathode of an unlocking tube 2056, the tube 2056 being normally non-conductive so that no potential is developed across the cathode resistor 2057 thereof with the result that the anode of the rectifier 2054 is normally at ground potential. When the cathode of the cathode follower tube 2046 is 75 volts positive with respect to ground, the rectifier 2052 is conductive so that the grid potential of a third cathode follower tube 2060 is held at approximately 75 volts positive, i.e., the potential at the cathode of the tube 2046. When the rectifier 2052 is conductive the cathode of the rectifier 2054 is also 75 volts positive so that the rectifier 2054 is cut off since the anode of this rectifier is at ground potential. The cathode follower tube 2060 is provided with a cathode resistor 2061 and the cathode of the tube 2060 is connected through a rectifier 2062 to the junction point of the rectifier 2007 and the resistor 2008.

If the cathode potential of the tube 2060 is approximately 75 volts positive the rectifier 2062 has no effect upon the rectifier 2007 and if a digit of "2" is dialed and the cathode potential of the tube 2003 drops to 15 volts positive the rectifier 2062 is rendered non-conductive since the anode potential of the rectifier 2062 falls to plus fifteen volts. However, if a digit of "1" is dialed the cathode potential of the tube 2046 drops to approximately 15 volts positive in a manner substantially identical to that described above in connection with the cathode follower tube 2003 when a digit of "2" is dialed. When the cathode potential of the tube 2046 drops to 15 volts positive the rectifier 2052 remains conductive so that the potential at the control grid of the tube 2060 also drops to plus fifteen volts with the result that the potential developed across the cathode resistor 2061 also drops to a relatively small positive value. When this occurs the rectifier 2062 functions to cut off the inverter tube 2011 in a manner similar to that produced when the cathode potential of the tube 2003 is reduced in response to a digit of "2." It will, therefore, be seen that the rectifiers 2007 and 2062 constitute an "or" gate wherein a drop in potential from 75 volts positive to 15 volts positive at either the cathode of the tube 2003 or the cathode of the tube 2060 produces a drop in potential at the control grid of the inverter tube 2011.

When a digit of "1" is dialed and the potential at the cathode of the tube 2060 drops to approximately 15 volts positive the reset tube 2018 is fired during the interdigit pause when both of the rectifiers 2014 and 2015 are rendered non-conductive. However, as described above, no changeover potential is developed on the conductor 2039 since the rectifier 2012 prevents the tube 2035 from firing to a dialed digit of "1" as well as a dialed digit of "2." When the reset tube 2018 is fired and positive pulse produced at the cathode of this tube is employed to reset the register 2200 and the circuit 2102 and is also coupled through a condenser 2065 to the control grid of the unlocking tube 2056, this control grid being biased positively to approximately 75 volts by a voltage divider network which includes the resistors 2066 and 2067. This positive pulse from the reset tube 2018 causes the unlocking tube 2056 to fire with the result that a positive potential is thereafter produced across the cathode resistor 2057 thereof. When this occurs the rectifier 2054 is rendered conductive and holds the potential at the control grid of the tube 2060 at approximately 75 volts positive independently of the rectifier 2052.

When the digit "1" is redialed for the second time the cathode potential of the tube 2046 drops to plus fifteen volts as before but the only result of such potential decrease is that the rectifier 2052 is rendered non-conductive since the rectifier 2054 continues to conduct and to hold the grid potential of the tube 2060 at 75 volts positive with respect to ground. Accordingly, when the second digit "1" is dialed the cathode potential of the tube 2060 does not change appreciably and during the interdigit pause between the second and third digits the timing tube 2108 fires so that a positive potential is produced on the conductor 2109. Both of the rectifiers 2012 the 2036 are therefore rendered non-conductive so that the changeover tube 2035 can fire and produce a changeover potential on the conductor 2039. It will thus be seen that by causing the unlocking tube 2056 to respond to the reset pulse developed by the reset tube 2018 and by controlling the rectifier 2054 in response to current flow through the unlocking tube 2056, when the second digit of "1" is dialed the reset tube 2018 is prevented from firing while the changeover tube 2035 is permitted to fire so as to permit the selection of an idle trunk acceptor by the coincidence tube circuit 2201.

Considering now the operation of the circuit 2000 and assuming that the number "116" is dialed by the subscriber on the line 523 in the Baker office 40 to obtain the time of day at the information center 46, when the first digit "1" is dialed the counting tube 2130 is fired in response thereto and the potential at the cathode of the tube 2046 in the circuit 2000 drops to approximately 15 volts positive. The rectifier 2052 remains conductive since this rectifier is connected through the resistor 2053 to the minus one hundred volt supply so that the grid potential and hence the cathode potential of the tube 2060 also drops to a low positive potential. The rectifier 2062 remains conductive since it is connected through the resistor 2008 to the plus one hundred fifty volt supply so that the potential on the grid of the inverter tube 2011 drops beyond the cutoff point of the tube 2011, the anode potential of the tube 2011 rises and the rectifier 2014 is cut off. During the interdigit pause between the first and second digits the potential on the conductor 2109 increases positively by the firing of the timing tube 2108 in the timing circuit 2102 so that the rectifier 2014 is also cut off and the grid potential on the reset tube 2018 increases positively by an amount sufficient to cause this tube to fire. When the reset tube 2018 fires a positive pulse is supplied to the control grid of the priming tube 2115 in the register 2200 so that all counting tubes are extinguished and the register is reset to zero. The positive reset pulse is also coupled through the condenser 2065 to the grid of the unlocking tube 2056 so that this tube is fired and remains conductive for the duration of the call. The positive reset pulse is also coupled to the cathode of the timing tube 2108 so as to extinguish this tube and reset the circuit 2102 so that it can sense the next interdigit pause. As soon as the timing tube 2108 is extinguished the cathode potential thereof drops to zero so that the rectifier 2036 is again rendered conductive and prevents the changeover tube 2035 from firing. In this connection it will be understood that the rectifier 2036 is rendered non-conductive when the timing tube 2108 is fired during the interdigit pause and before a reset pulse is produced by the tube 2018 to extinguish the tube 2108. However, the condenser 2040 is of sufficiently large capacitance to prevent the tube 2035 from firing during the brief period required to fire the reset tube 2018 and extinguish the timing tube 2108. The condenser 2040 does not, however, prevent the tube 2035 from firing during the interdigit pause of succeeding digits as will be described in more detail hereinafter.

When the second digit "1" of the number "116" is dialed, the first counting tube 2130 in the register 2200 will again be fired and the potential at the cathode of the tube 2046 will again fall to approximately 15 volts positive. However, the unlocking tube 2056 is now conductive so as to maintain the cathode of the rectifier 2052 at approximately 75 volts positive with the result that the potential drop at the cathode of the tube 2046 is not repeated to the tube 2060 but merely has the effect of rendering the rectifier 2052 non-conductive. Accordingly, no change in potential is produced at the grid of the inverter tube 2011 and the reset tube 2018 is not fired during the interdigit pause between the second and third digits. The rectifier 2012 is, therefore, held non-conductive and during the interdigit pause between the second and third digits the potential on the conductor 2108 increases to approximately 70 volts positive due to firing of the timing tube 2108 with the result that the rectifier 2036 is also rendered non-conductive and after a brief delay occasioned by the condenser 2040 the changeover tube 2035 is fired and produces a changeover potential on the conductor 2039. This changeover potential conditions the idle pulse gate circuit 2103 and the trunk hunting timing circuit 2300 to perform their normal functions.

When the counting tube 2130 is fired in response to the second digit of "1," the rectifier 2140 in the anode circuit of the tube 2130 is rendered conductive so that tens pulses which are impressed upon the tens pulse conductor B32*a* are coupled through the condenser 2141, through the rectifier 2140 and through the condenser 2142 to the common output conductor 2209 of the register 2200. The tens pulses appearing on the conductor 32*a* span the ten time positions assigned to the first hundreds level in the Baker office and are supplied through the condenser 2122 to the third control grid of the idle pulse gate tube 2121 and through the condenser 2135 to a control grid of the selector pulse forming tube 2136.

When he idle pulse gate tube 2121 is conditioned for operation by the changeover potential produced on the conductor 2039 in the manner described above, the gate tube 2121 functions to select from the idle pulses appearing upon the conductor B197 only those idle pulses which occur during the span of the tens pulses appearing upon the conductor B32*a*, i.e., during the ten time positions assigned to the first hundreds level, and supplies these selected idle pulses to all of the coincidence tubes in the coincidence tube circuit 2201 in parallel. The units pulses sequentially appearing upon the conductors B31*a*, B31*b*, B31*c* to B31*j*, inclusive, are supplied to the shield grids of the counting tubes in the circuit 2201 and when one of these units pulses coincides with one of the selected idle pulses supplied to the circuit 2201 the corresponding coincidence tube is fired and the selected units pulses are supplied over the common output conductor 2210 of the circuit 2201 and through the condenser 2137 to the first control grid of the selector pulse forming circuit 2136. The selected tens and units pulses are combined in the tube 2136 to produce selector pulses which occur in the time position assigned to an idle one of the trunk acceptors in the first hundreds level, these selector pulses being transmitted over the conductor 2145 to the forward outgate circuit 2501 and the return reconstructor circuit 2600.

Assuming that the trunk acceptor B111*a* in the first hundreds level is idle and the time position 11 assigned thereto is selected, selector pulses in this time position are coupled to the second control grid of the selector-forward gate tube 2510 and linkage sampling pulses of narrower width, which occur in each time position, are supplied from the common equipment over the conductor B400*b* to the first control grid of the tube 2510 so that this tube gates selector-forward signal pulses to the selector-forward conductor B195 only in the time position 11 assigned to the trunk acceptor B111*a*. The selector B150*b* is then operatively associated with the trunk acceptor B111*a* in the first hundreds level of the Baker office 40 through the selector-forward coupling circuit B186, the selector-return coupling circuit B188 and the idle pulse coupling circuit B187. The selector-forward signal pulses are interrupted during each dial impulse of the third digit "3" dialed at the calling substation by application of a negative biasing potential from the circuit 2400 to the first control grid of the gate tube 2510 over the conductor 2511 and the trunk acceptor B111*a* functions to convert the dial impulse modulated selector-forward signal pulses into the corresponding electromechanical loop dialing signals which are transmitted over the associated trunk 54*a* to the information center 46. In the information center 46 the dial impulses corresponding to the digit "6" are registered in the incoming selector 76*a* and the call is extended to the trunk circuit 88 associated with the automatic time of day announcing facilities, as will be readily understood by those skilled in the electromechanical telephone art.

Considering now the operation of the circuit 2000 in handling a local call between two different lines in Baker office 40, when a first digit of "2" is dialed the counting tube 2202 in the register 2200 is fired and the cathode potential of the tube 2003 in the circuit 2000 is reduced to approximately 15 volts positive. This potential decrease is transmitted to the inverter tube 2011 and causes the rectifier 2014 to become non-conductive. During the interdigit pause between the first and second digits a positive potential is produced on the conductor 2109 by firing of the timing tube 2108 in the sequence timing circuit 2102 so that the rectifier 2015 is also rendered conductive and the reset tube 2018 is fired. When the reset tube 2018 fires a positive reset pulse is applied to the priming tube 2115 in the register 2200 to reset this register in the manner described above, is applied to the cathode of the timing tube 2108 to extinguish this tube and is also applied to the unlocking tube 2056 to render this tube conductive. The condenser 2040 functions to prevent the changeover tube 2035 from firing during the brief period when the timing tube 2108 is fired during the interdigit pause.

When a second digit of "2" is dialed the counting tube 2202 is again fired with the result that the reset tube 2018, which was extinguished after the first reset pulse is again fired in the manner described above and the register 2200 is again reset to zero and the timing tube 2108 is again extinguished. Since the unlocking tube 2056 has already been fired, this tube remains conductive. In this connection it will be noted that each time the counting tube 2202 is fired the circuit 2000 functions to reset the register 2200 to zero so that the tube 2202 is never called upon to control the gating of tens pulses from the conductor B32*b* to the output conductor 2209. Accordingly, the conductor B32*b* may be omitted from the cable B32 to all of the local selectors in the Baker office, if desired, so that registration of the digit "2" in the first selector stages of the Baker office is positively prevented. When a third digit of, for example, "5" is dialed at the calling substation the fifth counting tube 2205 in the register 2200 is fired so that tens pulses appearing upon the conductor B32*e* are coupled through the rectifier 2206 and through the condenser 2207 to the common output conductor 2209 of the register 2200. These tens pulses span the tens pulse time positions assigned to the fifth hundreds level in the Baker office 40 and are employed by the idle pulse gate tube 2121 to select only those idle pulses appearing on the conductor B197 which occur in these time positions. The selected idle pulses are transmitted to the coincidence tube circuit 2201 wherein a particular one of the coincidence tubes is fired by coincidence of one of the idle pulses with a corresponding units pulse. If it is assumed that the first acceptor-connector link B151 in the fifth hundreds level is idle and the first coincidence tube 2150 is fired, and the associated rectifier 2151 will be rendered conductive so as to supply units pulses from the conductor B31*a* to the common output conductor 2210 of the circuit 2201. Accordingly, selector pulses are developed in the time position number 51 of each time position frame, i.e., the time position assigned to the acceptor-connector link B151 and the circuits 2501, 2502 and 2600 are conditioned to respond to selector-forward and selector-return pulses in this time position so that the selector B150*b* is operatively associated with the acceptor-connector link B151. The connector B151*b* then responds to the final two digits of the called number by selecting the time position assigned to the called line within the fifth hundreds level of the system and completes the connection to this called line in a manner substantially identical to that described in detail in the above identified copending application Serial No. 326,213.

In order to prevent the dial tone facilities in the selector B150*b* from returning a dial tone signal to the calling subscriber each time the register 2200 is reset to zero, there is provided in the digit absorption and register reuse circuit 2000 a dial tone control tube 2070 which is connected to the +B switch conductor B150*d* through the anode resistor 2071. The cathode of the register pulser tube 2154 in the register pulser 2101 is connected by way of the conductor 2155 and through the coupling condenser 2072 to the control grid of the dial tone control tube 2070, this control grid being biased positively by means of the voltage divider network including the resistors 2073 and 2074 connected between the conductor B150*d* and ground. The anode of the dial tone control tube is connected by way of the conductor 2075 to the dial tone gate circuit 2302 and more specifically through the resistors 2310 and 2311 to the control grid of the dial tone gate tube 2312, the resistor 2313 being connected from the junction point of resistors 2310 and 2311 to the minus 100 volt supply to provide a suitable bias voltage so that the tube 2312 is normally biased beyond cutoff by an amount sufficient to prevent this tube from transmitting therethrough the dial tone signal which is impressed thereon from the common equipment conductor B47 through the coupling condenser 2314. When the dial tone control tube 2070 is non-conductive the potential on the conductor 2075 is the same as the +B switch potential on the conductor B150*d* and the resistors 2310, 2311 and 2313 in the dial tone gate circuit 2302 are so chosen that a dial tone signal is transmitted through the tube 2312 under these conditions. Accordingly, as soon as the finder-selector link B150 is seized and a +B switch potential is applied to the conductor B150*d* the dial tone gate tube 2312 is rendered effective to transmit a dial tone signal therethrough and this dial tone signal is routed to the calling subscriber in the manner described in detail in the above identified copending application, Serial No. 326,213. However, as soon as the first impulse of the first digit is repeated through the register pulser tube 2154 a positive pulse is produced on the conductor 2155 which is coupled through the condenser 2072 to the grid of the dial tone control tube 2070 so that this tube is fired. When the tube 2070 is fired the potential on the conductor 2075 is reduced due to the potential drop through the anode resistor 2071 so that the control grid circuit of the dial tone gate tube 2312 is biased sufficiently beyond cutoff to prevent the dial tone signal from being transmitted through this tube. Accordingly, dial tone signal transmission to the calling subscriber is positively prevented as soon as the first impulse of the first digit is dialed and independently of the operation of the register 2200. The dial tone control tube 2070 remains conductive for the duration of the call so as to hold the dial tone gate tube 2312 continuously beyond cutoff and thereby prevent any further transmission of the dial tone signal to the calling subscriber.

When the call involving the selector B150*b* is terminated, the finder B150*a* ceases to produce a +B switch potential on the conductor B150*d* so that all of the register counting tubes and coincidence tubes in the register 2200 and the coincidence tube circuit 2201 are extinguished. Furthermore, in the digit absorption and register reuse circuit 2000 the unlocking tube 2056, the changeover tube 2035 and the dial tone control tube 2070 are all extinguished since these tubes are controlled from the +B switch conductor B150*d*. Accordingly, all of these tubes are thereafter permitted to respond in the manner described above during the next call in the event that local calls or calls to the information center 46 are placed. Preferably the tubes 2018, 2035, 2056 and 2070 are all gas tubes of the commercial type 5823, the remaining tubes in the circuit 2000 being preferably of the commercial type 6C4.

In the selector B150*d* facilities are provided for high percentage trunking between the Baker office 40 and the Dexter office 42. More specifically, the local selectors in each of the fifth, sixth, seventh, eighth and ninth hundreds levels in the Baker office 40 are divided into two groups identified as type A and type B local selectors, the type A local selector responding to either a digit of "3" or a digit of "4" by selecting the third hundreds level in the Baker office and the type B local selectors responding to either a dialed digit of "3" or a digit of "4" by selecting the fourth hundreds level in the Baker office 40. Accordingly, the ten time positions normally assigned to the third hundreds level and the ten time positions normally assigned to the fourth hundreds level may all be individually assigned to the trunk acceptors associated with the outgoing trunks 50*a* to 50*t*, inclusive, to the Dexter office 42 so that calls having an initial digit of "3" and intended for the Dexter office 42 may seize one of these trunks and calls having an initial digit of "4" and intended for the Hillside office 44 may also use any idle one of these trunks.

In the selector B150*b* which is a type A local selector, facilities are provided in the register 2200 so that this register responds to either an initial dialed digit of "3" or an initial digit of "4" by selecting the tens pulses which span the ten time positions numbered 31, 32, 33–30, inclusive, which would normally be assigned to the third hundreds level. More particularly, the tens pulses appearing upon the conductor B32*c* are coupled through the condenser 2215 to the gating rectifier 2216 associated with the third counting tube 2217 in the register 2200 and these tens pulses are also coupled through the condenser 2218 to the gating rectifier 2219 associated with the fourth counting tube 2220 in the register 2200, the fourth tens pulse conductor B32*d* being omitted from the cable B32 to the type A local selectors. If the third counting tube 2217 is fired in response to a dialed digit of "3" tens pulses appearing upon the conductor B32*c* are coupled through the rectifier 2216 and through the condenser 2221 to the output conductor 2209 of the register 2200. On the other hand, if the fourth counting tube 2220 is fired in response to a dialed digit of "4" the rectifier 2219 is rendered conductive so as to transmit tens pulses appearing upon the conductor B32*c* through the condenser 2222 to the output conductor 2209. With this arrangement the selector B150*b* is prevented from gaining access to the fourth hundreds level since no tens pulses corresponding to the time positions assigned to the fourth hundreds level are supplied to this selector.

In the illustrated embodiment the type A and type B local selectors are alternately assigned to simultaneously calling lines in each hundreds level. Thus, the first calling line in the fifth hundreds level is assigned the type A local selector B150*b* and when the finder-selector link B150 is operatively associated with this calling line the self-allotting circuit in the finder B150*a* conditions the type B finder-selector link B152 to seize the next calling line. If a third call is placed while two other calls are simultaneously in progress from the fifth hundreds level, the next finder-selector link having a type A local selector will be seized, a fourth simultaneously calling line will seize a type B local selector, etc. Accordingly, the traffic to the trunk acceptors corresponding to the twenty outgoing trunk 50*a* to 50*t*, inclusive, to the Dexter office 42 is substantially uniformly distributed between type A and type B local selectors in each local hundreds level of the Baker office 40.

The type B local selectors in the Baker office 40 are substantially identical to the selector B150*b* with the exception that in the type B local selectors the tens pulses appearing upon the conductor B32*d* are supplied to the gating rectifiers 2216 and 2219 respectively associated with the third and fourth counting tubes 2217 and 2220 in the register 2200. Accordingly, when either a digit of "3" or a digit of "4" is dialed on a call involving a type B local selector the tens pulses which span the ten time positions normally assigned to the fourth hundreds level are gated to the output conductor 2209 of the register 2200 so that idle pulses corresponding to the ten trunk acceptors associated with the trunks 50*k* to 50*t*, inclusive, such as the illustrated trunk acceptor B141*a*, may be selected and a connection established to one of these trunks. In this manner, relatively high percentage trunking is afforded between the Baker office 40 and the Dexter office 42 without increasing the number of time positions required in the basic time position frame of either office and without increasing the complexity of the wiring or the number of selectors required in each hundreds level of the system. In this connection it will be noted that on a call intended for one of the offices 42 or 44, or the operator at the information center, the circuit 2000 functions to handle the call in the normal manner. Thus, if a first digit of "3" is dialed on a call to the Dexter office 42, the reset tube 2018 is not fired but the changeover tube is fired during the first interdigit pause so that a changeover potential is produced on the conductor 2039 and a connection is established to an idle trunk acceptor in either of the two groups of ten trunk acceptors associated with the twenty trunks 50 to the Dexter office, depending upon whether the local selector extending the connection is a type A or a type B local selector. If the first digit is "4" on a call intended for the Hillside office 44, the above described operation would be identical since the type A and type B local selectors do not distinguish between the digit "3" and the digit "4," it being understood that the call would be extended from the Dexter office to the Hillside office in response to the second digit of "4." If a first digit of "0" is dialed, an idle trunk acceptor in the tenth hundreds level would be selected and the call extended over the associated one of the trunks 52 to the operator board at the information center 46.

*Type D and type E local selectors*

In the Dexter office 42 a group of five type D local selectors and a group of five type E local selectors are employed in each of the fifth, sixth, seventh and eighth hundreds level of this office. The type D and type E local selectors are arranged to be alternately assigned to the use of simultaneously calling lines in the same hundreds level in a manner similar to that described above in connection with the type A and type B local selectors in the Baker office 40.

The type D and type E local selectors are identical in circuitry, are arranged to return dial tone to the calling subscriber until the first digit is dialed, and include facilities for absorbing all digits of "3" and absorbing a first digit of "1" with reuse of the first hundreds level. In addition, these selectors are provided with facilities for blocking the ninth hundreds level except when certain preferred calling lines in the Dexter office initiate the call in which latter case all levels of the Dexter office are accessible to the calling lines. More particularly, in the type D and type E local selectors the digit absorption and register reuse circuits are identical to the circuits shown and described above in connection with the type A local selector B150*b* with the exception that in the type D and type E selectors the conductor 2203 is connected to the anode of the third counting tube 2217 in the register 2200 so that the type D and type E selectors will absorb digits of "3" instead of digits of "2" as in the selector B150*b*.

In order to permit certain preferred subscribers in the Dexter office 42 to gain access to the ninth hundreds level of this office and employ the trunks 64 to dial the main dial office numbers directly, each of the type D and type E local selectors in the Dexter office is provided with a selector restricted service circuit such as the selector restricted service circuit 3500 associated with the selector D150*b* which is shown in detail in Fig. 35 of the drawings. Referring to this figure, a restricted service marking generator 3501 is provided in each of the fifth, sixth, seventh and eighth hundreds levels for the associated group of type D and type E local selectors in the corresponding hundreds level. The marking generator 3501 is supplied with tens pulses over the tens pulse conductors forming the illustrated cable D32 and with units pulses over the ten units pulse conductor forming the illustrated cable D31 from the common equipment of the Dexter office. The generator 3501 may be substantially identical to the trunk marking pulse generator B194e associated with the fifth hundreds level in the Baker office 40 and may be substantially identical to the trunk marking pulse generators shown and described in the above identified copending application Serial No. 326,213.

In general, the generator 3501 comprises a matrix arrangement wherein the tens and units pulses are combined in order to produce on the output conductor 3503 of the generator 3501 restricted service marking pulses of positive polarity which occur in the time positions assigned to the preferred service lines in the fifth hundreds level of the Dexter office 42. These restricted service marking pulses are coupled through a condenser 3504 to the suppressor grid of a mixing tube 3505, this control grid being biased negatively by means of the resistor 3506 which is connected to the minus one hundred volt supply. Finder gate pulses which are developed by line finder D150a which is associated with the selector D150b are transmitted by way of the conductor D150c and the condenser 3506 to the first control grid of the tube 3505, this first control grid also being biased negatively by means of the resistor 3507 which is connected to the minus one hundred volt supply. The cathode of the tube 3505 is biased negatively by means of the voltage divider which includes the resistors 3509 and 3510 and the anode of the tube 3505 is connected to ground through the anode resistor 3511, a condenser 3512 being connected across the resistor 3511. The finder gate pulses developed on the conductor B150c occur in the time position assigned to the calling line in the fifth hundreds level of the Dexter office 42 with which the finder-selector link D150 is associated and if the calling line is in the preferred group these finder gate pulses will coincide with restricted service marking pulses on the conductor 3503 and the tube 3505 will be rendered conductive so that a negative voltage is developed across the anode resistor 3511, the condenser 3512 functioning to filter out the pulse frequency components of the anode wave. The negative voltage developed across the resistor 3511 is employed to drive the control grid of a cathode follower tube 3515 negatively, the anode of the tube 3515 being connected to ground and the cathode of this tube being connected through the resistor 3516 to the minus one hundred volt supply. Accordingly, the cathode potential of the cathode follower tube 3515 drops negatively by an amount substantially equal to the voltage drop across the resistor 3511. The cathode of the tube 3515 is connected through the resistor 3517 to the control grid of a selector restricted service control tube 3520, the anode of the tube 3520 being connected to the plus 150 volt supply and the cathode of the tube 3520 being connected to the cathode of the idle pulse gate tube 3525 and through a resistor 3526 to ground. Positive tens pulses which span the ten pulse time positions assigned to the ninth hundreds level in the Dexter office are supplied over the conductor D32i and through the condenser 3527 to the control grid of the control tube 3520.

Considering now the operation of the selector restricted service circuit 3500, if the calling line is not marked as a restricted service line the finder gate pulses appearing upon the conductor D150c will not coincide with any of the restricted service pulses on the conductor 3503 so that the tube 3505 will remain non-conductive and no voltage will be developed across the anode resistor 3511 thereof. Accordingly, the control grid of the tube 3515 is operated at ground potential and the values of the resistors 3516 and 3517 in the cathode circuit of the tube 3515 are so chosen that the tens pulses appearing on the conductor D32i are repeated through the tube 3520 to the cathode resistor 3526 thereof. The idle pulse gate tube 3525 is substantially identical to the idle pulse gate tube 2121 described in detail above in connection with the selector B150b with the exception of the addition of the cathode resistor 3526, it being understood that the remaining circuits associated with the idle pulse gate tube 3525 have not been shown in Fig. 35 in order to simplify the drawings. When the above described positive tens pulses are repeated across the cathode resistor 3526 the idle pulse gate tube 3525 is prevented from selecting any idle pulses which may appear on the conductor D197 in the time positions spanned by these tens pulses so that the selector D150b is prevented from seizing any of the trunk acceptors, such as the trunk acceptors D911a, D913a in the ninth hundreds level of the Dexter office 42. The idle pulse gate tube 3525 thus remains cut off even though the calling subscriber dials a digit of "9" and the hundreds digit register in the selector D150b develops tens pulses on the output conductor thereof which span the time positions assigned to the trunk acceptors in the ninth hundreds level since the positive tens pulses impressed upon the cathode of the tube 3525 render this tube non-conductive for the duration of these tens pulses irrespective of the pulses applied to the other control grids of the tube 3525. When the idle pulse gate tube 3525 is thus cut off, no idle trunk acceptor is seized during the trunk hunting timing interval and at the end of this interval the selector D150b goes busy and functions to transmit a busy tone signal to the calling subscriber to inform him that no trunk is available to his line by dialing the prefix digit "9."

If, on the other hand, the calling line in the fifth hundreds level of the Dexter office 42 is marked as a preferred service line, the finder gate pulses on the conductor D150c will coincide with restricted service marking pulses on the conductor 3503 so that the tube 3505 will be rendered conductive and the control grid of the tube 3515 will be driven negatively. When this occurs the control grid of the tube 3520 is driven sufficiently negative to prevent the tens pulses appearing on the conductor D32i from being repeated through the tube 3520 so that no tens pulses are produced across the cathode resistor 3526. Accordingly, the idle pulse gate tube 3525 functions in a normal fashion to pass those idle pulses appearing upon the conductor D197 which occur in the time positions assigned to idle ones of the trunk acceptors D911a, D913a in the ninth hundreds level so that the selector D150b is operatively associated with an idle one of the trunks 64a to 64j, inclusive, to the main dial office 48.

*Type N and type O local selectors*

In the Hillside office 44 the type N and type O local selectors are, in general, similar to the type A and type B local selectors employed in the Baker office 40 and described in detail above. More particularly, the type N and type O local selectors are provided with facilities for absorbing a first digit of "1" with reuse of the first hundreds level, the circuitry which is employed to accomplish these functions being substantially identical to that described in detail above in connection with the local selector B150b. In addition, the type N and type O local selectors are provided with facilities for absorbing all digits of "4" to provide for local calls within the Hillside office. In these selectors the anode of the fourth counting tube in the hundreds digit register is connected to the digit absorption and register reuse circuit instead of the illustrated connection to the second counting tube of the register in the selector B150b. However, in other respects the digit absorption circuitry in the type N and type O local selectors is identical to that described in detail above in connection with the type A and type B local selectors. The type N local selectors additionally include facilities for responding to either a digit of "2" or a digit of "3" by selecting the second hundreds level in the Hillside office 44, while rendering the third hundreds level of this office inaccessible to the type N local selectors. The circuitry required to perform these functions is substantially identical to that described in detail above in connection with the selector B150*b* wherein the register response to a digit of "3" or a digit of "4" by selecting the third hundreds level while blocking the fourth hundreds level. More particularly, in the type N local selectors the second tens pulse conductor B32*b* is connected to the gating rectifiers associated with both the second and third counting tubes in the hundreds digit register of the type N local selectors so that if either the second or third counting tube is fired tens pulses will be gated to the output conductor of the register which span the ten time positions assigned to the second hundreds level of the Hillside office 44. Since the third tens pulse conductor B32*c* is omitted, it is impossible for the register to select tens pulses which span the ten time positions assigned to the third hundreds level of the Hillside office and hence the third hundreds level is rendered inaccessible to the type N local selectors.

In the type O local selectors a digit of "2" or a digit of "3" is employed to select the third hundreds level while blocking the second hundreds level. In these selectors the third tens pulse conductor B32*c* is supplied to both the second and third counting tubes of the hundreds digit registers of these local selectors so that dialing of either a digit of "2" or a digit of "3" selects the tens pulses which represent the ten time positions assigned to the third hundreds level of the system.

*Type F incoming selector*

Referring now to Figs. 27 to 33, inclusive, there is shown therein the schematic diagram of the selector D130*b* in the Dexter office 42, this selector being of an incoming selector of the designated type F and terminates the trunk 50*a* which is one of the group of twenty trunks 50 which interconnect the Baker office 40 with the Dexter office 42.

The selector D130*b* is arranged to receive dial impulses and speech signals from the electromechanical trunk 50*a* and to convert these speech signals into corresponding pulse multiplex signals by means of which the call may be extended to the desired hundreds level in the Dexter office 42 and the connection completed to the desired called line in this hundreds level. Since the selector D130*b* terminates the trunk 50*a* and is not concerned directly with the calling subscriber, this selector does not include facilities for returning dial tone when the selector is seized, this function being performed in the first selectors in the electronic office 40. However, the selector D130*b* is arranged to absorb all digits of "3" since the call intended for the Dexter office originates in the Baker office 40 and the trunk 50*a* is seized in response to the first digit of "3" so that it is necessary to absorb the second digit "3" of the prefix which identifies the Dexter office. In addition, the selector D130*b* includes facilities for blocking the first, second, ninth and tenth hundreds level in the Dexter office 42 so as to prevent calls incoming on the trunk 50*a* to be extended to these blocked levels. Such an arrangement is necessary to prevent the system from responding to incorrectly dialed numbers by tying up linkage and thus decreasing the efficiency and the traffic handling abilities of the system.

In order to perform the above described functions, the selector D130*b* includes a digit absorption circuit 2700, a hundreds sequence timing circuit 2800, a hundreds register inverter circuit 2801, a hundreds register pulser 2802, a hundreds digit register 2900, an idle pulse gate circuit 2803, a selector pulse forming circuit 2804, a coincidence tube circuit 2901, a trunk hunting timing circuit 3100, a busy tone gate circuit 3101, a dial impulse integrator circuit 3102, a forward outgate circuit 3103, a return ingate circuit 3200, a two-way trunk terminating circuit 3201, and a selector +B potential supply circuit 3300.

Considering first the two-way trunk terminating circuit 3201, closure of the tip and ring conductors 3202 and 3203 of the one-way loop dialing trunk 50*a* at the Baker office 40 is employed to control the application of a selector +B potential to certain circuits in the selector D130*b* to condition these circuits for operation in extending the call to the desired hundreds level in the Dexter office 42 or to the Hillside office 44. More particularly, the tip conductor 3202 is connected through one winding 3204 of the coupling transformer 3205 to ground and the ring conductor 3203 is connected through the winding 3206 of the transformer 3205 and through the winding of a relay 3207 to the minus 48 volt supply, a condenser 3208 being connected from one side of the winding 3206 to ground so as to provide a speech path between the conductors 3202 and 3203 through the windings 3204 and 3206. Accordingly, when the tip and ring conductors 3202 and 3203 are closed at the Baker office 40 the relay coil 3207 is energized so as to close the contacts 3209 and 3210 thereof.

When the contacts 3210 are closed a control signal is applied to the selector +B potential supply circuit 3300 in such manner as to cause the circuit 3300 to produce a suitable +B operating potential on the conductor 3301. More particularly, when the contacts 3210 are closed the 100 kilocycle supervisory carrier signal which is supplied from the common equipment over the conductor D37, is coupled through the condenser 3211, the contacts 3210, and the condenser 3302 to the control grid of the +B switching tube 3303, this supervisory carrier signal being of sufficient amplitude to cause the tube 3303 to be fired. When the tube 3303 is fired a positive operating potential is coupled through this tube and through the smoothing choke 3305 to the +B switching conductor 3301. The 100 kilocycle supervisory carrier control signal is also coupled through the condenser 3307 to the control grid of the +B timing tube 3308 so that the tube 3308 is fired during the positive half cycles of this control signal. In the anode circuit of the tube 3308 a condenser charging circuit comprising the condenser 3309 and the resistor 3310 is provided, the tube 3308 being connected across the condenser 3309 so as to discharge this condenser each time the tube 3308 is fired.

During the dialing impulses the loop circuit including the tip and ring conductor 3202 and 3203 is opened and the relay contacts 3210 are also opened during periods when the relay 3207 is deenergized. However, the time constant of the resistor 3310 and the condenser 3309 in the circuit 3300 is sufficiently long that the grid potential of the +B extinguishing tube 3312 does not become sufficiently positive to fire the tube 3312 during the dialing impulses. Accordingly, during dialing the +B switch potential impressed upon the conductor 3301 is not removed so that the circuits controlled thereby in the selector D130*b* are maintained continuously energized. However, when the call is completed and the loop circuit including the conductors 3202 and 3203 is permanently broken the condenser 3309 charges positively by an amount sufficient to cause the tube 3312 to be fired and the resultant positive pulse produced across the cathode resistor 3313 of the tube 3312 is coupled through the condenser 3314 to the cathode of the switching tube 3303 with the result that the tube 3303 is extinguished and the +B switch potential is removed from the conductor 3301. The +B switch potential impressed upon the conductor 3301 in the manner described above is supplied to the dial impulse integrator tube 3105 in the dial impulse integrator circuit 3102, to the trunk hunting control tube 3106 in the trunk hunting timing circuit 3100, to the sequence timing tube 2808 in the timing circuit 2800, to the priming tube 2809 and the ten counting tubes in the hundreds digit register 2900 and to the ten coincidence tubes in the coincidence tube circuit 2901 so that these tubes are conditioned for response to the supervisory signals transmitted over the trunk 50*a*.

When the relay 3207 is energized and the contacts 3209 thereof are closed, the conductor 3215 is grounded so as to ground the control grids of the double triode dial impulse integrator tube 3105. The tube 3105 is connected to the +B switch conductor 3301 through the anode resistor 3110 and the control grids of the two sections of this tube are biased negatively from the negative 100 volt supply by means of the resistors 3111 and 3216. Accordingly, when a +B switch potential is impressed upon the conductor 3301 by the circuit 3300 the dial impulse integrator tube 3105 is prevented from conducting current due to the negative bias on the control grids thereof. However, when the relay contacts 3209 are closed the resistor 3216 is shorted out and the two sections of the tube 3105 draw zero bias current so as to produce a large potential drop across the resistor 3110. Each time the relay contacts 3209 are opened a negative bias is again applied to the control grids of the tube 3105 so that this tube is rendered non-conductive and dial impulses are therefore reproduced across the anode resistor 3110. These dial impulses are filtered by means of the condenser 3115 and are conducted by way of the conductor 3116 and through the condenser 2811 to the control grid of the inverter tube 2812 wherein these dial impulses are inverted and are coupled through the condenser 2813 to the control grid of the pulser tube 2814 in the circuit 2802. The tube 2814 produces a large positive pulse of uniform amplitude and duration in response to each dial impulse and these positive pulses are produced across the common cathode resistor 2815 of the hundreds digit register 2900. The first positive pulse produced across the resistor 2018 causes the primer tube 2809 to be extinguished and the first counting tube 2816 in the register 2900 to be fired. Successive dial impulses are successively counted in the register 2900 with the counting tube corresponding to the total number of impulses in the digit remaining fired at the end of the digit.

Assuming that the first digit of "3" dialed over the trunk 50*a* (actually the second digit of the number dialed at the Baker office 40) is absorbed by the circuit 2700 in a manner described in detail hereinafter, and that the call is intended for a line in the fifth hundreds level in the Dexter office 42, the fifth counting tube 2905 in the register 2900 would remain fired after the digit "5" is dialed into the selector D130*b* and the gating rectifier 2906 in the anode circuit of the tube 2905 would be rendered conductive so as to transmit tens pulses appearing on the conductor D32*e* to the output conductor 2908 of the register 2900. The tens pulses appearing on the conductor D32*e* span the ten time positions assigned to the fifth hundreds level in the Dexter office 42 and are coupled through the condenser 2820 to the third control grid of the idle pulse gate tube 2821 and through the condenser 2822 to the suppressor grid of the selector pulse forming tube 2823. The idle pulse gate circuit 2803 responds to these tens pulses by selecting from those idle pulses which appear on the conductor D197 the idle pulses which occur in the time positions assigned to the fifth hundreds level and transmits corresponding pulses to all of the ten coincidence tubes in the circuit 2901 in parallel.

Assuming that the first acceptor-connector link D151 in the fifth hundreds level is idle and that the coincidence tube 2825 is fired, the gating rectifier 2826 associated with this tube is rendered conductive so as to transmit units pulses appearing upon the conductor D31*a* through the condenser 2828 to the first control grid of the tube 2823 so as to produce selector pulses appearing in the time position assigned to the acceptor-connector link D151 on the output conductor 2830 of the circuit 2804. These selector pulses are transmitted over the conductor 2830 to the second control grid of the selector-forward gating tube 3120 and to the first control grid of the selector return gating tube 3121. The first control grid of the gating tube 3120 is connected through the resistor 3122 to the conductor 3215 which is grounded through the relay contacts 3209 during periods when the relay 3207 is energized. Accordingly, during periods when selector pulses are supplied to the tube 3120 and the first control grid thereof is grounded through the resistor 3122 and the contacts 3209, this tube functions to select only those linkage sampling pulses appearing on the conductor D40*b* which are spanned by the corresponding selector pulses which occur in the time position assigned to the selected acceptor-connector link D151 in the fifth hundreds level of the Dexter office and these selected linkage sampling pulses are transmitted as selector-forward signal pulses over the conductor D195 and through the coupling circuits D186C and D186A to all of the acceptor-connector links and type D trunk acceptors in the Dexter office. An operative connection is thus established to the acceptor-connector link D151 and the connector D151*b* thereafter responds to the last two digits of the called number by establishing a connection to the called line in the fifth hundreds group in the manner described in detail in the above identified copending application Serial No. 326,213.

If the called line in the fifth hundreds level is busy, the busy tone facilities in the connector D151*b* will function to modulate the selector-return pulses which are released to the selector-return coupling circuit D188B in the time position assigned to the acceptor-connector link D151 with a busy tone signal and these modulated selector-return pulses are coupled through the condenser 3125 to the suppressor grid of the selector-return gating tube 3121. Since the gating tube 3121 is also controlled by the selector pulses on the conductor 2830, the tube 3121 functions to select only those selector return pulses which occur in the time position assigned to the acceptor-connector link D151 and the gated selector-return pulses are demodulated in a low pass filter which includes the shunt condensers 3220 and 3221 and the series resistor 3222. The demodulated busy tone signal is then coupled through the condenser 3223 to the control grid of an amplifier tube 3224 the anode circuit of which is coupled through the condenser 3225 to the primary winding 3226 of a coupling transformer 3227. The center tapped secondary winding 3228 of the transformer 3227 is coupled through a symmetrical low pass filter 3229 to the winding 3230 of the line transformer 3205 and a balancing network 3231 in series with the winding 3230. The busy tone signal which is amplified in the tube 3224 is coupled through the transformer 3227 and divides equally between the balancing network 3231 and the winding 3230, the portion of this signal which is developed across the winding 3230 being coupled to the windings 3204 and 3206 so that a busy tone signal is impressed upon the conductors 3202 and 3203 of the trunk 50*a* and is transmitted to the Baker office 40 over this trunk.

If the called line in the fifth hundreds level of the Dexter office is answered, a two-way speech transmission path is then established between the trunk 50*a* and the called line. Thus, speech signals which are impressed upon the trunk 50*a* in the Baker office 40 are coupled to the winding 3230 of the transformer 3205 and a portion of these speech signals are developed between the center tap of the winding 3228 and the junction point of the balancing network 3231 and the winding 3230. The center tap of the winding 3228 is connected by way of the conductor 3235 to the third control grid of the selector-forward gating tube 3120 so that the selector-forward signal pulses released by the tube 3120 in the time position assigned to the acceptor-connector link D151 are modulated by the speech signals which are transmitted over the trunk 50*a*. The speech modulated selector-forward signal pulses are transmitted through the coupling circuits D186C and D186A and over the conductors D196 and D196A, respectively, to all of the acceptor-connector links and the type D trunk acceptors in the Dexter office. However, only the acceptor-connector link D151 is conditioned to respond to these speech modulated selector-forward pulses and the connector D151*b* demodulates the speech modulated selector-forward pulses and resamples the demodulated speech signals in the time position assigned to the called line in the fifth hundreds level. The speech modulated connector pulses are thereafter transmitted to the distributor D15*e* wherein they are again demodulated and are routed over the desired called line.

Speech signals which originate at the called line are modulated on the multiplexer pulses produced by the multiplexer D11*e* in the time position assigned to the called line and these speech modulated multiplexer pulses are transmitted to the acceptor D151*b* wherein they are demodulated and are then remodulated on selector-return pulses occurring in the time position assigned to the acceptor-connector link D151. These selector-return pulses are transmitted by way of the conductor D200A and through the selector-return coupling circuit D188B and over the conductor D199 to the local and incoming selectors of the Dexter office which are connected to this conductor. However, only the selector D130*b* is conditioned to respond to selector-return pulses occurring in the time position assigned to the acceptor-connector link D151 and the speech modulated selector-return pulses are transmitted through the selector-return gating tube 3121, are demodulated in the low pass filter 3220, 3221 and 3222, are amplified in the tube 3224 and are transmitted through the coupling transformers 3227 and 3205 to the trunk 50*a*. The impedance of the balancing network 3231 is substantially identical to the impedance of the winding 3230 so that the return speech signals are not revertively applied over the conductor 3235 to the third control grid of the selector forward gating tube 3120. It will also be noted that while the contacts 3210 of the relay 3207 are opened and closed during transmission of the dial impulses over the trunk 50*a* the time constant 3309, 3310 in the supply circuit 3300 is sufficiently long to prevent the supply circuit 3300 from removing the +B switch potential on the conductor 3301 during the dialing operation so that the selector D130*b* does not lose registration of the digits stored in the register 2900.

Considering now the facilities provided in the selector D130*b* for absorbing all digits of "3" which are transmitted over the trunk 50*a*, the digit absorption circuit 2700 is substantially identical to the corresponding portion of the digit absorption and register reuse circuit 2000 described above in connection with the selector B150*b*. However, since the selector D130*b* is associated only with calls incoming to the Dexter office 42 over the trunk 50*a*, no facilities are required for absorbing a digit of "1" and reusing the first hundreds level since any special service call originating at the Baker office would be routed directly to the information center 46 and not by way of the Dexter office. The digit absorption circuit 2700 includes a cathode follower tube 2701 which is connected to the anode of the third counting tube 2915 in the register 2900 by way of the conductor 2911 and the coupling condenser 2702. When the counting tube 2915 is fired the potential across the cathode resistor 2703 of the tube 2701 drops to approximately 15 volts positive and an inverter tube 2704 is rendered non-conductive so that the rectifier 2705 connected to the anode of the tube 2704 is rendered non-conductive. During the interdigit pause which follows the first digit of dial impulses transmitted over the trunk 50*a* the timing tube 2808 in the sequence timing circuit 2800 is fired so as to produce a large positive potential on the conductor 2840 which is applied to the cathode of the rectifier 2706 and renders this rectifier non-conductive. Accordingly, the control grid of the reset tube 2708 increases positively by an amount sufficient to cause the tube 2708 to be fired and thereby produce a positive pulse across the output resistor 2710 thereof which is coupled through the condenser 2711, the resistor 2712 and over the conductor 2713 to the control grid of the primer tube 2809 so that the primer tube 2809 is fired and the register 2900 is reset to zero. The positive pulse produced by the reset tube 2708 is also coupled through the condenser 2715 and the parallel connected resistor 2716 and rectifier 2717 to the cathode of the timing tube 2808 so as to extinguish this tube and reset the sequence timing circuit 2800.

As in the selector B150*b*, the idle pulse gate circuit 2803 and the trunk hunting timing circuit 3100 in the selector D130*b* are controlled from the digit absorption circuit 2700 by means of a changeover tube 2720. More particularly, the cathode of the tube 2701 is coupled through a rectifier 2721 to the control grid of the tube 2720 and the timing conductor 2840 is also coupled through a rectifier 2722 to this control grid. If a digit of "3" is registered in the register 2900 the cathode of the tube 2701 drops to approximately 15 volts positive so that the rectifier 2721 is rendered conductive when the grid potential of the changeover tube 2720 reaches 15 volts positive so that the changeover tube 2720 is prevented from firing. However, if any other digit is registered in the register 2900 the cathode of the tube 2701 remains approximately 75 volts positive, so that the rectifier 2721 remains non-conductive. During the interdigit pause following a digit other than "3" a positive potential is produced on the conductor 2840 so that the rectifier 2722 is also rendered non-conductive with the result that the changeover tube 2720 fires and produces a large positive potential across the catholic resistor 2725 thereof. This positive potential is transmitted over the conductor 2726 and through the resistor 2842 to the shield grids which surround the second control grid of the idle pulse gate tube 2821. The changeover potential produced on the conductor 2726 is also employed to change the bias potential on the control grid of the trunk hunting timing tube 3106, the conductor 2726 being connected through the resistors 3130 and 3131 to the minus 100 volt supply. As soon as a positive changeover potential is produced on the conductor 2726 the condenser 3132 starts to charge positively. However, as soon as one of the coincidence tubes in the coincidence tube circuit 2901 is fired in response to selection of an idle acceptor-connector link or trunk acceptor a potential drop is produced across the common anode resistor 2845 of the coincidence tubes in the circuit 2901 and this potential is transmitted by way of the conductor 2846 and through the resistor 3135 to the condenser 3132 so as to prevent the condenser 3132 from receiving further charge in the positive direction. Accordingly, the trunk hunting timing tube 3106 is not fired if an idle acceptor-connector link or trunk acceptor is found. However, if no idle acceptor-connector link is found during the trunk hunting period which is controlled by the size of the condenser 3132 and its associated resistors, a sufficiently positive potential is produced across the condenser 3132 to fire the trunk hunting timing tube 3106. When this occurs a positive potential is produced across the cathode resistor 3136 of the tube 3106 so that the busy tone gate tube 3138 is rendered effective to transmit a busy tone signal from the conductor D46 through the condenser 3139, the resistor 3140, over the conductor 3141 and through the condenser 3233 to the amplifier tube 3224 wherein this busy tone signal is amplified and is coupled through the transformers 3227 and 3205 to the trunk 50*a* so as to return a busy tone signal to the calling subscriber over the trunk 50*a* and the linkage in the Baker office 40 associated therewith.

In order to block the first, second, ninth and tenth levels in the Dexter office 42 on calls incoming over the trunk 50*a* from the Baker office 40 so that improper connections cannot be set up and excessive equipment tied up therewith, no tens pulses are supplied to the corresponding counting tubes in the register 2900. More particularly, no tens pulses are supplied to the first counting tube 2816, the second counting tube 2910, the ninth counting tube 3001 and the tenth counting tube 3002 in the register 2900, the conductors D32*a*, D32*b*, D32*i* and D32*j* being simply omitted from the illustrated cable D32. Accordingly, even though one of the tubes 2816, 2910, 3001 or 3002 is fired in response to the corresponding digit and the corresponding gating rectifier is rendered conductive, no corresponding tens pulses are transmitted to the output conductor 2908 of the register 2900 with the result that no idle pulses will be selected by the idle pulse gate tube 2821 in the time positions assigned to the trunk acceptors in the first, second, ninth and tenth hundreds levels. In this connection, it will be noted that no tens pulses are supplied to the third counting tube 2915 in the register 2900, the conductor D32*c* being also omitted from the cable D32. However, it will be understood that the tens pulse conductor D32*c* is omitted for the reason that the selector D130*b* is arranged to absorb all digits "3" and since the idle pulse gate tube 2821 is controlled by the digit absorption circuit 2700 and is not conditioned to gate idle pulses in response to the dialing of the digit "3" the tens pulse conductor D32*c* may be omitted to simplify cabling to the selector D130*b*.

*Type C incoming selectors*

In the Baker office 40 there is provided a group of twenty type C incoming selectors which individually terminate the trunks 56 from the Dexter office 42. The type C incoming selectors are generally similar to the type F incoming selector D130*b* described in detail above. However, the type C incoming selectors are provided with facilities for absorbing all digits of "2" and blocking the first, third, fourth and tenth hundreds levels of the Baker office on calls incoming over the trunk 56 from the Dexter office. More particularly, in the type C incoming selectors the conductor 2911 (Fig. 29) would be connected to the anode of the second counting tube 2910 instead of to the anode of the third counting tube 2915 as in the selector D130*b*. Also, the conductors B32*a*, B32*b*, B32*c*, B32*d* and B32*j* would be omitted from the cable B32 to the type C incoming selectors to block the corresponding levels in the Baker office. In other respects the type C incoming selectors are identical to the selector D130*b* described in detail heretofore.

In order to provide high percentage trunking for circuits incoming to the Dexter office 42, the incoming trunks from the Baker office 40, the Hillside office 44, the main dial office 48 and the information center 46 are divided into two groups, one group being connected in parallel with the type D local selectors and the other group being connected in parallel with the type E local selectors. More particularly, the incoming trunks 50 from the Baker office 40 are divided into a group of ten trunks 50*a* to 50*j*, inclusive, and ten incoming type F selectors D130*b* to D132*b*, inclusive, which terminate the trunks 50*a* to 50*j*, inclusive, are connected in parallel with the type D local selectors in the fifth, sixth, seventh and eighth hundreds levels. The trunks 50*k* to 50*t*, inclusive, are connected to the type F incoming selectors D134*b* to D136*b*, inclusive, which incoming selectors are connected in parallel to the type E local selectors in the fifth, sixth, seventh and eighth hundreds levels. In a similar manner the type J incoming selectors, such as the selectors D201*b* and D212*b*, the type H incoming selectors such as the selectors D218*b* and D220*b* and the type L incoming selectors such as the selectors D226*b* and D228*b* are all connected in parallel to the type D local selectors, the remaining type J, type H and type L incoming selectors being connected in parallel with the type E local selectors.

All of the incoming selectors type H, J and L are provided with facilities for absorbing all digits of "3." These facilities are identical to the arrangement described above in connection with the type F incoming selector D130*b* wherein the digit absorption circuit is controlled from the third counting tube in the register. As described above, the type F incoming selectors are provided with facilities for blocking the first, second, ninth and tenth hundreds levels so that calls originating at the Baker office 40 will not have access to these levels. In this connection it will be understood that if these levels were not blocked to the incoming trunks from the Baker office 40, incorrectly dialed numbers could result in tying up a large percentage of the linkage of the system. The first and tenth hundreds levels are blocked because a calling subscriber at the Baker office 40 would normally employ the trunks 52 and 54 to establish connections to the information center 46, the second hundreds level is blocked to Baker subscribers since this hundreds level is used for the trunk 56 extending from the Dexter office 42 to the Baker office 40 and the ninth hundreds level is blocked to Baker subscribers because none of these subscribers are, in the illustrated embodiment, capable of gaining access to the preferred digit facilities in the Dexter office 42.

In a similar manner all of the type J incoming selectors associated with the trunks 68 from the Hillside office 44 are arranged to block the first, fourth, ninth and tenth hundreds levels so that Hillside subscribers cannot gain access to these levels. Blocking of these levels in the type J incoming selectors is accomplished in the manner described above by deleting the corresponding tens pulse conductors to the corresponding counting tubes in the hundreds digit registers in these selectors, it being understood that blocking to the above identified levels is necessary to prevent cross connections as described above in connection with the trunks 50 from the Baker office 40.

The type H incoming selectors associated with the trunks 66 from the main dial office 48 are provided with facilities for blocking only the ninth hundreds level in the Dexter office 42. This is because calls incoming from the main dial office 48 may be routed to the Baker office through the second hundreds level of the Dexter office 42, to the Hillside office through the fourth hundreds level in the Dexter office 42 and to the information center 46 through the first and tenth hundreds levels of the Dexter office 42, the ninth hundreds level being blocked to prevent calls from being revertively applied back to the main dial office 48 over the trunks 64. Blocking of the ninth hundreds level in the type H incoming selectors is accomplished by omitting the conductor D32*i* from the ninth counting tube circuit in the hundreds digit registers of these selectors.

The type L incoming selectors associated with the trunks 74 from the information center 46 have access to all of the hundreds levels in the Dexter office 42 so as to permit the operator at the information center 46 to establish calls to any one of the electronic offices 40, 42 and 44 and to the main dial office 48, it being assumed that the operator will not erroneously gain access to the first and tenth hundreds levels which are used to extend calls from the Dexter office 42 to the information center 46.

*Type P incoming selectors*

The type P incoming selectors employed in the Hillside office 44 are provided with facilities for absorbing all digits of "4" to permit local calls within the Hillside office and facilities are also provided for blocking the first, second, third and tenth hundreds levels on calls incoming to the Hillside office from the Dexter office 42. The digit absorption facilities in the type P incoming selectors are identical to those described above in connection with the selector B150*b* except for the fact that the anode of the fourth counting tube in the hundreds digit resister is employed to actuate the digit absorption circuits, i.e., the conductor 2203 in the selector B150*b* would be connected to the anode of the fourth counting tube 2220 in the type P incoming selectors. In order to block the first, second, third and tenth hundreds levels the corresponding tens pulse conductors are omitted from the cable B32 so that the conductors B32*a*, B32*b*, B32*c* and B32*j* would be omitted from the cable B32 to the type P incoming selectors. In other respects the type P incoming selectors are identical to the type F incoming selector D130*b* described in detail heretofore.

*Type B coupling circuits*

In the Dexter office 42 the coupling circuits D187A, D187B, D188A, D188B and D186C are provided with two input circuits and one output circuit so as to provide the above described interconnection between the type B and type E local selectors and the type B and type E trunk acceptors as well as the acceptor-connector links of the system. In Fig. 37 there is shown the circuit arrangement of the coupling circuit D186C in the Dexter office 42, it being understood that the other type B coupling circuits in the Dexter office are similar to the circuit D186C. Referring to Fig. 37, conductor D195A is connected through the resistors 3700 and 3701 to the plus 150 volt supply, the resistor 3701 being bypassed so that the resistor 3700 forms the common anode load resistor for all of the type E local selectors in the Dexter office 42 and the incoming selectors connected in parallel with the type E local selectors, as described in detail heretofore. In a similar manner, the conductor D195 is connected through the resistors 3702 and 3703 to the plus 150 volt supply, the resistor 3702 forming the common anode load resistor for all of the forward out gate tubes in the type D local selectors in the Dexter office 42 and the incoming selectors connected in parallel with these type D local selectors. The negative selector-forward pulses developed across the resistor 3700 are coupled through the condenser 3705 to the first control grid of an inverter tube 3706 and are repeated in positive polarity across the anode resistor 3707 of this tube. In a similar manner the negative selector-forward pulses developed across the resistor 3702 are coupled through the condenser 3710 to the control grid of the inverter tube 3711 and are repeated positively across the anode load resistor 3712 of the tube 3711. The positive selector forward pulses appearing across the resistor 3707 are coupled through the condenser 3715 and the coupling rectifier 3716 to the control grid of a cathode follower output tube 3718. The positive selector forward pulses developed across the resistor 3712 are coupled through the condenser 3719 and the coupling rectifier 3720 to the control grid of the tube 3718, this control grid being biased negatively through the resistor 3721 which is connected to the minus one hundred volt supply. With this arrangement the selector forward pulses transmitted through the tube 3706 are combined with the selector forward pulses transmitted through the tube 3711 and all of these selector forward pulses are produced in positive polarity across the cathode resistor 3722 of the tube 3718, these selector forward pulses being connected by way of the conductor D196 to the acceptor-connector links of the system and the trunk acceptors in the first and tenth hundreds levels in the Dexter office 42.

*Type A coupling circuits*

The coupling circuits D186A and D186B, as well as all of the coupling circuits in the Baker and Hillside offices, are of the type shown in Fig. 36 wherein the coupling circuit D186A is specifically illustrated. Referring to this figure, the conductor D195 is connected through the resistor 3600 to the plus 150 volt supply so that negative selector forward pulses are developed across the resistor 3600 and are coupled through the condenser 3601 to the control grid of an inverter tube 3602. The selector forward pulses are repeated as positive selector forward pulses across the resistor 3603 and are coupled through the condenser 3604 to the control grid of a cathode follower output tube 3605. Accordingly, all of the selector forward pulses developed on the conductor D195 are repeated as positive pulses across the cathode resistor 3606 and are transmitted by way of the conductor D196A to the type D trunk acceptors in the Dexter office 42. In this connection it will be noted that certain conductors are connected to two coupling circuits. For example, the conductor D195 is connected to one input of the coupling circuit D186C and is also connected to the input of the coupling circuit D186A. In such situations only one anode resistor is employed to terminate the conductor D195 in either the circuit D186C or the circuit D186A.

*Trunk acceptors and associated trunk circuits*

In each of the electronic offices 40, 42 and 44 the trunk acceptors are assigned different time positions in the basic 100 time position frame in accordance with the hundreds level in which the trunk acceptor is located. Thus, in the first hundreds level of the Baker office 40, three trunk acceptors are provided for the three outgoing trunks 54 to the information center 46, the first trunk acceptor B111*a* being assigned the first time position in the 100 time position frame and the third trunk acceptor B113*a* being assigned the third time position in the 100 time position frame. The third and fourth hundreds levels are combined in the Baker office 40 to provide for twenty outgoing trunks 50 to the Dexter office 42, the first ten trunk acceptors being assigned the time positions numbers 31, 32, 33 to 30, inclusive, and the other ten trunk acceptors being assigned the time positions 41, 42, 43 to 40, inclusive. Thus, the illustrated trunk acceptor B131*a* would be assigned the time position number 31 and the illustrated trunk acceptor B141*a* would be assigned the time position 40. In the tenth hundreds level of the Baker office 40 eight trunk acceptors are provided for the outgoing trunks 52 to the information center 46, the first trunk acceptor B101*a* being assigned the time position 01 and the eighth trunk acceptor B103*a* being assigned the time position 08.

In order to assign the above described time positions to the trunk acceptors in the Baker office 40, the individual conductors of the tens and units cables B32 and B31, respectively, are supplied to each of these trunk acceptors. For example, in the first hundreds level the trunk acceptor B111*a* would be supplied with the first tens pulse conductor B32*a* and with the first units pulse conductor B31*a*. The third trunk acceptor B113*a* would also be supplied with the tens pulse conductor B32*a* but in order to define the third time position this trunk acceptor would be supplied with the third units pulse conductor B31*c*. In the third and fourth hundreds level the first trunk acceptor B131*a* would be supplied with tens pulses over the tens pulse conductor B32*c* and with units pulses over the units pulse conductor B31*a*. The twentieth trunk acceptor B141*a* would be supplied with tens pulses over the tens pulse conductor B32*d* and with units pulses over the units pulse conductor B31*j*.

In Figs. 34A and 34B of the drawings there is shown the circuit arrangement of the trunk acceptor B131*a* and the trunk circuit B131*b* in the third and fourth hundreds level of the Baker office 40. Referring to these figures, tens pulses developed on the conductor B32*c* in the common equipment are coupled through the condenser 3400 to the first control grid of an acceptor pulse forming tube 3401 and the units pulses appearing upon the conductor B31*a* are coupled through the condenser 3402 to the suppressor grid of the tube 3401. The control grid of the tube 3401 is normally biased beyond cutoff by means of the divider network 3405 and 3406 connected between the minus 100 volt supply and ground the suppressor grid of the tube 3401 is clamped to ground by means of the rectifier 3407. Accordingly, the tube 3401 does not conduct except upon coincidence of the tens and units pulses appearing on the conductors B32*c* and B31*a*. When such coincidence occurs a negative pulse is produced across the anode resistor 3410 of the tube 3401 in the time position number 31, i.e., the time position assigned the trunk acceptor B131*a*. This negative acceptor pulse is coupled through the condenser 3411 to the control grid of an inverter tube 3412 wherein the acceptor pulse is amplified and inverted and is coupled through the condenser 3413 to the second control grid of a return outgate tube 3415, the first control grid of a forward reconstructor pulser tube 3416, the first control grid of an idle pulse gate tube 3417 and the first control grid of a forward ingate tube 3414.

Considering now the operation of the idle pulse gate tube 3417, the control grid of this tube is normally biased beyond cutoff by means of the voltage divider network including the resistors 3418 and 3419 which are connected from the minus 100 volt supply to ground. The linkage sampling pulses which are developed on the conductor B40*b* in the common equipment are coupled through the condenser 3420 to the suppressor grid of the idle pulse gating tube 3417, this suppressor grid being clamped to ground by means of the rectifier 3421. The tube 3417 is rendered conductive by the positive acceptor pulses coupled to the first control grid of this tube so that only those linkage sampling pulses which occur in the time position assigned to the trunk acceptor B131*a* are transmitted over the output conductor B198 to the idle pulse coupling circuit B187. In this connection it will be understood that the common anode resistor for all of the idle pulse gate tubes 3417 in the trunk acceptors and acceptors of the system is in the idle pulse coupling circuit B187 and would be similar to the common anode resistor 3600 described in connection with the selector forward coupling circuit D186A. Accordingly, the trunk acceptor B131*a* functions continuously to supply idle pulses to the conductor B198 in the time position assigned to the trunk acceptor B131*a* during periods when this trunk acceptor is idle.

When a call to a remote office is initiated on one of the calling lines at the Baker office 40, the local selector operatively associated with the calling line, such as the selector B15*b*, registers the first dialed digit of "3" if the call is intended for the Dexter office 42, or a first digit of "4" if the call is intended for the Hillside office 44, and, as described above in connection with the local selector B150*b* the local selector responds to one of the idle pulses produced on the conductor B198 in the time position assigned to one of the trunk acceptors in the third and fourth hundreds level in the Baker office 40 by developing selector forward pulses on the conductor B195 in the time position assigned to the selected trunk acceptor and these selector forward pulses are transmitted through the coupling circuit B186 and over the conductor B196 to all of the trunk acceptors and acceptor-connector links of the system. In the trunk acceptor B131*a* these selector forward pulses are transmitted through the condenser 3425 to the suppressor grid of the forward ingate tube 3414, the clamping rectifier 3426 being employed to maintain the base line of the selector forward pulse wave form substantially constant irrespective of the number of selector forward pulses on the conductor B196. Since the tube 3414 is controlled by the acceptor pulses impressed upon the first control grid thereof, the tube 3414 functions to separate the selector forward pulses appearing on the conductor B196 in the time position assigned to the trunk acceptor B131*a* from all of the other selector forward pulses appearing on the conductor B196 and develops corresponding selector forward pulses of negative polarity across the anode resistor 3428 of the tube 3414. These negative selector forward pulses are coupled through the condenser 3429 to the inverter tube 3430 and appear as positive selector forward pulses across the anode resistor 3431 of the tube 3430. The selector forward pulses developed across the resistor 3431 are coupled through the condenser 3432 to the control grid of a forward reconstructor charging tube 3433 which functions to charge the storage condenser 3434 by an amount proportional to the amplitude of the selector forward pulses.

The pulser tube 3416 receives the above described acceptor pulses on the first control grid thereof and functions to develop sharp negative pulses coincident with the leading edge of each acceptor pulse at the anode of the tube 3416 due to the action of the inductance 3427 and the rectifier 3435 included in the anode circuit of the tube 3416. These negative discharge pulses are coupled through the condenser 3436 to the cathode of a condenser discharging tube 3437, the anode of which is connected to the storage condenser 3434 and the cathode of which is biased to a negative potential by means of the voltage divider which includes the resistors 3438, 3439 and 3440. Accordingly, the condenser 3434 is discharged in response to the leading edge of each acceptor pulse just prior to being charged positively in response to the selector forward pulses so that the signal modulation on these selector forward pulses is developed across the condenser 3434 and is repeated across the cathode resistor 3442 of the cathode follower output tube 3441. The signal voltage produced across the resistor 3442 is coupled through the condenser 3443 to the control grid of a triode amplifier tube 3444 wherein this signal voltage is amplified and is coupled through the condenser 3445 and a low pass filter 3446 to a winding 3447 of a coupling transformer 3448. The winding 3449 of the transformer 3448 is connected by way of the conductor 3450 and the coil 3451 of the hybrid 3452 to the tip conductor 3202 of the trunk 50*a* extending to the Dexter office 42. The other side of the winding 3449 is connected through the relay contacts 3455 of a relay 3456, over the conductor 3457, through the coil 3458 of the hybrid 3452 to the ring conductor 3203 of the trunk 50*a*.

The relay 3456 is a polar type sensitive relay, preferably of the Western Electric type 280–C, and has a biasing winding 3462 which is energized from the conventional minus 48 volt supply and may be adjusted by means of the variable resistor 3463. The control winding 3464 of the relay 3456 is connected in series with the cathode resistor 3442 of the tube 3441 to ground. When the contacts 3468 of the relay 3456 are closed a circuit is completed through the coil of a holding relay 3470 of the slow release type to the minus 48 volt supply so that the relay 3470 is energized and the contacts 3471 and 3461 thereof are closed.

In order to prevent other local selectors from seizing the trunk acceptor B131*a* this acceptor must function to remove its idle pulses from the conductor B198 as soon as selector forward pulses appearing in the time position assigned to the trunk acceptor B131*a* are developed on the conductor B196. Thus, as soon as selector forward pulses are impressed upon the conductor B196 by the local selector handling the call these selector forward pulses are gated through the tube 3414, are inverted in the tube 3430 and control the charging tube 3433 to develop a corresponding voltage across the condenser 3434 proportional to the amplitude of the selector forward pulses which are, as yet, unmodulated. The voltage thus produced across the condenser 3434 causes a current flow through the tube 3441 and hence through the relay coil 3464 of the relay 3456 which is sufficient to energize this relay and close the contacts 3455 and 3468 thereof. When the contacts 3468 of the relay 3456 are closed a circuit is completed to relay 3470, which responds by closing its contacts 3461 and 3471. Since relay 3470 is of the slow-release type, its contacts remain operated throughout the remainder of the call even though relay 3456 is released intermittently during dial breaks on the calling line and consequent interruption of the selector forward pulse transmission over the conductor B196.

A biasing network, including resistors 3479, 3480 and 3460, connected between the minus 100 volt supply and the plus 150 volt supply is arranged to provide a potential of approximately zero volts for the suppressor grid of the idle pulse gate tube 3417.

When the trunk acceptor B131a is idle linkage sampling pulses from the conductor B40b are coupled through capacitor 3420, are gated through the tube 3417 in the time position assigned to the trunk acceptor B131a and are impressed on the idle pulse lead B198. However, when the contacts 3461 of the relay 3470 are closed the junction between resistors 3480 and 3460 is grounded, thus lowering the suppressor grid bias potential of the tube 3417 to a value sufficient to cut off plate current flow therethrough and thereby terminate the idle pulses for the remainder of the call.

In order to provide substantially instantaneous termination of the idle pulses upon seizure of the trunk acceptor B131a by the active selector, an auxiliary bias reduction tube 3453 is provided, the anode of which is connected to the junction between the resistors 3480 and 3460. The control grid of the tube 3453 is connected to the minus 100 volt supply through the resistor 3459 so that normally the tube 3453 is non-conductive. The reconstructed selector forward pulses, appearing as a positive going potential at the cathode of the tube 3441 at the instant of acceptor seizure, is coupled through resistor 3454 to the control grid of tube 3453. Accordingly, when a positive potential is derived from the cathode of the tube 3441 the tube 3453 is rendered conductive so that the voltage at the anode of the tube 3453 is reduced to a low value, thereby biasing the suppressor grid of the tube 3417 beyond cut-off and terminating transmission of idle pulses to the conductor B198 in the time position assigned to the trunk acceptor B131a. After a short period of time equal to the sum of the operate times of the relays 3456 and 3470, the contacts 3461 of relay 3470 are closed so that the anode of the tube 3453 is grounded and the tube 3417 is maintained nonconductive for the remainder of the call.

When the first digit is dialed at the calling substation the associated local selector functions to interrupt the transmission of selector forward pulses over the conductor B196 during a portion of each dial impulse. Accordingly, the voltage developed across the condenser 3434 drops during each dial impulse and the sensitive relay 3456 is deenergized. When the relay 3456 is deenergized the contacts 3455 and 3468 thereof are opened and the contacts 3482 thereof are closed. As soon as the contacts 3482 are closed in response to the first dial impulse a circuit is completed through the contacts 3482, the contacts 3471 of the slow release relay 3470 and through the operating coil of a slow release relay 3485 to the minus 48 volt supply so as to energize the relay 3485 and close the contacts 3487 thereof. When the contacts 3487 thereof are closed the secondary winding 3449 of the transformer 3448 is shorted out so that the winding 3449 is removed from the dialing loop of the trunk 50a during the dialing operation. During successive dial impulses the relay 3456 is successively energized and deenergized, the loop circuit to the trunk 50a being broken during each dial impulse by the contacts 3455 thereof. However, since the relays 3470 and 3485 are of the slow release type the winding 3449 remains short circuited during the dialing operation and idle pulses are prevented from appearing on the conductor B198 in the time position assigned to the trunk acceptor B131a.

At the end of the dialing operation the relay 3456 remains continuously energized and the contacts 3482 thereof are opened for a sufficient time interval to cause the relay 3485 to be deenergized. However, the relay 3470 remains continuously energized through closure of the contacts 3468 of the relay 3456 so that idle pulses are continuously prevented from appearing on the conductor B198 during the remainder of the call. It will thus be evident that the loop circuit which includes the conductors 3202 and 3203 of the trunk 50a is first closed in response to operative association of the trunk acceptor B131a with the local selector associated with the calling line and is thereafter successively opened and closed in response to each dial impulse transmitted over the calling line. In the Dexter office 42 the trunk 50a is terminated in the incoming selector D130b, shown and described in detail heretofore in connection with Figs. 27 to 33, inclusive of the drawings, and upon the first closure of the loop circuit including the conductors 3202 and 3203 of the trunk 50a the relay 3207 in the selector D130b is energized so that the selector D130b becomes operatively associated with the trunk acceptor B131a in the manner described in detail above in connection with the selector D130b. The incoming selector D130b then responds to the second dialed digit by absorbing the digit if the call is intended for the Dexter office 42 or if the call is intended for the Hillside office and the second digit is "4" the selector D130b responds to this digit by selecting an idle one of the type D trunk acceptors in the fourth hundreds level of the Dexter office 42, this trunk acceptor being seized and operatively associated with the selector D1301 in a manner identical to the above described association of the trunk acceptor B131a with the local selector in the Baker office 40. The seized trunk acceptor in the fourth hundreds level of the Dexter office 42 functions to close the loop circuit of the associated trunk to one of the type P incoming selectors in the Hillside office 44 in the same manner that the selector D130b is operatively associated with the trunk acceptor B131a during the interdigit pause between the first and second digits. On a call to the Hillside office 44 the third digit is employed in the seized type P incoming selector to select the hundreds level of the called line in the Hillside office 44 and the last two digits of the called number are employed to select the called line within the selected hundreds level so that the call may be completed from a calling line in the Baker office 40 through the electronic office 42 to a called line in the Hillside office 44.

Assuming that the call is initiated in the Baker office 40 and is extended through the trunk acceptor B131a to the Dexter office 42, and assuming further that the called line is in the fifth hundreds level in the Dexter office 42 and that the acceptor-connector link D151 is seized by the incoming selector D130b to establish the call, if the called line is busy the connector D151b functions to modulate a busy tone signal on the selector return pulses developed by the connector D151b in the time position assigned to the acceptor-connector link D151 and these busy tone modulated selector return pulses are transmitted through the return ingate tube 3121 in the selector D130b. The busy tone signal is then demodulated and is coupled through the transformers 3207 and 3205 and over the trunk 50a to the hybrid 3452 in the trunk circuit B131b. This busy tone signal is developed across the coils 3490 of the hybrid 3452 and is coupled through the condenser 3491 to the third control grid of the return outgate tube 3415. As described generally above, the second control grid of the tube 3415 is supplied with acceptor pulses developed in the time position assigned to the trunk acceptor B131a and the first control grid of the tube 3415 has supplied thereto the linkage sampling pulses appearing on the conductor B40b in each time position which are coupled to this control grid through the condenser 3492. Accordingly, the return outgate tube 3415 functions continuously to develop selector return pulses on the conductor B200 in the time position assigned to the trunk acceptor B131a. However, it will be noted that the selector return ingate circuits in the local and incoming selectors, such as the return ingate circuit 2502 in the selector B150b, are not conditioned to respond to the selector return pulses on the conductor B200 until the selector has seized an idle trunk acceptor or acceptor-connector link and supplies selector pulses to the return ingate circuit in the time position assigned to the seized trunk acceptor or acceptor-connector link.

The selector return pulses developed by the tube 3415 are modulated with the busy tone signal impressed upon the third control grid of the tube 3415 and in the selector B150*b* the busy tone modulated selector return pulses are transmitted through the gate tube 2505 of the return ingate circuit 2502, the busy tone signal is demodulated in the return reconstructor circuit 2600 and is transmitted by way of the conductor 2605 and the condenser 2506 to the third control grid of the return outgate tube 2507 in the return outgate circuit 2503. Since the tube 2507 is controlled by the finder gate pulses developed on the conductor B150*c* by the associated line finder B150*a* in the time position assigned to the calling line the busy tone signal impressed upon the third control grid of the tube 2507 is resampled in the time position assigned to the calling line with which the finder-selector link B150 is associated so that a busy tone signal is transmitted to the calling subscriber in the manner described in detail in the above identified copending application Serial No. 326,213.

When the calling subscriber in the Baker office responds to this busy tone signal and hangs up the finder B150*a* ceases to develop finder gate pulses on the conductor B150*c* in the time position assigned to the previously calling line and operating potential is removed from the +B switch conductor B150*d*. Accordingly, the register 2200 in the selector B150*b* is returned to zero and all of the tubes in the coincidence tube circuit 2201 are extinguished so that selector pulses are no longer developed in the conductor 2145 and selector forward pulses are no longer transmitted over the conductor B195 in the time position assigned to the trunk acceptor B131*a*. When these selector forward pulses are removed from the conductor B196 the condenser 3434 in the trunk acceptor B131*a* becomes fully discharged so that the current through the relay coil 3464 of the relay 3456 becomes insufficient to energize this relay with the result that the contacts 3455 and 3468 of the relay 3456 are opened. When the contacts 3455 are opened the loop circuit which includes the conductors 3202 and 3203 of the trunk 50*a* is broken. In the selector D130*b* in the Dexter office 42, opening of this loop circuit causes the relay 3207 to be deenergized so that the contacts 3209 and 3210 thereof are opened. When the contacts 3209 are opened a negative potential is impressed upon the first control grid of the selector forward gate tube 3120 so as to prevent this tube from developing selector forward pulses on the conductor D195 in the time position assigned to the acceptor-connector link D151 in the fifth hundreds level of the Dexter office 42. Opening of the contacts 3210 also causes the potential supply circuit 3300 to remove operating potential from the conductor 3301 so that the register 2900 is returned to zero and the coincidence tubes in the circuit 2901 are deenergized so that selector pulses are no longer developed on the conductor 2830 in the time position assigned to the acceptor-connector link D151. The acceptor D151*a* responds to termination of selector forward pulses in the time position assigned thereto by discontinuing the transmission of acceptor pulses to the associated connector D151*b* and the transmission of +B switch potential to the connector D151*b* so that the registers in this connector are returned to zero and the connector is conditioned to set up another connection. In addition, the acceptor D151*a* functions to resume transmission of idle pulses to the conductor D198 in the time position assigned to the acceptor D151*a* so that the acceptor-connector link D151 is conditioned to handle another call intended for one of the lines in the fifth hundreds level of the Dexter office 42. In this manner all of the linkage required to set up a connection from a calling line in the Baker office 40 to a called line in the Dexter office 42 is released in response to a busy condition at the called line.

If the called line in the Dexter office answers, a two-way speech transmission path is established from the calling line in the Baker office 40 through the local selector B150*b*, the trunk acceptor D131*a*, the trunk circuit B131*b*, the trunk 50*a*, the incoming selector D130*b* and the connector D151*b* to the called line in the fifth hundreds level in the Dexter office 42. In the event that a call is placed from the Baker office 40 to the Hillside office 44 the call will be routed through the Dexter office 42 to one of the trunk acceptors in the fourth hundreds level during the interdigit pause between the second and third digits so that an operative connection will be established over one of the trunks 58 to one of the type P incoming selectors in the Hillside office 44 and the call will then be completed to the called subscriber in the Hillside office in a manner identical to that described above in connection with the completion of a call to a called line in the Dexter office 42, it being understood that a busy tone signal will be returned from the Hillside office 44 through the Dexter office 42 to the Baker office 40, the associated linkage released or a two-way speech transmission path established through the indicated system components.

Considering now the manner in which a call may be placed from one of the electronic offices, such as the Baker office 40, to the operator at the information center 46, and assuming that the selector B150*b* in the fifth hundreds level of the Baker office 40 is used in response to such a call initiated on the line number 523 in this level, the multiplexer B11*e* functions to develop multiplexer pulses in the time position No. 23 assigned to the line 523 which are transmitted to the finder-selector link B150 as well as the other finder-selector links in the fifth hundreds level. When the line finder B150*a* becomes operatively associated with the line 523 in the time position No. 23 this line finder supplies finder-gate pulses over the conductor B150*c* and a +B operating potential over the conductor B150*d* to the selector B150*b* so that this selector is conditioned for operation and responds to the first digit "1" dialed over the calling line by absorbing this digit and resetting the hundreds digit register in the selector B150*b* to zero, as described in detail above in connection with the selector B150*b*. The second digit of "1" is registered in the hundreds digit register of the selector B150*b* and this selector selects an idle one of the trunk acceptors assigned to the first hundreds level in the Baker office 40. Assuming that the trunk acceptor B111*a* is selected, the selector B150*b* functions to develop selector forward pulses on the conductor B195 in the time position No. 11 assigned to the trunk acceptor B111*a* and the trunk acceptor B111*a* responds to these selector forward pulses by closing the loop circuit of the trunk 54*a* extending to the information center 46 and removing idle pulses in the time position No. 11 from the conductor B198. When the third digit of the special service is dialed over the line 523 the loop circuit of the trunk 54*a* is opened and closed in accordance with each dial impulse, as described in detail above in connection with the trunk acceptor B131*a* and the incoming selector 76*a* in the information center 46 registers this final digit and extends the connection to the desired service in the information center 46.

If a long distance call is initiated from the line 523 one of the trunk acceptors in the tenth hundreds level, such as the trunk acceptor B101*a*, would be selected in response to the first digit of "0" which would be registered in the selector B150*b* and this selector would function to develop selector forward pulses on the conductor B195 in the time position No. 01 assigned to the trunk acceptor B101*a*. The trunk acceptor B101*a* would respond to these selector forward pulses by closing the loop circuit of the trunk 52*a* to the operator's switchboard in the information center 46 and would also function to remove idle pulses from the conductor B198 in the time position No. 01, it being understood that a two-way speech transmission path is thereby set up between the line 23 in the Baker office 40 and the long distance operator in the information center 46.

Considering now the operation of the system when the operator at the information center 46 places a long distance call to one of the lines in the main dial office 48, the operator closes the loop circuit of one of the outgoing trunks 74 to the Dexter office 42, such as the illustrated trunk **74*a* which is terminated in the Dexter office 42 in the incoming selector D226*b*. The operator then dials a first digit of "9" and the incoming selector D226*b* registers this digit and selects an idle one of the trunk acceptors in the ninth hundreds level in the Dexter office 42. Assuming that the type D trunk acceptor D911*a* is selected, the incoming selector D226*b* develops selector forward pulses on the conductor D195 in the time position No. 91 assigned to the trunk acceptor D911*a*, and the trunk acceptor D911*a* responds to these selector forward pulses by closing the loop circuit of the trunk 64*a* to the main dial office 48 and also removes idle pulses from the conductor D198A in the time position No. 91 assigned to the trunk acceptor D911*a*. In this connection it will be noted that the operator at the information center 46 may select any one of the twenty trunks 74 extending to the Dexter office 42 although ten of these trunks terminate in incoming selectors associated with the type D trunk acceptors in the ninth hundreds level whereas the other ten incoming selectors, such as the selector D230*b*, are connected to the type E trunk acceptors in the ninth hundreds level. The operator may alternately employ incoming selectors in the two different groups to provide adequate distribution between the type D and type E trunk acceptors or other facilities for automatically assigning successive active trunks to incoming selectors in the different groups may be employed, as will be readily understood by those skilled in the art. When the loop circuit of the trunk 64*a* extending to the main dial office 48 is closed in the manner described above, the call is extended through one of the incoming selectors 103 in the main dial office 48 to the desired line in the office 48 or to other electromechanical offices by way of the special selectors 106 and the trunk circuits 104. It will also be noted that the type L incoming selectors, such as the selector D226*b* are arranged to permit the operator to select any other hundreds level in the Dexter office 42 so that the operator can establish a connection through the second hundreds level in the Dexter office 42 to the Baker office 40 or through the fourth hundreds level in the Dexter office 42 to the Hillside office 44, such connections being established through the trunk acceptors in the particular hundreds level associated with the trunks extending to the offices 40 and 44**.

While there have illustrated and described several embodiments of the present invention, it will be apparent that various changes and modifications thereof will occur to those skilled in the art. It is intended in the appended claims to cover all such changes and modifications as fall within the true spirit and scope of the present invention.

What I claim as new and desire to be secured by Letters Patent of the United States is:

1. In an automatic telephone system, a first office which includes a plurality of lines and means for developing first pulses in different time positions within first repetitive time position frames, a second office which includes a plurality of lines and means for developing second pulses in different time positions within second repetitive time position frames, means in each of said offices and responsive to the initiation of a call on one of the lines therein for developing pulses in one of said time positions, means for modulating said developed pulses with dial impulses transmitted over said calling line, a plurality of trunks interconnecting said first and second offices, a trunk circuit associated with each of said trunks, selector means responsive to said dial impulse modulated pulses for extending a connection to one of said trunk circuits on a call intended for the other office, means in each of said trunk circuits for deriving dial impulses from said dial impulse modulated pulses and impressing said derived dial impulses on the trunk associated therewith, and means including said last named means and said plurality of trunks for establishing two-way telephonic connections between calling and called lines in different offices.

2. In an automatic telephone system, a first office which includes a plurality of lines and means for developing first pulses in different time positions within first repetitive time position frames, a second office which includes a plurality of lines and means for developing second pulses in different time positions within second repetitive time position frames, first pulse multiplex means in said first office and responsive to said first pulses for setting up telephonic connections between calling and called lines in said first office, second pulse multiplex means in said second office and responsive to said second pulses for setting up telephonic connections between calling and called lines in said second office, a plurality of trunks interconnecting said first and second offices, means in each of said offices for converting the pulse multiplex signals developed by said first and second pulse multiplex means into corresponding speech and supervisory signals on calls intended for the other office, means including said last named means and said plurality of trunks for establishing two-way telephonic connections between calling and called lines in different offices, and means included in each of said first and second pulse multiplex means for absorbing predetermined initial digits on local calls within said first and second offices, thereby to provide uniform directory numbering of the lines in both said first and second offices.

3. In an automatic telephone system, a first office which includes a plurality of lines and means for developing first pulses in different time positions within first repetitive time position frames, a second office which includes a plurality of lines and means for developing second pulses in different time positions within second repetitive time position frames, each of the lines in said first office having at least one first office prefix digit assigned thereto and each of the lines in said second office having at least one second office prefix digit assigned thereto, means in each of said offices and responsive to the initiation of a call on one of the lines therein for developing pulses in one of said time positions representing the calling line, means for modulating said developed pulses with dial impulses transmitted over said calling line, a plurality of trunks interconnecting said first and second offices, a trunk circuit associated with each of said trunks, selector means responsive to said dial impulse modulated pulses for extending a connection to one of said trunk circuits on a call intended for the other office, means in each of said trunk circuits for deriving dial impulses from said dial impulse modulated pulses and impressing said derived dial impulses on the trunk associated therewith, means including said last named means and said plurality of trunks for establishing two-way telephonic connections between calling and called lines in different offices, and means included in said selector means for absorbing the office prefix digit portion of said dial impulses if the called line is in the same office as said calling line.

4. In an automatic telephone system, a plurality of lines, means for developing pulses in different time positions within repetitive time position frames, a trunk circuit including electromechanical means for controlling direct current dialing over a trunk connected to said trunk circuit, first control means responsive to said pulses in one of said time positions for extending a connection from a calling one of said lines to said trunk circuit, and second control means responsive to changes in the level of pulses in said one time position for controlling said electromechanical means.

5. In an automatic telephone system, a plurality of lines, means for developing pulses in different time positions within repetitive time position frames, a plurality of trunks, a trunk circuit for each of said trunks, each of said trunk circuits including electromechanical means for controlling direct current dialing over said trunk circuit, means responsive to the initiation of a call on one of said lines for developing pulses in one of said time positions which are modulated by dial impulses transmitted over said calling line, first control means responsive to pulses in said one time position for extending a connection from said calling line to said trunk circuit, and second control means responsive to the dial impulse modulation of said pulses for controlling said electromechanical means to effect direct current dialing over said trunk circuit in connection with the further extension of the call over said trunk circuit.

6. In an automatic telephone system, a plurality of lines, means for developing pulses in different time positions within repetitive time position frames, a plurality of trunks, a trunk circuit for each of said trunks, each of said trunk circuits including electromechanical means for controlling direct current dialing over said trunk circuit, means responsive to the initiation of a call on one of said lines for developing pulses in one of said time positions which are modulated by dial impulses transmitted over said calling line, first control means responsive to pulses in said one time position for extending a connection from said calling line to said trunk circuit, second control means responsive to the dial impulse modulation of said pulses for controlling said electromechanical means to effect direct current dialing over said trunk circuit in connection with the further extension of the call over said trunk circuit, and means including second control means and said plurality of trunks for establishing two-way telephonic connections between calling and called lines.

7. In an automatic telephone system, a first office which includes a plurality of lines having individually assigned thereto different time positions in first repetitive time position frames, a second office which includes a plurality of lines having individually assigned thereto different time positions in second repetitive time position frames, said first time position frames having no fixed time relationship with respect to said second time position frames, first time position responsive means in said first office for setting up telephonic connections between calling and called lines in said first office, second time position responsive means in said second office for setting up telephonic connections between calling and called lines in said second office, means including said first and second time position responsive means for setting up a telephonic connection between a calling line in said first office and a called line in said second office, and means included in each of said first and second time position responsive means for absorbing predetermined initial digits on local calls within said first and second offices, thereby to provide uniform directory numbering of the lines in both said first and second offices.

8. In an automatic telephone system, a first office which includes a plurality of lines having individually assigned thereto different time positions in first repetitive time position frames, a second office which includes a plurality of lines having individually assigned thereto different time positions in second repetitive time position frames, said first time position frames having no fixed time relationship with respect to said second time position frames, first pulse multiplex means in said first office for setting up telephonic connections between calling and called lines in said first office in accordance with the time positions respectively assigned thereto, second pulse multiplex means in said second office for setting up telephonic connections between calling and called lines in said second office in accordance with the time positions respectively assigned thereto, time position responsive drop back selector means included in each of said first and second pulse multiplex means for absorbing predetermined initial digits on local calls within said first and second offices, and means including said time position responsive drop back selector means for setting up telephonic connections betwen calling and called lines in different offices.

9. In an automatic telephone system, a first office which includes a plurality of lines having individually assigned thereto different time positions in first repetitive time position frames, a second office which includes a plurality of lines having individually assigned thereto different time positions in second repetitive time position frames, each of the lines in said first office having a first office prefix digit assigned thereto and each of the lines in said second office having a second office prefix digit assigned thereto, means in each of said offices and responsive to the initiation of a call on one of the lines therein for developing pulses in the time position assigned to said calling line, means for modulating said developed pulses with dial impulses transmitted over said calling line, selector means responsive to said dial impulse modulated pulses, means including said selector means for extending a telephonic connection to a called line in either of said offices, and means included in said selector means for absorbing the office prefix digit portion of said dial impulse modulated pulses if the called line is in the same office as said calling line.

10. In an automatic telephone system, a first office which includes a plurality of lines having individually assigned thereto different time positions in first repetitive time position frames, a second office which includes a plurality of lines having individually assigned thereto different time positions in second repetitive time position frames, each of the lines in said first office having a first office prefix digit assigned thereto and each of the lines in said second office having a second office prefix digit assigned thereto, means in each of said offices and responsive to the initiation of a call on one of the lines therein for developing pulses in the time position assigned to said calling line, means for modulating said developed pulses with dial impulses transmitted over said calling line, selector means responsive to said dial impulse modulated pulses for extending the call to the other office in response to the dialing of the office prefix digit of said other office, said selector means including means for absorbing an initial digit corresponding to the office prefix digit assigned to said calling line, and means including said selector means for extending a telephonic connection to a called line in either of said offices.

11. In a automatic telephone system, a first office which includes a plurality of lines having individually assigned thereto different time positions in first repetitive time position frames, a second office which includes a plurality of lines having individually assigned thereto different time positions in second repetitive time position frames, each of the lines in said first office having a first office prefix digit assigned thereto and each of the lines in said second office having a second office prefix digit assigned thereto, a plurality of trunks interconnecting said first and second offices, means in said first office and responsive to the initiation of a call on one of the lines therein for developing pulses in the time position assigned to said calling line, means for modulating said developed pulses with dial impulses transmitted over said calling lines, means for reconstructing said dial impulses from said dial impulse modulated pulses, a plurality of acceptors individually associated with said trunks and having individually assigned thereto predetermined time positions in said first time position frames, means responsive to dialing of said second office prefix digit for developing trunk acceptor pulses in the time position assigned to an idle one of said acceptors and modulating said trunk acceptor pulses with dial impulses transmitted over said calling line, means in said one acceptor for reconstructing said dial impulses from said dial impulse modulated trunk acceptor pulses and transmitting said reconstructed dial impulses over the associated trunk to said second office, means in said second office for developing called line pulses in the time position of said second time position frames assigned to a called line in said second office, and means responsive to said called line pulses for completing a telephonic connection between said calling and called lines.

12. In an automatic telephone system, a first office which includes a plurality of lines having individually assigned thereto different time positions in first repetitive time position frames, a second office which includes a plurality of lines having individually assigned thereto different time positions in second repetitive time position frames, a plurality of trunks interconnecting said first and second offices, a plurality of trunk acceptors terminating said trunks in said first office and having individually assigned thereto different time positions in said first time position frames, means included in each of said trunk acceptors for demodulating dial impulse modulated pulses in the time position assigned thereto and supplying the demodulated dial impulses to the associated trunk, a plurality of incoming selectors terminating said trunks in said second office and having individually assigned thereto different time positions in said second repetitive time position frames, and means including said trunk acceptors and said incoming selectors for establishing telephonic connections between calling lines in said first office and called lines in said second office.

13. In an automatic telephone system, a first office which includes a plurality of lines having individually assigned thereto different time positions in first repetitive time position frames, a second office which includes a plurality of lines having individually assigned thereto different time positions in second repetitive time position frames, a plurality of trunks interconnecting said first and second offices, a plurality of trunk acceptors terminating said trunks in said first office and having individually assigned thereto different time positions in said first time position frames, first time position responsive selector means in said first office for extending a telephonic connection from a calling line in said first office to one of said trunk acceptors terminating an idle one of said trunks, a plurality of incoming selectors terminating said trunks in said second office and having individually assigned thereto different time positions in said second time position frames, and second time position responsive selector means in said second office for extending a telephonic connection from the incoming selector terminating said one trunk to a called line in said second office.

14. In an automatic telephone system, a first office which includes a plurality of lines having individually assigned thereto different time positions in first repetitive time position frames, a second office which includes a plurality of lines having individually assigned thereto different time positions in second repetitive time position frames, a plurality of trunks interconnecting said first and second offices, a plurality of trunk acceptors terminating said trunks in said first office and having individually assigned thereto different time positions in said first time position frames, first time position responsive selector means in said first office for extending a telephonic connection from a calling line in said first office to one of said trunk acceptors terminating an idle one of said trunks, a plurality of incoming selectors terminating said trunks in said second office and having individually assigned thereto different time positions in said second time position frames, second time position responsive selector means in said second office for extending a telephonic connection from the incoming selector terminating said one trunk to a called line in said second office said first time position responsive selector means including means for absorbing a predetermined digit of dial impulses transmitted over said calling line, and means including said first time position responsive selector means for establishing a telephonic connection between said calling line and any called line in said first office.

15. In an automatic telephone system, a plurality of lines, said lines being divided into at least two groups having different classes of service available thereto, means responsive to the initiation of a call on one of said lines for developing pulses in one of a number of time positions which recur in repetitive time position frames, means for determining the service group in which said calling line is included, means for modulating said developed pulses in accordance with dial impulses transmitted over said calling line, and means jointly responsive to the transmission of a predetermined digit of dial impulses over said calling line and said service group determining means for providing a predetermined class of service for said calling line.

16. In an automatic telephone system, a plurality of lines, said lines being divided into at least two groups having different classes of service available thereto, means responsive to the initiation of a call on one of said lines for developing calling line pulses in one of a number of time positions which recur in repetitive time position frames, means for developing marking pulses representing the lines in one of said groups, means responsive to said marking pulses for determining the service group in which said calling line is included, means for modulating said developed pulses in accordance with dial impulses transmitted over said calling line, and means jointly responsive to the transmission of a predetermined digit of dial impulses over said calling lines and said service group determining means for providing a predetermined class of service for said calling line.

17. In an automatic telephone system, a plurality of lines, said lines being divided into at least two groups having different classes of service available thereto, means for developing pulses in different time positions within repetitive time position frames, a trunk circuit including electromechanical means for controlling direct current dialing over a trunk connected to said trunk circuit, first control means responsive to pulses in one of said time positions for extending a connection from a calling one of said lines to said trunk circuit in the event said calling line is included in a predetermined one of said service groups, and second control means responsive to changes in the level of pulses in said one time position for controlling said electromechanical means.

18. In an automatic telephone system, a plurality of lines having individually assigned thereto different time positions in repetitive time position frames, said lines being divided into at least two groups having different classes of service available thereto, a plurality of trunks, means responsive to the initiation of a call on one of said lines for developing calling line pulses in the time position assigned to said calling line, means for developing marking pulses in the time positions assigned to the lines in one of said groups, means for modulating said calling line pulses with dial impulses transmitted over said calling line, selector means responsive to said dial impulse modulated pulses for extending the call to one of said trunks, means included in said selector means for comparing the time position of said calling line pulses with the time positions of said marking pulses, and means controlled in part by said comparing means and responsive to the transmission of a predetermined prefix digit over said calling line for extending a connection from said calling line to an idle one of said trunks.

19. In an automatic telephone system, a plurality of lines having individually assigned thereto different time positions in repetitive time position frames, said lines being divided into at least two groups having different classes of service available thereto, means responsive to the initiation of a call on one of said lines for developing calling line pulses in the time position assigned to said calling line, means for developing marking pulses in the time positions assigned to the lines in one of said groups, a plurality of first selectors, means for operatively associating an idle one of said selectors with said calling line, means included in said one selector for comparing the time position of said calling line pulses with the time positions of said marking pulses, and means controlled in part by said comparing means and responsive to the transmission of a predetermined prefix digit over said calling line for extending a connection from said calling line to a called one of said lines.

20. In an automatic telephone system, a plurality of lines having individually assigned thereto different time positions in repetitive time position frames, a plurality of first selectors, means including said selectors for setting up telephonic connections between calling and called ones of said lines, a plurality of trunks, and time position responsive restricted service means included in each of said first selectors and responsive to the transmission of a predetermined prefix digit over the calling line operatively associated therewith for extending a connection from said calling line to an idle one of said trunks in accordance with the time position assigned to said calling line.

21. An impulse responsive selector of the pulse multiplex type adapted for selective response to pulses transmitted thereto over a pulse input channel in predetermined time positions of repetitive time position frames and provided with a pulse output channel, comprising impulse counting means responsive to dial impulse modulated pulses impressed upon said input channel for registering the first digit dialed into said selector, means controlled in part by said counting means for impressing pulses on said output channel in one of said time positions, and means responsive to registration of a predetermined digit of at least two dial impulses by said counting means for resetting said counting means and conditioning the same to respond to the next digit dialed into said selector.

22. An impulse resposive selector of the pulse multiplex type adapted for selective response to pulses transmitted thereto over a pulse input channel in predetermined time positions of repetitive time position frames and provided with a pulse output channel, comprising impulse counting means responsive to dial impulse modulated pulses impressed upon said input channel for registering the first digit dialed into said selector, means controlled in part by said counting means for impressing pulses on said output channel in one of said time positions, and means for preventing pulses from being impressed upon said output channel in one of said time positions in response to the registration of a digit greater than one by said counting means.

23. An impulse responsive selector of the pulse multiplex type adapted for selective response to pulses transmitted thereto over a pulse input channel in predetermined time positions of repetitive time position frames and provided with a pulse output channel, comprising means responsive to the transmission of input pulses over said input channel in one of said time positions for gating dial tone modulated pulses to said output channel in said one time position, counting means responsive to dial impulse modulation of said input pulses for registering the first digit dialed into said selector, means controlled in part by said counting means for impressing output pulses on said output channel in another of said time positions, means responsive to the first impulse of said first dialed digit for removing dial tone modulation from the pulses gated to said output channel in said one time position, means responsive to registration of a predetermined digit by said counting means for resetting said counting means and conditioning the same to respond to the next digit dialed into said selector, and means for preventing dial tone modulation of the pulses gated to said output channel in said one time position in response to the next digit dialed into said selector.

24. In an automatic telephone system, a plurality of lines having individually assigned thereto different time positions in repetitive time position frames, a plurality of selectors, a plurality of trunk circuits, a plurality of trunk acceptors individually associated with said trunk circuits and having assigned thereto different ones of said time positions, means included in each of said trunk acceptors and responsive to dial impulse modulated pulses in the time position assigned thereto for deriving dial impulses from said dial impulse modulated pulses, means for opening and closing said trunk circuit in accordance with said derived dial impulses, and means for preventing more than one of said selectors from being operatively associated with one of said trunk acceptors.

25. In an automatic telephone system, an electronic digit absorption and register reuse circuit, comprising a counting chain including a plurality of counting stages, means for sequentially energizing different ones of said stages in accordance with individual impulses of a first dialed digit, means for developing a control potential in response to the interdigit pause following said first digit, means jointly responsive to said control potential and energization of a predetermined one of said counting stages for resetting said counting chain, and means responsive to energization of a different one of said counting stages for disabling said control potential producing means.

26. In an automatic telephone system, an electronic digit absorption and register reuse circuit, comprising a counting chain including a plurality of counting stages, means for sequentially energizing different ones of said stages in accordance with individual impulses of a first dialed digit, sequence timing circuit means for developing a control potential during the interdigit pause following said first digit, means jointly responsive to said control potential and energization of a predetermined one of said counting stages for resetting said counting chain, and means for resetting said sequence timing circuit means in response to energization of a predetermined one of said counting stages.

27. In an automatic telephone system, an electronic digit absorption and register reuse circuit, comprising a counting chain including a plurality of counting stages, means for sequentially energizing different ones of said stages in accordance with individual impulses of a first dialed digit, means for developing a control potential in response to the interdigit pause following said first digit, a reset tube, means jointly responsive to said control potential and energization of a predetermined one of said counting stages for rendering said reset tube conductive, and means responsive to conduction of said reset tube for resetting said counting chain and said sequence timing circuit.

References Cited in the file of this patent

UNITED STATES PATENTS

| | | |
|---|---|---|
| 1,934,737 | Richardson | Nov. 14, 1933 |
| 2,584,987 | Deloraine | Feb. 12, 1952 |
| 2,619,548 | Lesti | Nov. 25, 1952 |
| 2,716,159 | Flowers | Aug. 23, 1955 |
| 2,773,937 | Morris | Dec. 11, 1956 |
| 2,778,878 | Malthaner et al. | Jan. 22, 1957 |
| 2,910,541 | Harris | Oct. 27, 1959 |